US012183259B2

(12) United States Patent
Lee et al.

(10) Patent No.: US 12,183,259 B2
(45) **Date of Patent: *Dec. 31, 2024**

(54) SIGNAL PROCESSING DEVICE AND IMAGE DISPLAY APPARATUS INCLUDING SAME

(71) Applicant: LG ELECTRONICS INC., Seoul (KR)

(72) Inventors: Jihoon Lee, Seoul (KR); Jongchan Kim, Seoul (KR); Kyeongryeol Park, Seoul (KR); Jeonghyu Yang, Seoul (KR); Seoksoo Lee, Seoul (KR); Byungtae Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/321,660

(22) Filed: May 22, 2023

(65) Prior Publication Data

US 2023/0298508 A1 Sep. 21, 2023

Related U.S. Application Data

(63) Continuation of application No. 17/657,090, filed on Mar. 29, 2022, now Pat. No. 11,710,444, which is a (Continued)

(30) Foreign Application Priority Data

Jun. 26, 2020 (KR) ........................ 10-2020-0078469

(51) Int. Cl.

*G09G 3/32* (2016.01)
*G09G 3/20* (2006.01)

(Continued)

(52) U.S. Cl.

CPC ......... *G09G 3/2096* (2013.01); *G09G 3/3208* (2013.01); *G09G 5/006* (2013.01);

(Continued)

(58) Field of Classification Search

CPC .... G09G 3/2096; G09G 3/3208; G09G 5/006; G09G 2310/08; G09G 2340/0407;

(Continued)

(56) References Cited

U.S. PATENT DOCUMENTS 6,658,059 B1 12/2003 Iu et al.
2003/0137527 A1 7/2003 Lin et al.

(Continued)

OTHER PUBLICATIONS

U.S. Appl. No. 17/657,090, Office Action dated Sep. 20, 2022, 26 pages.

(Continued)

*Primary Examiner* — Towfiq Elahi

(74) *Attorney, Agent, or Firm* — LEE, HONG, DEGERMAN, KANG & WAIMEY

(57) ABSTRACT

The present disclosure relates to a signal processing device and an image display apparatus including the same. A signal processing device according to an embodiment of the present disclosure includes: an input interface to receive an image signal; a first image processor to generate first image frame data based on the image signal; a second image processor to generate second image frame data scaled down from the first image frame data based on the image signal; and an output interface to receive the first image frame data from the first image processor and the second image frame data from the second image processor and to output the first image frame data and the second image frame data, wherein the first image frame data output from the output interface is more delayed than the second image frame data output from (Continued)

the output interface. Accordingly, a timing controller may accurately and rapidly perform signal processing for a panel.

20 Claims, 38 Drawing Sheets

Related U.S. Application Data continuation of application No. 17/030,510, filed on Sep. 24, 2020, now Pat. No. 11,308,858.

(60) Provisional application No. 62/905,036, filed on Sep. 24, 2019.

(51) Int. Cl.
*G09G 3/3208* (2016.01)
*G09G 5/00* (2006.01)

(52) U.S. Cl.
CPC . *G09G 2310/08* (2013.01); *G09G 2340/0407* (2013.01); *G09G 2360/16* (2013.01); *G09G 2360/18* (2013.01)

(58) Field of Classification Search
CPC ........... G09G 2360/16; G09G 2360/18; G09G 5/005; G09G 5/18; G09G 2300/0452; G09G 2320/0626; G09G 3/3233; G09G 5/373; G09G 5/391; G09G 2330/021; G09G 2330/04; G09G 2340/0435; G09G 2360/02; G09G 5/008; H04N 21/4122; H04N 21/42221; H04N 21/4402; H04N 21/440263; H04N 21/4854; H04N 21/8153; H04N 21/816; H04N 5/06
See application file for complete search history.

(56) References Cited

U.S. PATENT DOCUMENTS

| | | | | |
|---|---|---|---|---|
| 2005/0276508 | A1* | 12/2005 | Coleman ................ | G06V 10/30 382/275 |
| 2010/0007678 | A1 | 1/2010 | Tsai et al. | |
| 2011/0141361 | A1 | 6/2011 | Yoshigahara | |
| 2014/0098111 | A1 | 4/2014 | Ju et al. | |
| 2015/0243208 | A1 | 8/2015 | Kim et al. | |
| 2016/0189619 | A1 | 6/2016 | Park et al. | |
| 2018/0336666 | A1 | 11/2018 | Kim et al. | |
| 2019/0114968 | A1 | 4/2019 | Kwon | |
| 2019/0149485 | A1 | 5/2019 | Shino | |
| 2019/0206356 | A1 | 7/2019 | Kim et al. | |
| 2020/0265793 | A1 | 8/2020 | Yabuki et al. | |
| 2021/0150972 | A1 | 5/2021 | Lee et al. | |
| 2022/0223097 | A1 | 7/2022 | Lee et al. | |

OTHER PUBLICATIONS

U.S. Appl. No. 17/657,090, Notice of Allowance dated Mar. 6, 2023, 7 pages.
European Patent Office Application Serial No. 20197327.8, Search Report dated Dec. 11, 2020, 11 pages.
U.S. Appl. No. 17/030,510, Office Action dated Jul. 21, 2021, 19 pages.
U.S. Appl. No. 17/030,510, Notice of Allowance dated Dec. 15, 2021, 8 pages.

* cited by examiner (a) (b)

(c) (d)

SIGNAL PROCESSING DEVICE AND IMAGE DISPLAY APPARATUS INCLUDING SAME

CROSS-REFERENCE TO THE RELATED APPLICATION

This application is a continuation of U.S. patent application Ser. No. 17/657,090, filed on Mar. 29, 2022, which is a continuation of U.S. patent application Ser. No. 17/030,510, filed on Sep. 24, 2020, which pursuant to 35 U.S.C. § 119 (a), claims the benefit of U.S. Provisional Patent Application No. 62/905,036, filed on Sep. 24, 2019, and also claims the benefit of earlier filing date and right of priority to Korean Patent Application No. 10-2020-0078469, filed on Jun. 26, 2020, the contents of which are all hereby incorporated by reference herein in their entirety.

BACKGROUND OF THE INVENTION

1. Field of the Invention

The present disclosure relates to a signal processing device and an image display apparatus including the same, and more specifically, to a signal processing device and an image display apparatus in which a timing controller may accurately and rapidly perform signal processing on a panel.

2. Description of the Related Art

A signal processing device is a device that performs signal processing on an input image so as to display an image.

For example, the signal processing device may receive various image signals such as a broadcast signal and an external input signal (e.g., HDMI signal), perform signal processing based on the received broadcast signal or external input signal, and output a processed image signal to a display.

Meanwhile, a display may include a panel and a timing controller that operates to output a signal to the panel.

Recently, research for achieving a slim panel and timing controller has been conducted in order to obtain a slim display.

Particularly, methods for eliminating a memory in a timing controller or seldom using the memory are devised for achieving a slim timing controller.

However, if a memory is eliminated from a timing controller, no images are stored in the memory and thus there are problems that, in a case where signal processing for reducing luminance is performed in the timing controller in order to reduce power consumption of the panel, signal processing of the timing controller is not accurately performed because it is difficult to predict image luminance so as to damage the panel.

SUMMARY OF THE INVENTION

An object of the present disclosure is to provide a signal processing device capable of outputting a signal such that accurate and rapid signal processing may be performed in a timing controller and an image display apparatus including the same.

Another object of the present disclosure is to provide a signal processing device and an image display apparatus using the same in which a timing controller may accurately and rapidly perform signal processing for reducing power consumption.

Another object of the present disclosure is to provide a signal processing device capable of outputting first image frame data and second image frame data through the same transmission line and an image display apparatus including the same.

Another object of the present disclosure is to provide an image display apparatus capable of eliminating a memory in a timing controller.

Another object of the present disclosure is to provide a signal processing device capable of generating scaled down second image frame data with reduced error as compared to first image frame data and an image display apparatus including the same.

In accordance with the present disclosure, the above and other objects may be accomplished by the provision of a signal processing device including: an input interface configured to receive an image signal; a first image processor configured to generate first image frame data based on the image signal; a second image processor configured to generate second image frame data scaled down from the first image frame data based on the image signal; and an output interface configured to receive the first image frame data from the first image processor and the second image frame data from the second image processor and to output the first image frame data and the second image frame data, wherein the first image frame data output from the output interface is more delayed than the second image frame data output from the output interface.

Further, the first image frame data output from the first image processor may be delayed from the second image frame data output from the second image processor.

Further, the output interface may delay the first image frame data from the second image frame data and output the first image frame data.

Further, when the output first image frame data is n frame data, the output interface may output frame data after the n frame data as the second image frame data.

Further, the signal processing device according to an embodiment of the present disclosure may further include a memory to store frame data for image processing of the first image processor.

Further, the output interface may output first image frame data regarding an n−1 image frame and second image frame data regarding an n image frame together.

Further, the output interface may include a first output terminal for transmitting vertical synchronization signal, a second output terminal for transmitting horizontal synchronization signal, a third output terminal for transmitting image data signal, and a fourth output terminal for transmitting data enable signal, wherein the first image frame data and the second image frame data are transmitted through the third output terminal.

Further, the output interface may output a data enable signal divided into active periods and blank periods, wherein a second active period of a second data enable signal when the first image frame data and the second image frame data are output is greater than a first active period of a first data enable signal when only the first image frame data is output.

Further, the output interface may output a data enable signal divided into active periods and blank periods, wherein a second blank period of a second data enable signal when the first image frame data and the second image frame data are output is less than a first blank period of a first data enable signal when only the first image frame data is output.

Further, the output interface may output a data enable signal divided into active periods and blank periods and set a length of the active period based on resolution information of a panel and a driving frequency of the panel.

Further, the output interface may set an active period having a second length greater than a first length by adding a period for transmission of the second image frame data to a period for transmission of the first image frame data having the first length.

Further, the output interface may output a data enable signal divided into active periods and blank periods, set an active period having a first length and a blank period having a second length when a resolution of a panel is a first resolution and a driving frequency of the panel is a first frequency, and when the first image frame data and the second image frame data are output, transmit at least a part of the first image frame data in the active period having the first length and transmit at least a part of the second image frame data in a part of the blank period having the second length.

Further, the output interface may include a first output terminal for transmitting vertical synchronization signal, a second output terminal for transmitting horizontal synchronization signal, a third output terminal for transmission of a data signal of first image frame data, a fourth output terminal for transmission of a data enable signal of the first image frame data, a fifth output terminal for transmission of a data signal of second image frame data, and a sixth output terminal for transmission of a data enable signal of the second image frame data.

Further, the output interface may output the first image frame data and the second image frame data using different output terminals.

Further, the output interface may output first image frame data regarding an n image frame and second image frame data regarding an n image frame together or do not output the second image frame data when an image output mode is a low delay mode.

Further, the low delay mode may include at least one of a game mode and a mirroring mode.

Further, the second image processor may include a scaler for generating second image frame data scaled down from the first image frame data based on the image signal Further, the scaler may generate at least one super pixel or super block based on an image block of the image signal and output the scaled down second image frame data including the super pixel or the super block.

Further, the scaler may vary a size of the super pixel or the super block according to a resolution of the image signal or an image size.

In accordance with an aspect of the present disclosure, the above and other objects may be accomplished by the provision of a signal processing device including: an input interface configured to receive an image signal; a first image processor configured to generate first image frame data based on the image signal; a second image processor configured to generate second image frame data based on the image signal; and an output interface configured to output a data enable signal divided into active periods and blank periods, a data signal of the first image frame data, and a data signal of the second image frame data, wherein the output interface sets an active period of a first data enable signal to a first length when only the data signal of the first image frame data is output and sets an active period of a second data enable signal to a second length greater than the first length when the data signal of the first image frame data and the data signal of the second image frame data are output together.

Further, the output interface may set a blank period of the first data enable signal to a third length when only the data signal of the first image frame data is output and set a blank period of the second data enable signal to a fourth length greater than the third length when the data signal of the first image frame data and the data signal of the second image frame data are output together.

Further, the output interface may vary the length of the active period of the second data enable signal based on resolution information of a panel and a driving frequency of the panel.

In accordance with another aspect of the present disclosure, there is provided an image display apparatus including: a signal processing device configured to delay first image frame data from second image frame data and to output the delayed first image data; a timing controller configured to perform signal processing based on an image signal output from the signal processing device; and a panel configured to display an image based on a signal from the timing controller.

Further, the timing controller may extract the first image frame data based on the second image frame data from the signal processing device, perform signal processing on the first image frame data based on the extracted information, and output a signal regarding the processed first image frame data to the panel.

Further, the timing controller may extract the first image frame data based on the second image frame data from the signal processing device, decrease a luminance level of the first image frame data from a first level to a second level such that a power level consumed in the panel becomes equal to or less than an allowable value when power information based on luminance information in the extracted information exceeds a reference value, and output a signal regarding the first image frame data with the luminance changed to the second level to the panel.

Further, the timing controller may control a power level consumed in the panel to be equal to or less than an allowable value based on luminance information in the extracted information.

Further, when power information according to luminance information regarding a part of the first image frame data exceeds a reference value based on the extracted information, the timing controller may decrease a luminance level of the part of the first image frame data from a first level to a second level and output a signal regarding the part of the first image frame data having the luminance changed to the second level to the panel.

Further, the timing controller may receive the first image frame data and the second image frame data when an image output mode of the signal processing device is a first mode, perform signal processing on the first image frame data based on the second image frame data to control the processed first image frame data to be displayed on the panel, and perform signal processing on the received first image frame data without information regarding the second image frame data to control the processed first image frame data to be displayed on the panel when the image output mode of the signal processing device is a second mode.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE PREFERRED EMBODIMENTS

Hereinafter, the present disclosure will be described in detail with reference to the accompanying drawings.

Regarding constituent elements used in the following description, suffixes "module" and "unit" are given only in consideration of ease in the preparation of the specification, and do not have or serve as different meanings. Accordingly, the suffixes "module" and "unit" may be used interchangeably.

Figure 1:
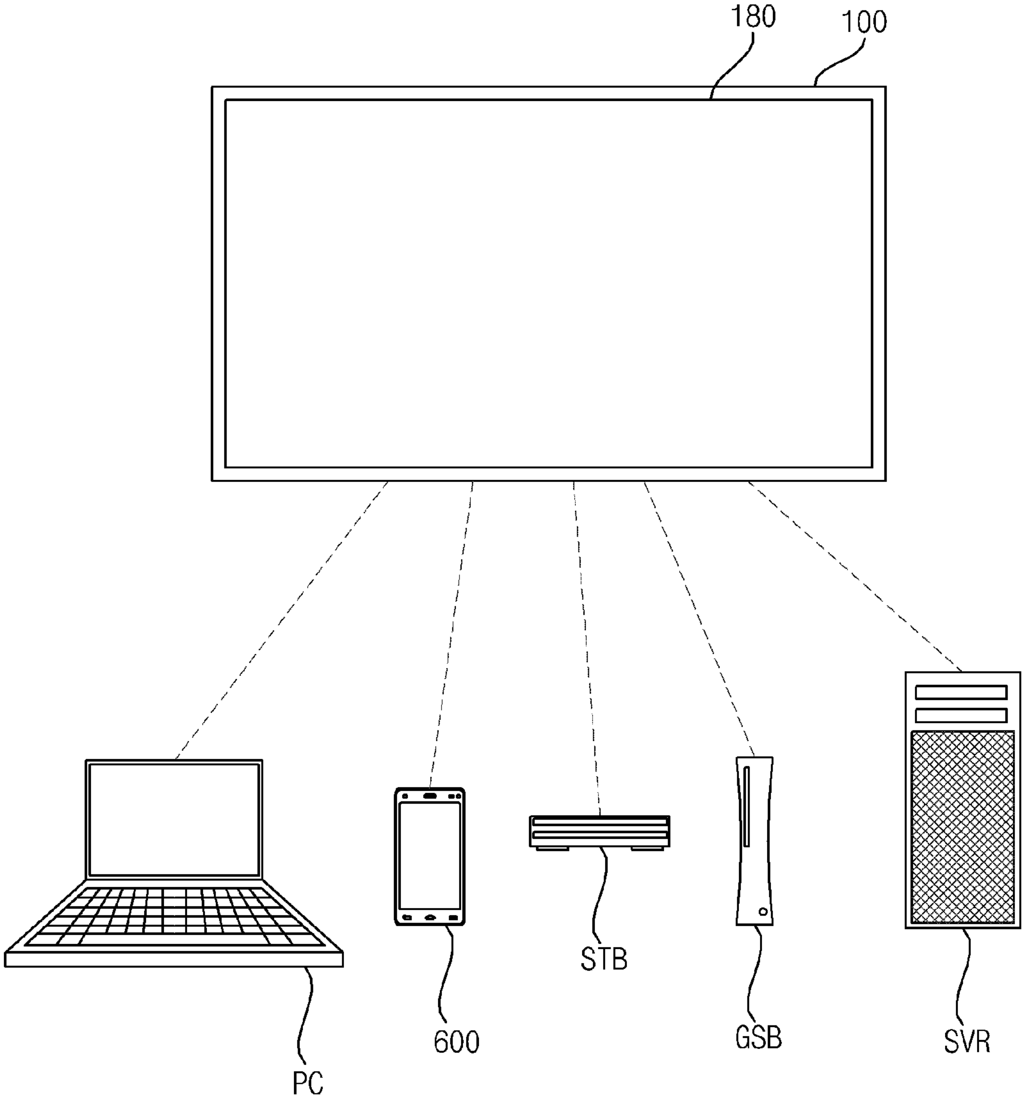
FIG. 1 is a diagram showing an image display apparatus according to an embodiment of the present disclosure.

FIG. 1 is a diagram showing an image display apparatus according to an embodiment of the present disclosure.

Referring to the figure, an image display apparatus 100 may include a display 180.

The image display apparatus 100 may receive image signals from various external devices, process the image signals and display the processed image signals on the display 180.

The various external devices may be, for example, a mobile terminal 600 such as a computer (PC) or a smartphone, a set-top box (STB), a game console (GSB), a server (SVR), and the like.

The display 180 may be implemented as one of various panels. For example, the display 180 may be any one of spontaneous emission panels such as an organic light emitting diode panel (OLED panel), an inorganic LED panel, and a micro LED panel.

In the present disclosure, an example in which the display 180 includes the organic light emitting diode panel (OLED panel) is mainly described.

Meanwhile, the OLED panel exhibits a faster response speed than the LED and is excellent in color reproduction.

Accordingly, if the display 180 includes an OLED panel, it is preferable that a signal processor 170 (see FIG. 2) of the image display apparatus 100 perform image quality processing for the OLED panel.

Meanwhile, the display 180 may include a panel and a timing controller, and the panel may display an image according to signal processing of the timing controller.

In a case where a memory is used in the timing controller when an image signal is output to the panel, the image signal may be output to the panel using data stored in the memory.

In a case where the timing controller does not use a memory or does not include a memory for the purpose of achieving a slim timing controller, the amount of processed signals increases in the timing controller and, particularly, the amount of processed signals further increases when the resolution of an image increases.

Accordingly, the present disclosure proposes a method by which the timing controller may accurately and rapidly perform signal processing for the panel when a memory is not used or seldom used for realizing a slim timing controller.

To this end, the present disclosure proposes a method of additionally outputting second image frame data downscaled based on a received image in addition to performing signal processing on the received image and outputting signal-processed first frame image data.

The image display apparatus 100 according to an embodiment of the present disclosure may include a signal processing device 170 which outputs first image frame data ImgL delayed from second image frame data ImgS, a timing controller 232 which performs signal processing based on an image signal output from the signal processing device 170, and a panel 210 which displays an image based on a signal from the timing controller 232. Accordingly, the timing controller 232 may accurately and rapidly perform signal processing for the panel 210.

The signal processing device 170 in the image display device 100 according to an embodiment of the present disclosure includes an input interface IIP which receives an external image signal, a first image processor 1010 which generates the first image frame data ImgL based on the image signal, a second image processor 1020 which generates the second image frame data ImgS scaled down from the first image frame data ImgL, and an output interface OIP which receives the first image frame data ImgL from the first image processor 1010 and the second image frame data ImgS from the second image processor 1020 and outputs the first image frame data ImgL and the second image frame data ImgS, and the first image frame data ImgL output from the output interface OIP is more delayed than the second image frame data ImgS. Accordingly, signals may be output such that the timing controller may accurately and rapidly perform signal processing. Meanwhile, the timing controller may accurately and rapidly perform signal processing on the delayed first image frame data ImgL based on the second image frame data ImgS. Particularly, the timing controller may accurately and rapidly perform signal processing for reducing power consumption.

Meanwhile, the signal processing device 170 in the image display apparatus 100 according to another embodiment of the present disclosure includes the input interface IIO which receives an external image signal, the first image processor 1010 which generate s the first image frame data ImgL based on the image signal, a second image processor 1020 which generates image frame data based on the image signal, and an output interface OIP which outputs a data enable signal DE divided into active periods HA and blank periods HB, a data signal of the first image frame data ImgL, and a data signal of the second image frame data ImgS, and the output interface OIP sets an active period HA of a first data enable signal DE to a first length Wa when only the data signal of the first image frame data ImgL is output and sets an active period HA of a second data enable signal DE to a second length Wb greater than the first length Wa when the data signal of the first image frame data ImgL and the data signal of the second image frame data ImgS are output together. Accordingly, signals may be output such that the timing controller may accurately and rapidly perform signal processing.

Meanwhile, the image display apparatus 100 of FIG. 1 may be a TV receiver, a monitor, a tablet, a mobile terminal, a vehicle display device, or the like.

Figure 2:
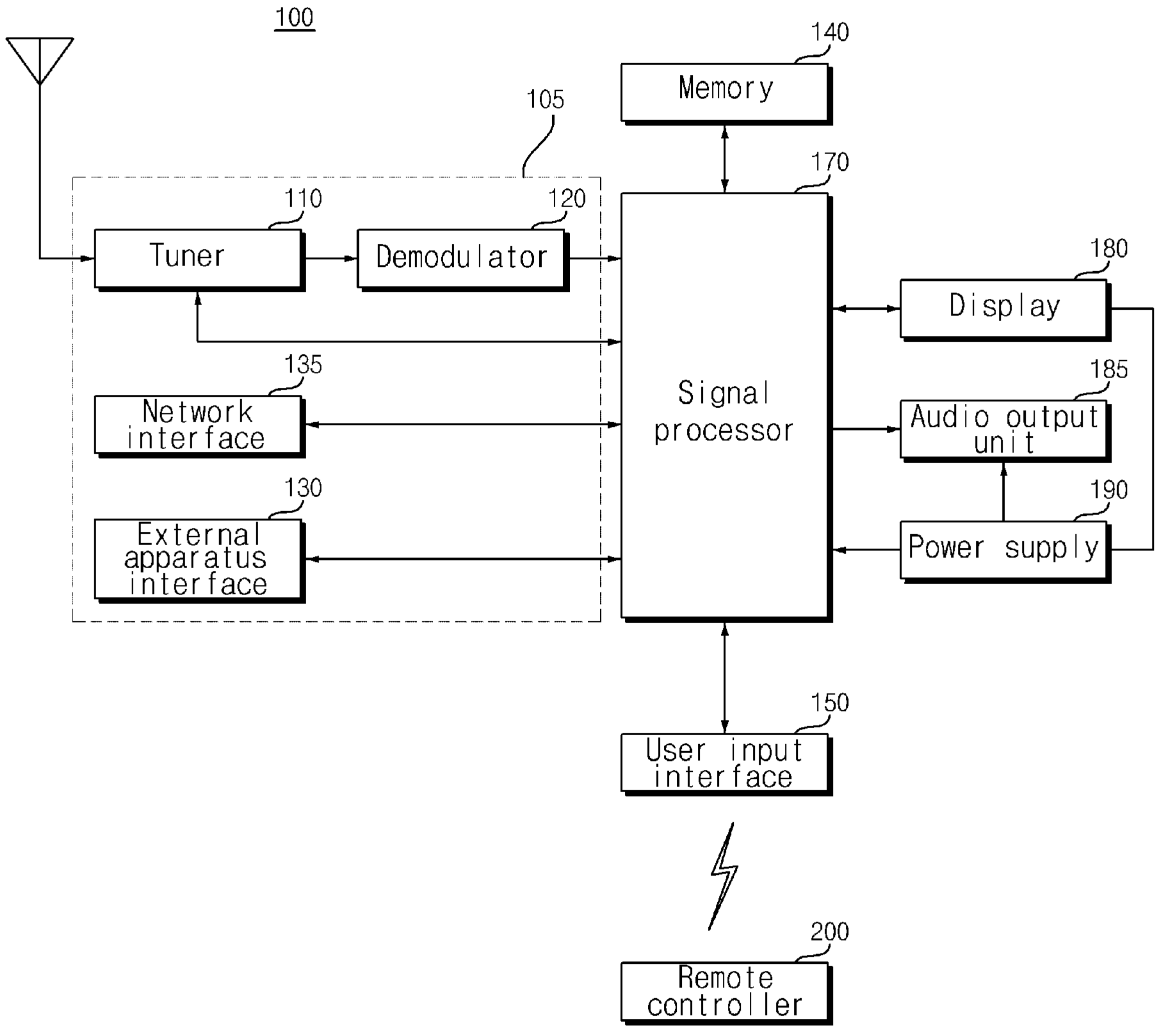
FIG. 2 is an example of an internal block diagram of the image display apparatus.

FIG. 2 is an example of an internal block diagram of the image display apparatus of FIG. 1.

Referring to FIG. 2, the image display apparatus 100 according to an embodiment of the present disclosure includes an image receiver 105, an external apparatus interface 130, a memory 140, a user input interface 150, a sensor unit (not shown), a signal processor 170, a display 180, and an audio output unit 185.

The image receiver 105 may include a tuner 110, a demodulator 120, a network interface 135, and an external apparatus interface 130.

Meanwhile, unlike the figure, the image receiver 105 may include only the tuner 110, the demodulator 120, and the external apparatus interface 130. That is, the network interface 135 may not be included.

The tuner 110 selects an RF broadcast signal corresponding to a channel selected by a user or all pre-stored channels among radio frequency (RF) broadcast signals received through an antenna (not shown). In addition, the selected RF broadcast signal is converted into an intermediate frequency signal, a baseband image, or an audio signal.

Meanwhile, the tuner 110 may include a plurality of tuners for receiving broadcast signals of a plurality of channels. Alternatively, a single tuner that simultaneously receives broadcast signals of a plurality of channels is also available.

The demodulator 120 receives the converted digital IF signal DIF from the tuner 110 and performs a demodulation operation.

The demodulator 120 may perform demodulation and channel decoding and then output a stream signal TS. At this time, the stream signal may be a multiplexed signal of an image signal, an audio signal, or a data signal.

The stream signal output from the demodulator 120 may be input to the signal processor 170. The signal processor 170 performs demultiplexing, image/audio signal processing, and the like, and then outputs an image to the display 180 and outputs audio to the audio output unit 185.

The external apparatus interface 130 may transmit or receive data with a connected external apparatus (not shown), e.g., a set-top box STB. To this end, the external apparatus interface 130 may include an A/V input and output unit (not shown).

The external apparatus interface 130 may be connected in wired or wirelessly to an external apparatus such as a digital versatile disk (DVD), a Blu ray, a game equipment, a camera, a camcorder, a computer (note book), and a set-top box, and may perform an input/output operation with an external apparatus.

The A/V input and output unit may receive image and audio signals from an external apparatus. Meanwhile, a wireless communication unit (not shown) may perform short-range wireless communication with other electronic apparatus.

Through the wireless communication unit (not shown), the external apparatus interface 130 may exchange data with an adjacent mobile terminal 600. In particular, in a mirroring mode, the external apparatus interface 130 may receive device information, executed application information, application image, and the like from the mobile terminal 600.

The network interface 135 provides an interface for connecting the image display apparatus 100 to a wired/wireless network including the Internet network. For example, the network interface 135 may receive, via the network, content or data provided by the Internet, a content provider, or a network operator.

Meanwhile, the network interface 135 may include a wireless communication unit (not shown).

The memory 140 may store a program for each signal processing and control in the signal processor 170, and may store signal-processed image, audio, or data signal.

In addition, the memory 140 may serve to temporarily store image, audio, or data signal input to the external apparatus interface 130. In addition, the memory 140 may store information on a certain broadcast channel through a channel memory function such as a channel map.

Although FIG. 2 illustrates that the memory is provided separately from the signal processor 170, the scope of the present disclosure is not limited thereto. The memory 140 may be included in the signal processor 170.

The user input interface 150 transmits a signal input by the user to the signal processor 170 or transmits a signal from the signal processor 170 to the user.

For example, it may transmit/receive a user input signal such as power on/off, channel selection, screen setting, etc., from a remote controller 200, may transfer a user input signal input from a local key (not shown) such as a power key, a channel key, a volume key, a set value, etc., to the signal processor 170, may transfer a user input signal input from a sensor unit (not shown) that senses a user's gesture to the signal processor 170, or may transmit a signal from the signal processor 170 to the sensor unit (not shown).

The signal processor 170 may demultiplex the input stream through the tuner 110, the demodulator 120, the network interface 135, or the external apparatus interface 130, or process the demultiplexed signals to generate and output a signal for image or audio output.

For example, the signal processor 170 receives a broadcast signal received by the image receiver 105 or an HDMI signal, and perform signal processing based on the received broadcast signal or the HDMI signal to thereby output a processed image signal.

The image signal processed by the signal processor 170 is input to the display 180, and may be displayed as an image corresponding to the image signal. In addition, the image signal processed by the signal processor 170 may be input to the external output apparatus through the external apparatus interface 130.

The audio signal processed by the signal processor 170 may be output to the audio output unit 185 as an audio signal. In addition, audio signal processed by the signal processor 170 may be input to the external output apparatus through the external apparatus interface 130.

Although not shown in FIG. 2, the signal processor 170 may include a demultiplexer, an image processor, and the like. That is, the signal processor 170 may perform a variety of signal processing and thus it may be implemented in the form of a system on chip (SOC). This will be described later with reference to FIG. 3.

In addition, the signal processor 170 may control the overall operation of the image display apparatus 100. For example, the signal processor 170 may control the tuner 110 to control the tuning of the RF broadcast corresponding to the channel selected by the user or the previously stored channel.

In addition, the signal processor 170 may control the image display apparatus 100 according to a user command input through the user input interface 150 or an internal program.

Meanwhile, the signal processor 170 may control the display 180 to display an image. At this time, the image displayed on the display 180 may be a still image or a moving image, and may be a 2D image or a 3D image.

Meanwhile, the signal processor 170 may display a certain object in an image displayed on the display 180. For example, the object may be at least one of a connected web screen (newspaper, magazine, etc.), an electronic program guide (EPG), various menus, a widget, an icon, a still image, a moving image, and a text.

Meanwhile, the signal processor 170 may recognize the position of the user based on the image photographed by a photographing unit (not shown). For example, the distance (z-axis coordinate) between a user and the image display apparatus 100 may be determined. In addition, the x-axis coordinate and the y-axis coordinate in the display 180 corresponding to a user position may be determined.

The display 180 generates a driving signal by converting an image signal, a data signal, an OSD signal, a control signal processed by the signal processor 170, an image signal, a data signal, a control signal, and the like received from the external apparatus interface 130.

Meanwhile, the display 180 may be configured as a touch screen and used as an input device in addition to an output device.

The audio output unit 185 receives a signal processed by the signal processor 170 and outputs it as an audio.

The photographing unit (not shown) photographs a user. The photographing unit (not shown) may be implemented by a single camera, but the present disclosure is not limited thereto and may be implemented by a plurality of cameras. Image information photographed by the photographing unit (not shown) may be input to the signal processor 170.

The signal processor 170 may sense a gesture of the user based on each of the images photographed by the photographing unit (not shown), the signals detected from the sensor unit (not shown), or a combination thereof.

The power supply 190 supplies corresponding power to the image display apparatus 100. Particularly, the power may be supplied to a signal processor 170 which may be implemented in the form of a system on chip (SOC), a display 180 for displaying an image, and an audio output unit 185 for outputting an audio.

Specifically, the power supply 190 may include a converter for converting an AC power into a DC power, and a DC/DC converter for converting the level of the DC power.

The remote controller 200 transmits the user input to the user input interface 150. To this end, the remote controller 200 may use Bluetooth, a radio frequency (RF) communication, an infrared (IR) communication, an Ultra Wideband (UWB), ZigBee, or the like. In addition, the remote controller 200 may receive the image, audio, or data signal output from the user input interface 150, and display it on the remote controller 200 or output it as an audio.

Meanwhile, the image display apparatus 100 may be a fixed or mobile digital broadcast receiver capable of receiving digital broadcast.

Meanwhile, a block diagram of the image display apparatus 100 shown in FIG. 2 is a block diagram for an embodiment of the present disclosure. Each component of the block diagram may be integrated, added, or omitted according to a specification of the image display apparatus 100 actually implemented. That is, two or more components may be combined into a single component as needed, or a single component may be divided into two or more components. The function performed in each block is described for the purpose of illustrating embodiments of the present disclosure, and specific operation and apparatus do not limit the scope of the present disclosure.

Figure 3:
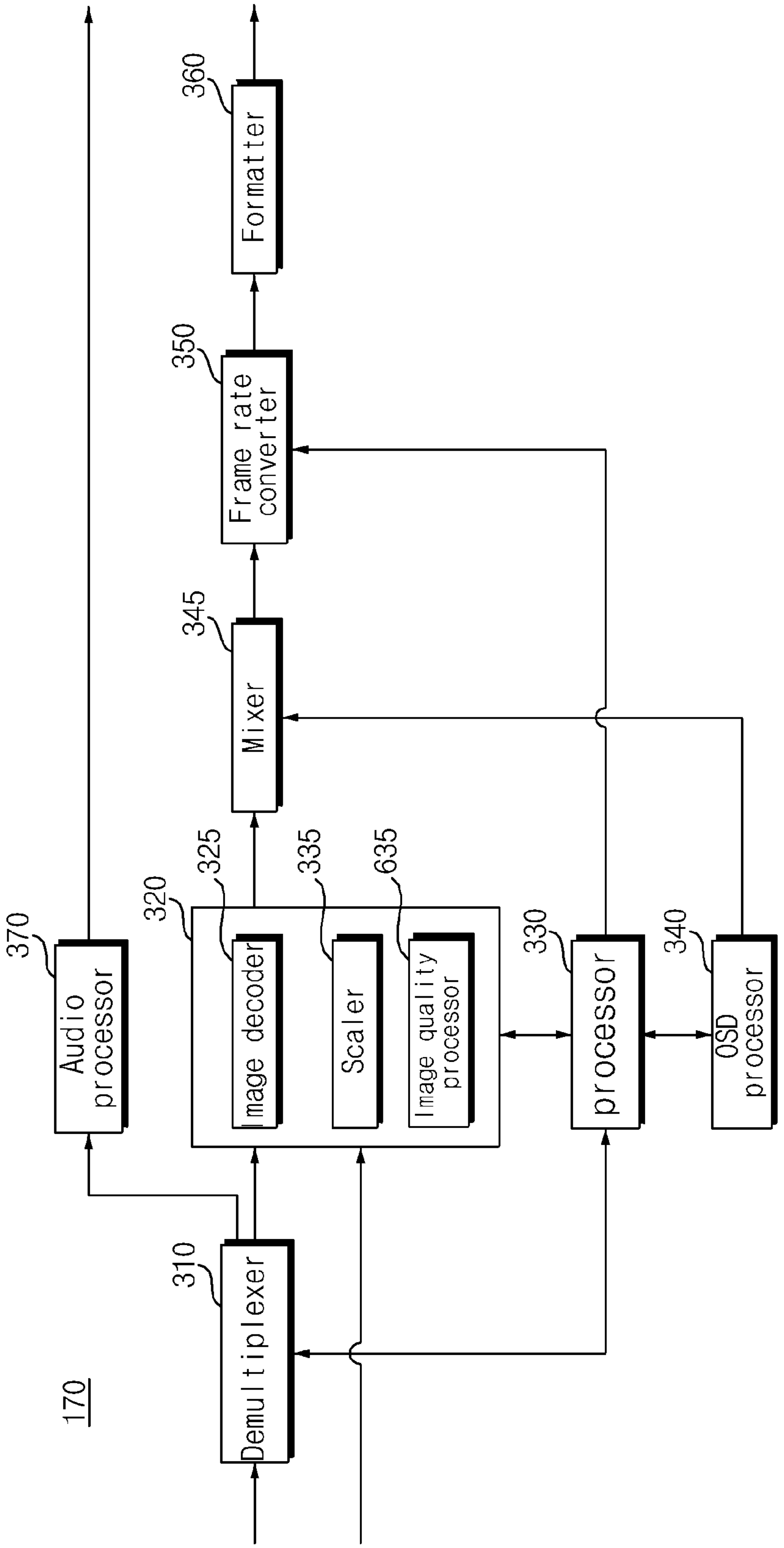
FIG. 3 is an example of an internal block diagram of a signal processor of FIG. 2.

FIG. 3 is an example of an internal block diagram of the signal processor in FIG. 2.

Referring to the figure, the signal processor 170 according to an embodiment of the present disclosure may include a demultiplexer 310, an image processor 320, a processor 330, and an audio processor 370. In addition, the signal processor 170 may further include and a data processor (not shown).

The demultiplexer 310 demultiplexes the input stream. For example, when an MPEG-2 TS is input, it may be demultiplexed into image, audio, and data signal, respectively. Here, the stream signal input to the demultiplexer 310 may be a stream signal output from the tuner 110, the demodulator 120, or the external apparatus interface 130.

The image processor 320 may perform signal processing on an input image. For example, the image processor 320 may perform image processing on an image signal demultiplexed by the demultiplexer 310.

To this end, the image processor 320 may include an image decoder 325, a scaler 335, an image quality processor 635, an image encoder (not shown), an OSD processor 340, a frame rate converter 350, a formatter 360, etc.

The image decoder 325 decodes a demultiplexed image signal, and the scaler 335 performs scaling so that the resolution of the decoded image signal may be output from the display 180.

The image decoder 325 may include a decoder of various standards. For example, a 3D image decoder for MPEG-2, H.264 decoder, a color image, and a depth image, and a decoder for a multiple view image may be provided.

The scaler 335 may scale an input image signal decoded by the image decoder 325 or the like.

For example, if the size or resolution of an input image signal is small, the scaler 335 may upscale the input image signal, and, if the size or resolution of the input image signal is great, the scaler 335 may downscale the input image signal.

The image quality processor 635 may perform image quality processing on an input image signal decoded by the image decoder 325 or the like.

For example, the image quality processor 625 may perform noise reduction processing on an input image signal, extend a resolution of high gray level of the input image signal, perform image resolution enhancement, perform high dynamic range (HDR)-based signal processing, change a frame rate, perform image quality processing suitable for properties of a panel, especially an OLED panel, etc.

The OSD processor 340 generates an OSD signal according to a user input or by itself. For example, based on a user input signal, the OSD processor 340 may generate a signal for displaying various information as a graphic or a text on the screen of the display 180. The generated OSD signal may include various data such as a user interface screen of the image display apparatus 100, various menu screens, a widget, and an icon. In addition, the generated OSD signal may include a 2D object or a 3D object.

In addition, the OSD processor 340 may generate a pointer that may be displayed on the display, based on a pointing signal input from the remote controller 200. In particular, such a pointer may be generated by a pointing signal processor, and the OSD processor 340 may include such a pointing signal processor (not shown). Obviously, the pointing signal processor (not shown) may be provided separately from the OSD processor 340.

The frame rate converter (FRC) 350 may convert a frame rate of an input image. Meanwhile, the frame rate converter 350 may output the input image without converting the frame rate.

Meanwhile, the formatter 360 may change a format of an input image signal into a format suitable for displaying the image signal on a display and output the image signal in the changed format.

In particular, the formatter 360 may change a format of an image signal to correspond to a display panel.

The processor 330 may control overall operations of the image display apparatus 100 or the signal processor 170.

For example, the processor 330 may control the tuner 110 to control the tuning of an RF broadcast corresponding to a channel selected by a user or a previously stored channel.

In addition, the processor 330 may control the image display apparatus 100 according to a user command input through the user input interface 150 or an internal program.

In addition, the processor 330 may transmit data to the network interface 135 or to the external apparatus interface 130.

In addition, the processor 330 may control the demultiplexer 310, the image processor 320, and the like in the signal processor 170.

Meanwhile, the audio processor 370 in the signal processor 170 may perform the audio processing of the demultiplexed audio signal. To this end, the audio processor 370 may include various decoders.

In addition, the audio processor 370 in the signal processor 170 may process a base, a treble, a volume control, and the like.

The data processor (not shown) in the signal processor 170 may perform data processing of the demultiplexed data signal. For example, when the demultiplexed data signal is a coded data signal, it may be decoded. The encoded data signal may be electronic program guide information including broadcast information such as a start time and an end time of a broadcast program broadcasted on each channel.

Meanwhile, a block diagram of the signal processor 170 shown in FIG. 3 is a block diagram for an embodiment of the present disclosure. Each component of the block diagram may be integrated, added, or omitted according to a specification of the signal processor 170 actually implemented.

In particular, the frame rate converter 350 and the formatter 360 may be provided separately in addition to the image processor 320.

Figure 4A:
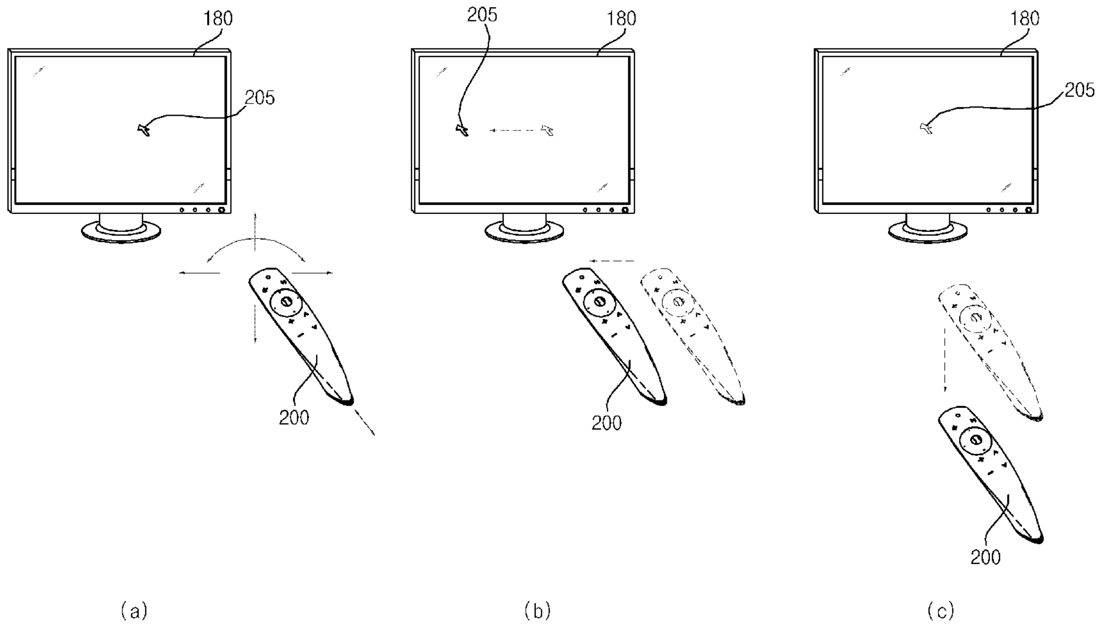
FIG. 4A is a diagram showing a method of controlling a remote controller of FIG. 2.

FIG. 4A is a diagram illustrating a control method of a remote controller of FIG. 2.

As shown in FIG. 4A(a), it is illustrated that a pointer 205 corresponding to the remote controller 200 is displayed on the display 180.

The user may move or rotate the remote controller 200 up and down, left and right (FIG. 4A(b)), and back and forth (FIG. 4A(c)). The pointer 205 displayed on the display 180 of the image display apparatus corresponds to the motion of the remote controller 200. Such a remote controller 200 may be referred to as a space remote controller or a 3D pointing apparatus, because the pointer 205 is moved and displayed according to the movement in a 3D space, as shown in the figure.

FIG. 4A(b) illustrates that when the user moves the remote controller 200 to the left, the pointer 205 displayed on the display 180 of the image display apparatus also moves to the left correspondingly.

Information on the motion of the remote controller 200 detected through a sensor of the remote controller 200 is transmitted to the image display apparatus. The image display apparatus may calculate the coordinate of the pointer 205 from the information on the motion of the remote controller 200. The image display apparatus may display the pointer 205 to correspond to the calculated coordinate.

FIG. 4A(c) illustrates a case where the user moves the remote controller 200 away from the display 180 while pressing a specific button of the remote controller 200. Thus, a selection area within the display 180 corresponding to the pointer 205 may be zoomed in so that it may be displayed to be enlarged. On the other hand, when the user moves the remote controller 200 close to the display 180, the selection area within the display 180 corresponding to the pointer 205 may be zoomed out so that it may be displayed to be reduced. Meanwhile, when the remote controller 200 moves away from the display 180, the selection area may be zoomed out, and when the remote controller 200 approaches the display 180, the selection area may be zoomed in.

Meanwhile, when the specific button of the remote controller 200 is pressed, it is possible to exclude the recognition of vertical and lateral movement. That is, when the remote controller 200 moves away from or approaches the display 180, the up, down, left, and right movements are not recognized, and only the forward and backward movements are recognized. Only the pointer 205 is moved according to the up, down, left, and right movements of the remote controller 200 in a state where the specific button of the remote controller 200 is not pressed.

Meanwhile, the moving speed or the moving direction of the pointer 205 may correspond to the moving speed or the moving direction of the remote controller 200.

Figure 4B:
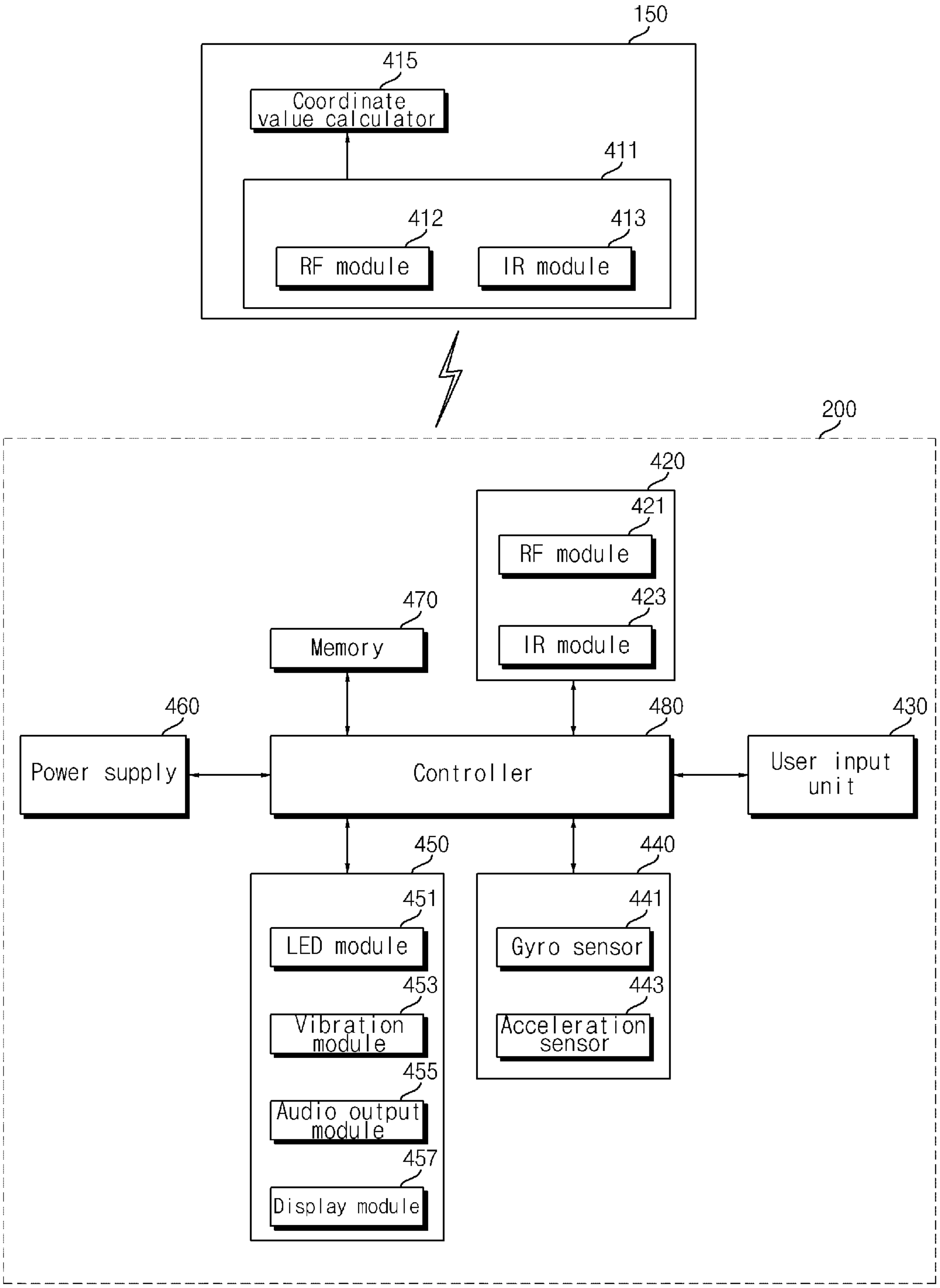
FIG. 4B is an internal block diagram of the remote controller of FIG. 2.

FIG. 4B is an internal block diagram of the remote controller of FIG. 2.

Referring to the figure, the remote controller 200 includes a wireless communication unit 425, a user input unit 435, a sensor unit 440, an output unit 450, a power supply 460, a memory 470, and a controller 480.

The wireless communication unit 425 transmits/receives a signal to/from any one of the image display apparatuses according to the embodiments of the present disclosure described above. Among the image display apparatuses according to the embodiments of the present disclosure, one image display apparatus 100 will be described as an example.

In the present embodiment, the remote controller 200 may include an RF module 421 for transmitting and receiving signals to and from the image display apparatus 100 according to a RF communication standard. In addition, the remote controller 200 may include an IR module 423 for transmitting and receiving signals to and from the image display apparatus 100 according to a IR communication standard.

In the present embodiment, the remote controller 200 transmits a signal containing information on the motion of the remote controller 200 to the image display apparatus 100 through the RF module 421.

In addition, the remote controller 200 may receive the signal transmitted by the image display apparatus 100 through the RF module 421. In addition, if necessary, the remote controller 200 may transmit a command related to power on/off, channel change, volume change, and the like to the image display apparatus 100 through the IR module 423.

The user input unit 435 may be implemented by a keypad, a button, a touch pad, a touch screen, or the like. The user may operate the user input unit 435 to input a command related to the image display apparatus 100 to the remote controller 200. When the user input unit 435 includes a hard key button, the user may input a command related to the image display apparatus 100 to the remote controller 200 through a push operation of the hard key button. When the user input unit 435 includes a touch screen, the user may touch a soft key of the touch screen to input the command related to the image display apparatus 100 to the remote controller 200. In addition, the user input unit 435 may include various types of input means such as a scroll key, a jog key, etc., which may be operated by the user, and the present disclosure does not limit the scope of the present disclosure.

The sensor unit 440 may include a gyro sensor 441 or an acceleration sensor 443. The gyro sensor 441 may sense information regarding the motion of the remote controller 200.

For example, the gyro sensor 441 may sense information on the operation of the remote controller 200 based on the x, y, and z axes. The acceleration sensor 443 may sense information on the moving speed of the remote controller 200. Meanwhile, a distance measuring sensor may be further provided, and thus, the distance to the display 180 may be sensed.

The output unit 450 may output an image or an audio signal corresponding to the operation of the user input unit 435 or a signal transmitted from the image display apparatus 100. Through the output unit 450, the user may recognize whether the user input unit 435 is operated or whether the image display apparatus 100 is controlled.

For example, the output unit 450 may include an LED module 451 that is turned on when the user input unit 435 is operated or a signal is transmitted/received to/from the image display apparatus 100 through the wireless communication unit 425, a vibration module 453 for generating a vibration, an audio output module 455 for outputting an audio, or a display module 457 for outputting an image.

The power supply 460 supplies power to the remote controller 200. When the remote controller 200 is not moved for a certain time, the power supply 460 may stop the supply of power to reduce a power waste. The power supply 460 may resume power supply when a certain key provided in the remote controller 200 is operated.

The memory 470 may store various types of programs, application data, and the like necessary for the control or operation of the remote controller 200. If the remote controller 200 wirelessly transmits and receives a signal to/from the image display apparatus 100 through the RF module 421, the remote controller 200 and the image display apparatus 100 transmit and receive a signal through a certain frequency band. The controller 480 of the remote controller 200 may store information regarding a frequency band or the like for wirelessly transmitting and receiving a signal to/from the image display apparatus 100 paired with the remote controller 200 in the memory 470 and may refer to the stored information.

The controller 480 controls various matters related to the control of the remote controller 200. The controller 480 may transmit a signal corresponding to a certain key operation of the user input unit 435 or a signal corresponding to the motion of the remote controller 200 sensed by the sensor unit 440 to the image display apparatus 100 through the wireless communication unit 425.

The user input interface 150 of the image display apparatus 100 includes a wireless communication unit 151 that may wirelessly transmit and receive a signal to and from the remote controller 200 and a coordinate value calculator 415 that may calculate the coordinate value of a pointer corresponding to the operation of the remote controller 200.

The user input interface 150 may wirelessly transmit and receive a signal to and from the remote controller 200 through the RF module 412. In addition, the user input interface 150 may receive a signal transmitted by the remote controller 200 through the IR module 413 according to a IR communication standard.

The coordinate value calculator 415 may correct a hand shake or an error from a signal corresponding to the operation of the remote controller 200 received through the wireless communication unit 151 and calculate the coordinate value (x, y) of the pointer 205 to be displayed on the display 180.

The transmission signal of the remote controller 200 inputted to the image display apparatus 100 through the user input interface 150 is transmitted to the controller 180 of the image display apparatus 100. The controller 180 may determine the information on the operation of the remote controller 200 and the key operation from the signal transmitted from the remote controller 200, and, correspondingly, control the image display apparatus 100.

For another example, the remote controller 200 may calculate the pointer coordinate value corresponding to the operation and output it to the user input interface 150 of the image display apparatus 100. In this case, the user input interface 150 of the image display apparatus 100 may transmit information on the received pointer coordinate value to the controller 180 without a separate correction process of hand shake or error.

For another example, unlike the figure, the coordinate value calculator 415 may be provided in the signal processor 170, not in the user input interface 150.

Figure 5:
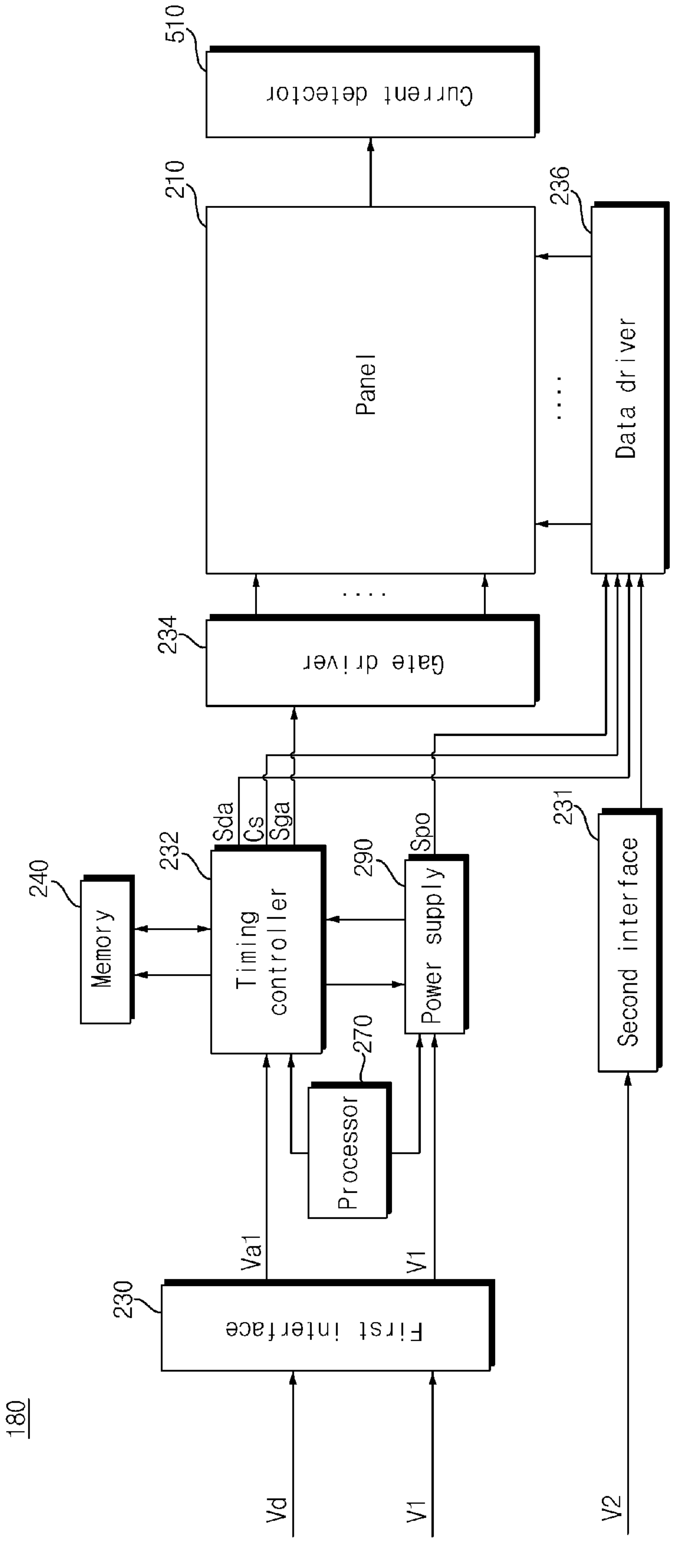
FIG. 5 is an internal block diagram of a display of FIG. 2.

FIG. 5 is an internal block diagram of a display of FIG. 2.

Referring to FIG. 5, the organic light emitting diode panel-based display 180 may include an organic light emitting diode panel 210, a first interface 230, a second interface 231, a timing controller 232, a gate driver 234, a data driver 236, a memory 240, a processor 270, a power supply 290, a current detector 510, and the like.

The display 180 receives an image signal Vd, a first DC power V1, and a second DC power V2, and may display a certain image based on the image signal Vd.

Meanwhile, the first interface 230 in the display 180 may receive the image signal Vd and the first DC power V1 from the signal processor 170.

Here, the first DC power V1 may be used for the operation of the power supply 290 and the timing controller 232 in the display 180.

Next, the second interface 231 may receive a second DC power V2 from an external power supply 190. Meanwhile, the second DC power V2 may be input to the data driver 236 in the display 180.

The timing controller 232 may output a data driving signal Sda and a gate driving signal Sga, based on the image signal Vd.

For example, when the first interface 230 converts the input image signal Vd and outputs the converted image signal va1, the timing controller 232 may output the data driving signal Sda and the gate driving signal Sga based on the converted image signal va1.

The timing controller 232 may further receive a control signal, a vertical synchronization signal Vsync, and the like, in addition to the image signal Vd from the signal processor 170.

In addition to the image signal Vd, based on a control signal, a vertical synchronization signal Vsync, and the like, the timing controller 232 generates a gate driving signal Sga for the operation of the gate driver 234, and a data driving signal Sda for the operation of the data driver 236.

At this time, when the panel 210 includes a RGBW subpixel, the data driving signal Sda may be a data driving signal for driving of RGBW subpixel.

Meanwhile, the timing controller 232 may further output a control signal Cs to the gate driver 234.

The gate driver 234 and the data driver 236 supply a scan signal and an image signal to the organic light emitting diode panel 210 through a gate line GL and a data line DL respectively, according to the gate driving signal Sga and the data driving signal Sda from the timing controller 232. Accordingly, the organic light emitting diode panel 210 displays a certain image.

Meanwhile, the organic light emitting diode panel 210 may include an organic light emitting layer. In order to display an image, a plurality of gate lines GL and data lines DL may be disposed in a matrix form in each pixel corresponding to the organic light emitting layer.

Meanwhile, the data driver 236 may output a data signal to the organic light emitting diode panel 210 based on a second DC power V2 from the second interface 231.

The power supply 290 may supply various power supplies to the gate driver 234, the data driver 236, the timing controller 232, and the like.

The current detector 510 may detect the current flowing in a sub-pixel of the organic light emitting diode panel 210. The detected current may be input to the processor 270 or the like, for a cumulative current calculation.

The processor 270 may perform each type of control of the display 180. For example, the processor 270 may control the gate driver 234, the data driver 236, the timing controller 232, and the like.

Meanwhile, the processor 270 may receive current information flowing in a sub-pixel of the organic light emitting diode panel 210 from the current detector 510.

In addition, the processor 270 may calculate the accumulated current of each subpixel of the organic light emitting diode panel 210, based on information of current flowing through the subpixel of the organic light emitting diode panel 210. The calculated accumulated current may be stored in the memory 240.

Meanwhile, the processor 270 may determine as burn-in, if the accumulated current of each sub-pixel of the organic light emitting diode panel 210 is equal to or greater than an allowable value.

For example, if the accumulated current of each subpixel of the OLED panel 210 is equal to or higher than 300000 A, the processor 270 may determine that a corresponding subpixel is a burn-in subpixel.

Meanwhile, if the accumulated current of each subpixel of the OLED panel 210 is close to an allowable value, the processor 270 may determine that a corresponding subpixel is a subpixel expected to be burn in.

Meanwhile, based on a current detected by the current detector 510, the processor 270 may determine that a subpixel having the greatest accumulated current is an expected burn-in subpixel.

Figure 6A:
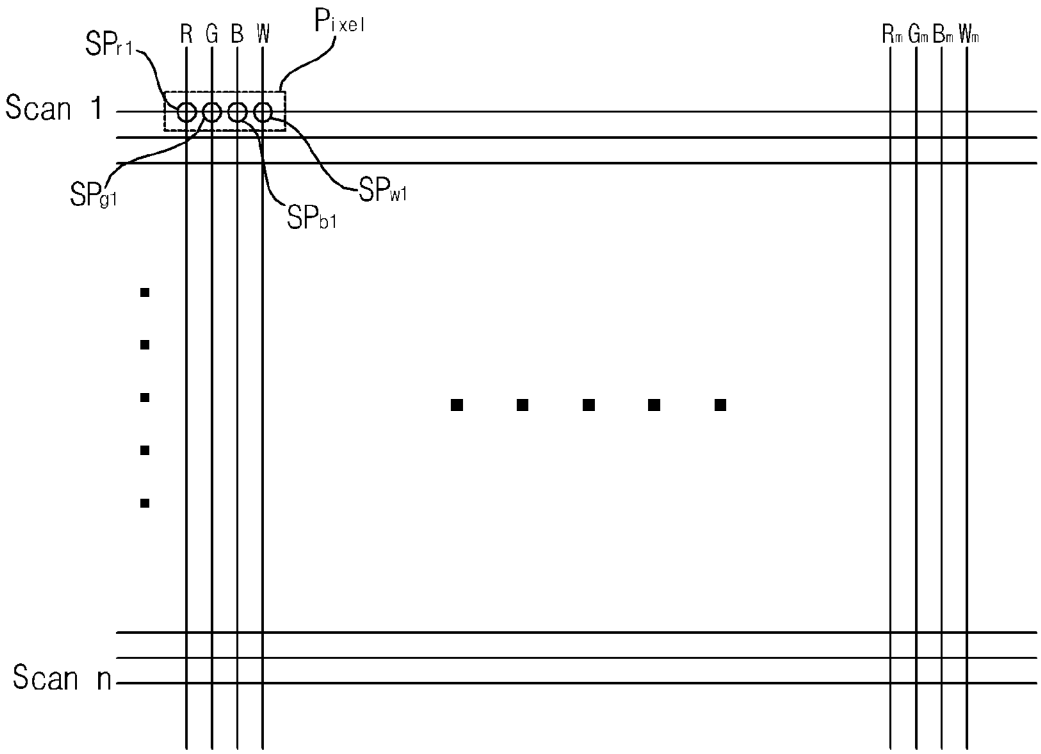
FIGS. 6A and 6B are diagrams referred to in the description of an organic light emitting diode panel of FIG. 5.
Figure 6B:
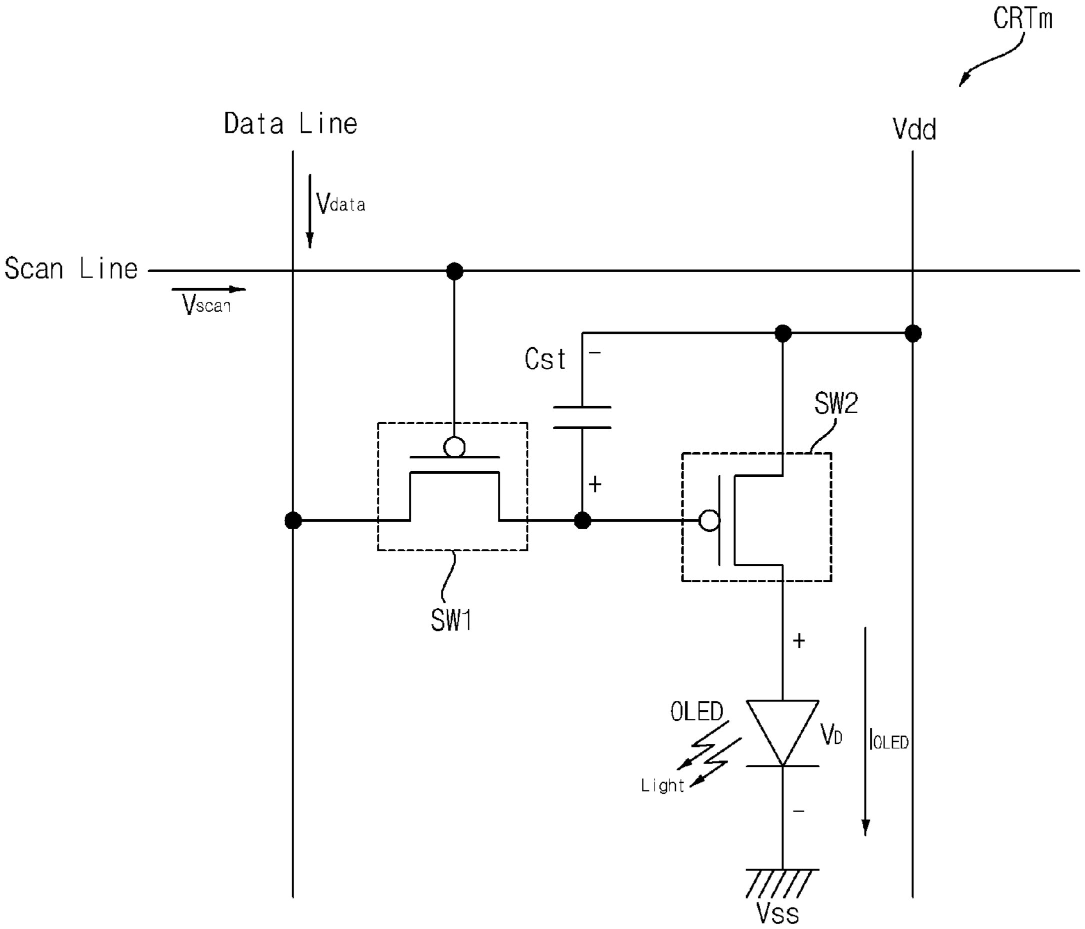

FIG. 6A and FIG. 6B are diagrams referred to in the description of an organic light emitting diode panel of FIG. 5.

Firstly, FIG. 6A is a diagram illustrating a pixel in the organic light emitting diode panel 210.

Referring to the figure, the organic light emitting diode panel 210 may include a plurality of scan lines Scan1 to Scann and a plurality of data lines R1, G1, B1, W1 to Rm, Gm, Bm, Wm intersecting the scan lines.

Meanwhile, a pixel (subpixel) is defined in an intersecting area of the scan line and the data line in the organic light emitting diode panel 210. In the figure, a pixel including sub-pixels SR1, SG1, SB1 and SW1 of RGBW is shown.

FIG. 6B illustrates a circuit of any one sub-pixel in the pixel of the organic light emitting diode panel of FIG. 6A.

Referring to the figure, an organic light emitting sub pixel circuit (CRTm) may include, as an active type, a scan switching element SW1, a storage capacitor Cst, a drive switching element SW2, and an organic light emitting layer (OLED).

The scan switching element SW1 is turned on according to the input scan signal Vdscan, as a scan line is connected to a gate terminal. When it is turned on, the input data signal Vdata is transferred to the gate terminal of a drive switching element SW2 or one end of the storage capacitor Cst.

The storage capacitor Cst is formed between the gate terminal and the source terminal of the drive switching element SW2, and stores a certain difference between a data signal level transmitted to one end of the storage capacitor Cst and a DC power (VDD) level transmitted to the other terminal of the storage capacitor Cst.

For example, when the data signal has a different level according to a Plume Amplitude Modulation (PAM) method, the power level stored in the storage capacitor Cst varies according to the level difference of the data signal Vdata.

For another example, when the data signal has a different pulse width according to a Pulse Width Modulation (PWM) method, the power level stored in the storage capacitor Cst varies according to the pulse width difference of the data signal Vdata.

The drive switching element SW2 is turned on according to the power level stored in the storage capacitor Cst. When the drive switching element SW2 is turned on, the driving current (IOLED), which is proportional to the stored power level, flows in the organic light emitting layer (OLED).

Accordingly, the organic light emitting layer OLED performs a light emitting operation.

The organic light emitting layer OLED may include a light emitting layer (EML) of RGBW corresponding to a subpixel, and may include at least one of a hole injecting layer (HIL), a hole transporting layer (HTL), an electron transporting layer (ETL), and an electron injecting layer (EIL). In addition, it may include a hole blocking layer, and the like.

Meanwhile, the subpixels emit a white light in the organic light emitting layer OLED. However, in the case of green, red, and blue subpixels, a subpixel is provided with a separate color filter for color implementation. That is, in the case of green, red, and blue subpixels, each of the subpixels further includes green, red, and blue color filters. Meanwhile, since a white subpixel outputs a white light, a separate color filter is not required.

Meanwhile, in the figure, it is illustrated that a p-type MOSFET is used for a scan switching element SW1 and a drive switching element SW2, but an n-type MOSFET or other switching element such as a JFET, IGBT, SIC, or the like are also available.

Meanwhile, the pixel is a hold-type element that continuously emits light in the organic light emitting layer (OLED), after a scan signal is applied, during a unit display period, specifically, during a unit frame.

Meanwhile, with development of camera and broadcast technologies, resolution and vertical synchronization frequencies of input image signals have improved as well. In particular, there is increasing need for signal processing of image signals having 4K resolution or higher and 120 Hz vertical resolution or higher. This will be described with reference to FIG. 7A and the subsequent figures.

Figure 7A:
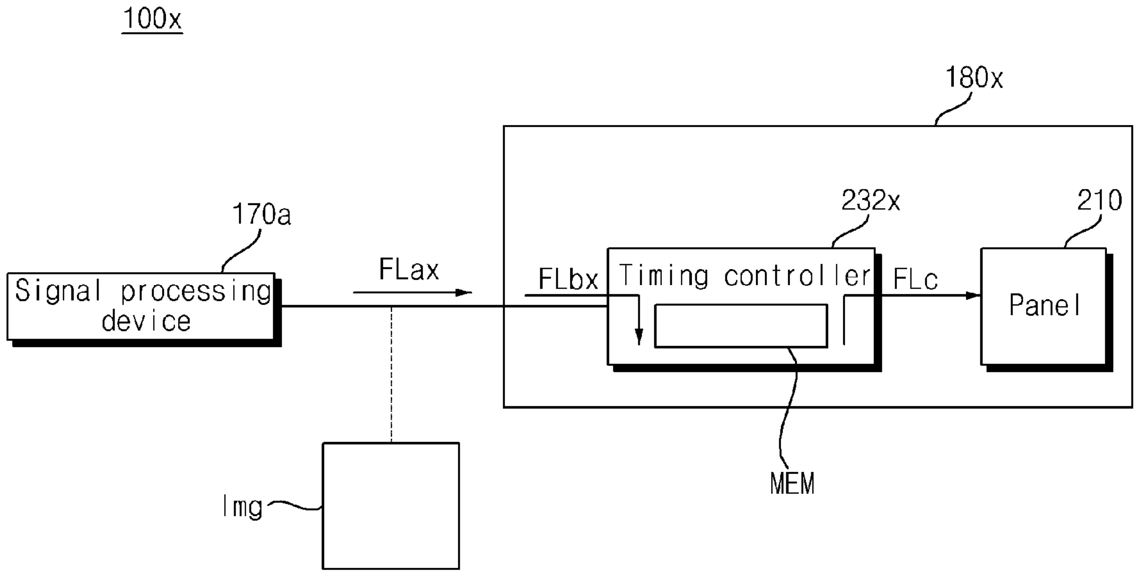
FIG. 7A is a simplified block diagram of an image display apparatus relating to the present disclosure.
Figure 7B:
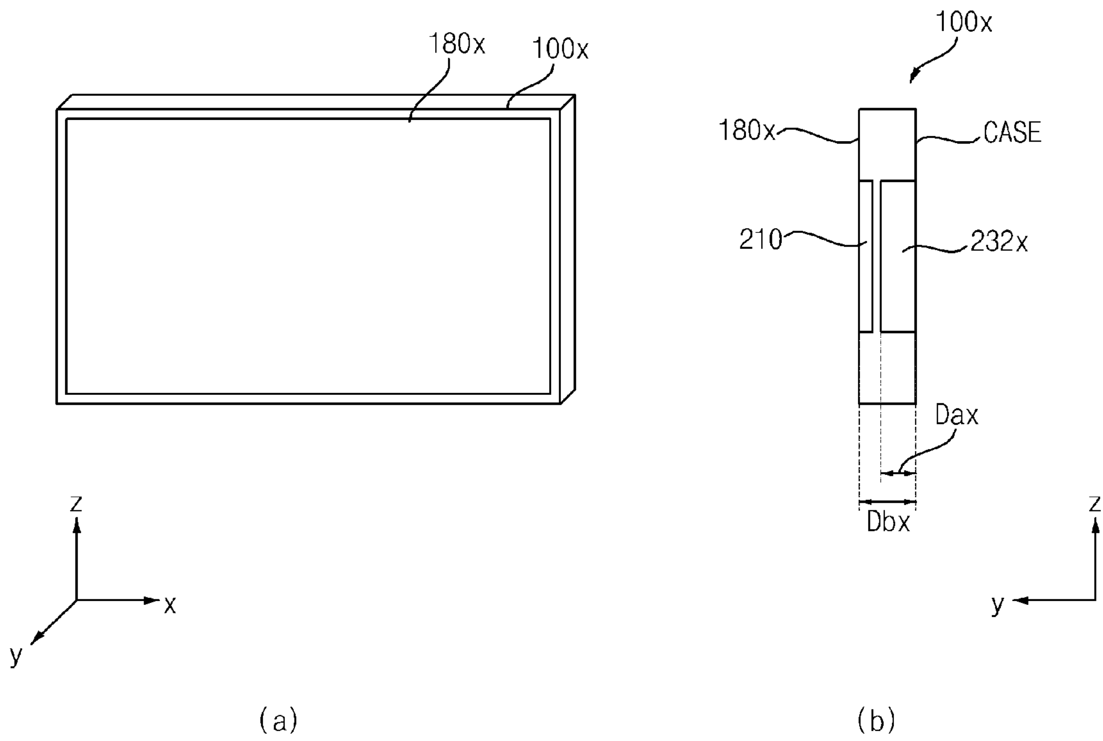
FIG. 7B is a front view and a side view of the image display apparatus of FIG. 7A.

FIG. 7A is a simplified block diagram of an image display apparatus relating to the present disclosure and FIG. 7B is a front view and a side view of the image display apparatus of FIG. 7A.

Referring to the figures, an image display apparatus 100*x* relating to the present disclosure includes a signal processing device 170*a* and a display 180*x*.

The signal processing device 170*a* processes an input image signal and outputs the signal-processed image Img.

The display 180*x* includes a timing controller 232X and a panel 210. The timing controller 232X receives the image Img from the signal processing device 170*a*, processes the image Img and provides the processed image Img to the panel.

In particular, when the signal processing device 170*a* outputs the image Img at a first time, the timing controller 232X may receive the image Img at a second time, stores the received image Img in an internal memory MEM and output the image Img to the panel 210 at a third time. Here, the first to third times may be times in units of a frame.

That is, when the timing controller 232X in the display 180*x* includes the memory MEM, the timing controller 232X may store data related to the image Img in the memory MEM, perform signal processing thereon, and output image data, for example, RGB data or RGBW data to the panel 210.

In this manner, when the timing controller 232X includes the memory MEM, the thickness of the timing controller 232X is Dax and the thickness of the image display apparatus 100*x* is Dbx, as shown in FIG. 7B(b), and thus it may be difficult to realize a slim image display apparatus.

Accordingly, the operation of the signal processing device 170 in a case where the timing controller 232X does not include the memory MEM is described in the present disclosure. This will be described with reference to FIG. 9A and the subsequent figures.

Figure 8A:
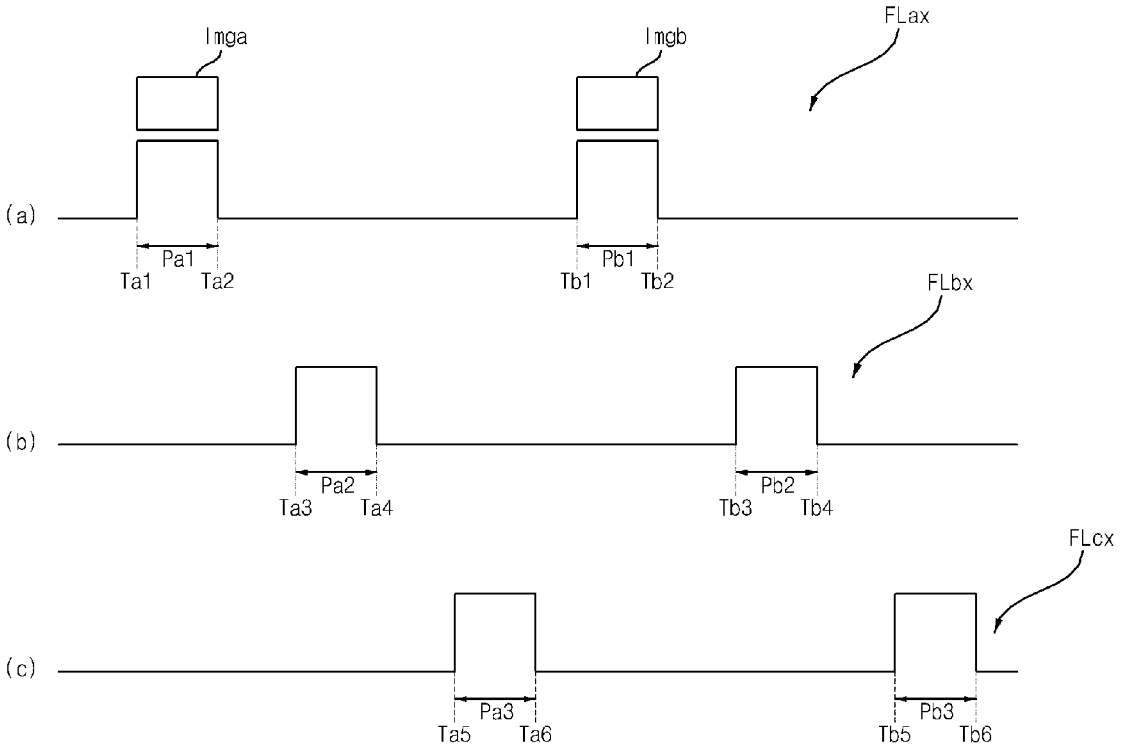
FIGS. 8A to 8C are diagrams referred to in the description of operation of the image display apparatus of FIG. 7A.
Figure 8B:
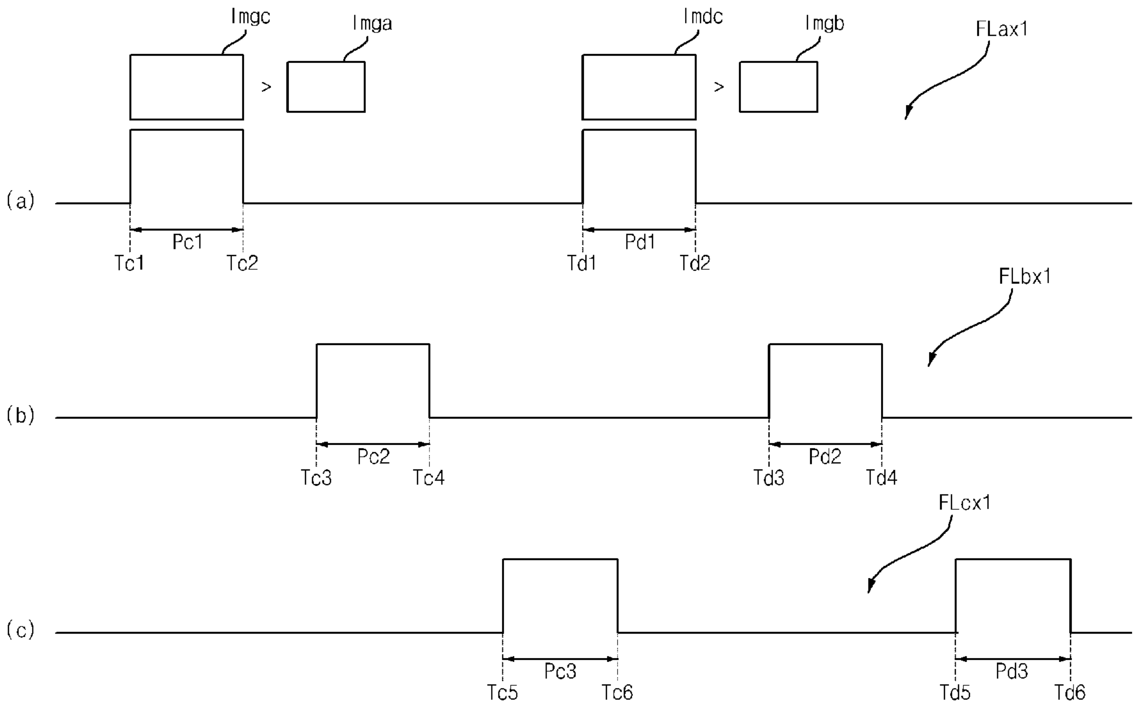
Figure 8C:
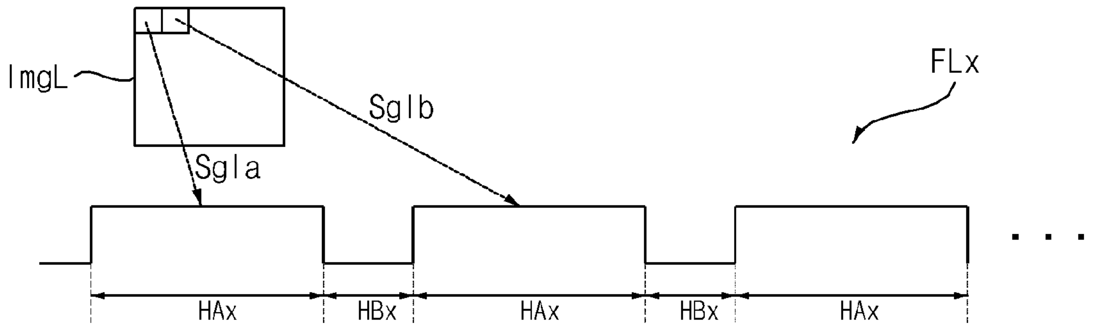

FIGS. 8A to 8C are diagrams referred to in the description of the operation of the image display apparatus of FIG. 7A.

First, FIG. 8A(a) illustrates that the signal processing device 170*a* outputs an n frame image Imga in a period Pa1 between a time Ta1 and a time Ta2 and outputs an n+1 frame image Imgb in a period Pb1 between a time Tb1 and a time Tb2.

Next, FIG. 8A(b) illustrates that the n frame image Imga is stored in the memory MEM in the timing controller 232X in a period Pa2 between a time Ta3 and a time Ta4, and the n+1 frame image Imgb is stored in the memory MEM in the timing controller 232X in a period Pb2 between a time Tb3 and a time Tb4.

Next, FIG. 8A(c) illustrates that the n frame image Imga is output from the memory MEM in the timing controller 232X to the panel 210 in a period Pa3 between a time Ta5 and a time Ta6, and the n+1 frame image Imgb is output from the memory MEM in the timing controller 232X to the panel 210 in a period Pb3 between a time Tb5 and a time Tb6.

FIG. 8B illustrates that the signal processing device 170*a* outputs frame images, the frame images are stored in the memory MEM in the timing controller 232X, and the frame images are output from the memory MEM in the timing controller 232X to the panel 210 similar to FIG. 8A.

However, the size of the frame images in FIG. 8B is greater than the size of the frame images in FIG. 8A. Accordingly, FIG. 8B differs from FIG. 8A in that output periods and storage periods are greater than those in FIG. 8A.

That is, FIG. 8B(a) illustrates that a signal processing device 170*c* outputs an n frame image Imgc in a period Pc1 between a time Tc1 and a time Tc2 and outputs an n+1 frame image Imgd in a period Pd1 from a time Td1 and a time Td2.

Next, FIG. 8B(b) illustrates that the n frame image Imgc is stored in the memory MEM in the timing controller 232X in a period Pc2 between a time Tc3 and a time Tc4, and the n+1 frame image Imgd is stored in the memory MEM in the timing controller 232X in a period Pd2 between a time Td3 and a time Td4.

Next, FIG. 8B(c) illustrates that the n frame image Imgc is output from the memory MEM in the timing controller 232X to the panel 210 in a period Pc3 between a time Tc5 and a time Tc6, and the n+1 frame image Imgd is output from the memory MEM in the timing controller 232X to the panel 210 in a period Pd3 between a time Td5 and a time Td6.

That is, when the resolution of an image increases and thus an image size increases, as shown in FIG. 8B, if frame images are stored in the memory MEM in the timing controller 232X and then output, a considerable time is required.

FIG. 8C illustrates a data enable signal FLx in the signal processing device 170*a* when the timing controller 232X does not include the memory MEM.

As shown, a frame image ImgL is transmitted in active periods HAx from among the active periods HAx and blank periods HBx in the data enable signal FLx. When the timing controller 232X does not include the memory MEM, unlike the case of FIG. 7A, the timing controller 232X needs to process received frame data in real time without storing the same, resulting in increase in the amount of arithmetic operations for signal processing.

Accordingly, the present disclosure proposes a method by which the signal processing device 170 outputs first image frame data and scaled down second image frame when the timing controller 232X does not include the memory MEM. This will be described with reference to FIG. 9A and the subsequent figures.

Figure 9A:
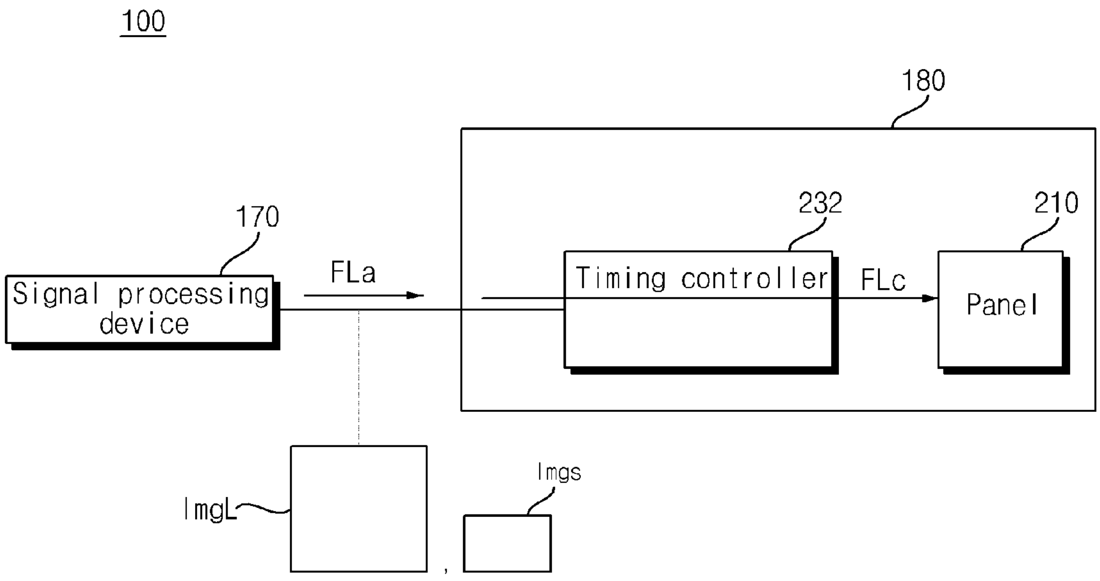
FIG. 9A is a simplified block diagram of the image display apparatus according to an embodiment of the present disclosure.
Figure 9B:
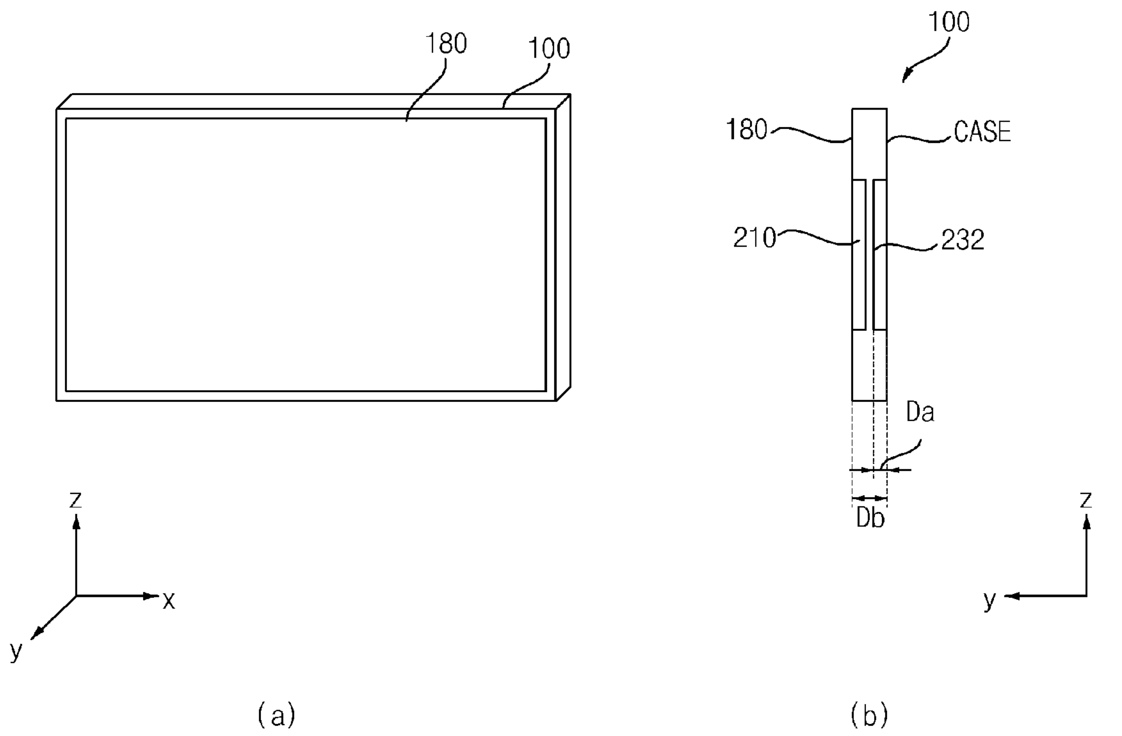
FIG. 9B is a front view and a side view of the image display apparatus of FIG. 9A.

FIG. 9A is a simplified block diagram of the image display apparatus according to an embodiment of the present disclosure and FIG. 9B is a front view and a side view of the image display apparatus of FIG. 9A.

Referring to the figures, the image display apparatus 100 according to an embodiment of the present disclosure includes the signal processing device 170 and the display 180.

The signal processing device 170 according to an embodiment of the present disclosure processes an external image signal to output first image frame data ImgL and second image frame data ImgS obtained by scaling down the first image frame data ImgL.

In particular, the signal processing device 170 outputs the first image frame data ImgL and the second image frame data ImgS such that a transmission completion time of the second image frame data ImgS precedes a transmission completion time of the first image frame data ImgL.

Specifically, the first image frame data ImgL regarding an n−1 image frame and the second image frame data ImgS regarding an n image frame may be output together.

Meanwhile, the display 180 includes the timing controller 232 and the panel 210, and the timing controller 232 receives an image from the signal processing device 170, processes the image and provides the processed image to the panel.

In particular, the timing controller 232 does not include a memory MEM and does not store frame image data in the memory MEM.

Accordingly, the timing controller 232 according to an embodiment of the present disclosure ascertains the first image frame data using the second image frame data between the first image frame data and the second image frame data received from the signal processing device 170 and performs signal processing on the first image frame data.

In addition, the timing controller 232 may output the signal-processed first image frame data, for example, RGB data or RGBW data, to the panel 210.

When the timing controller 232 does not include the memory MEM, as described above, the thickness of the timing controller 232 is Da less than Dax in FIG. 7B and the thickness of the image display apparatus 100 is Db less than Dbx in FIG. 7B, and thus a slim image display apparatus may be realized, as shown in FIG. 9B(b).

Meanwhile, the timing controller 232 receives the first image frame data ImgL and the second image frame data ImgS from the signal processing device 170 and, particularly, receives the second image frame data ImgS prior to the first image frame data ImgL.

For example, the timing controller 232 may receive the first image frame data ImgL regarding the n−1 image frame and the second image frame data ImgS regarding the n image frame at a first time and receive the first image frame data ImgL regarding the n image frame and the second image frame data ImgS regarding the n+1 image frame at a second time.

Accordingly, the timing controller 232 may extract information regarding the first image frame data ImgL regarding the n image frame using the previously received second image frame data ImgS regarding the n image frame, process the first image frame data ImgL based on the extracted information after the second time, and output a signal regarding the processed first image frame data ImgL to the panel 210.

Accordingly, signal processing for the panel 210 may be accurately and rapidly performed in the timing controller 232 including no memory. In addition, the panel 210 may be prevented from being damaged.

Meanwhile, the timing controller 232 may extract information regarding the first image frame data ImgL based on the second image frame data ImgS from the signal processing device 170, decrease the luminance level of the first image frame data ImgL from a first level to a second level such that a power level consumed in the panel 210 becomes equal to or less than an allowable value when power information based on luminance information in the extracted information exceeds a reference value, and output a signal regarding the first image frame data ImgL with the second luminance level to the panel 210. Accordingly, the timing controller 232 may accurately and rapidly perform signal processing for the panel 210. In particular, the timing controller 232 may accurately and rapidly perform signal processing for reducing power consumption. Further, a memory 540 may be eliminated from the timing controller 232.

Meanwhile, the timing controller 232 may control the power level consumed in the panel 210 such that it becomes equal to or less than the allowable value based on the luminance information in the extracted information. Accordingly, power consumption of the image display apparatus may be reduced.

For example, the timing controller 232 may control the power level consumed in the panel 210 such that it becomes equal to or less than the allowable value when the luminance information in the extracted information exceeds a luminance reference value or a current reference value. Accordingly, the timing controller 232 may accurately and rapidly perform signal processing for power consumption reduction.

Meanwhile, when the luminance information in the extracted information exceeds the luminance reference value or the current reference value, the timing controller 232 may decrease the luminance level of the first image frame data ImgL from the first level to the second level and output a signal regarding the first image frame data ImgL with the second luminance level to the panel 210. Accordingly, the timing controller 232 may accurately and rapidly perform signal processing for power consumption reduction.

Meanwhile, when luminance information of the image frame of the first image frame data ImgL exceeds the luminance reference value or the current reference value based on the extracted information, the timing controller 232 may decrease the luminance level of the image frame of the first image frame data ImgL from the first level to the second level and output a signal regarding the image frame of the first image frame data ImgL which has the second luminance level to the panel 210. Accordingly, the timing controller 232 may accurately and rapidly perform signal processing for power consumption reduction.

Meanwhile, when power information according to luminance information regarding a part of the first image frame data ImgL exceeds a reference value based on the extracted information, the timing controller 232 may decrease the luminance level of the part of the first image frame data ImgL from the first level to the second level and output a signal regarding the part of the first image frame data ImgL which has the second luminance level to the panel 210.

Accordingly, the timing controller 232 may accurately and rapidly perform signal processing for power consumption reduction.

Meanwhile, the timing controller 232 may receive the first image frame data ImgL and the second image frame data ImgS, perform signal processing on the first image frame data ImgL based on the second image frame data ImgS, and control the processed first image frame data ImgL such that it is displayed on the panel 210 when an image output mode of the signal processing device 170 is a first mode, and perform signal processing on the received first image frame data ImgL without information regarding the second image frame data ImgS and control the processed first image frame data ImgL such that it is displayed on the panel 210 when the image output mode of the signal processing device 170 is a second mode. Accordingly, the timing controller 232 may accurately and rapidly perform signal processing for the panel 210.

Figure 10:
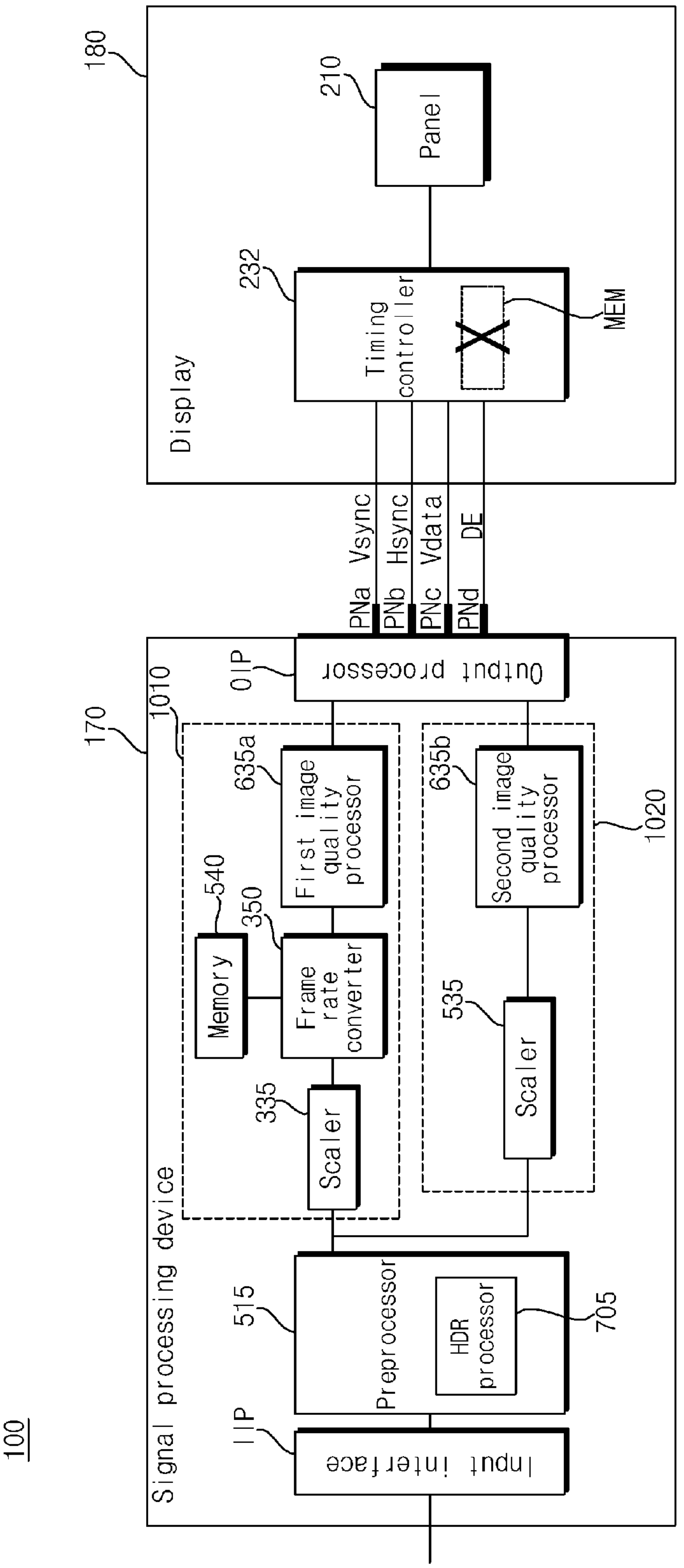
FIG. 10 is a detailed block diagram of the image display apparatus according to an embodiment of the present disclosure.

FIG. 10 is a detailed block diagram of the image display apparatus according to an embodiment of the present disclosure.

Referring to the figure, the image display apparatus 100 according to an embodiment of the present disclosure includes the signal processing device 170 and the display 180.

The signal processing device 170 according to an embodiment of the present disclosure may include an input interface IIP which receives an external image signal, a first image processor 1010 which generates the first image frame data ImgL based on the image signal, a second image processor 1020 which generates the second image frame data ImgS based on the image signal, and an output interface OIP which receives the first image frame data ImgL from the first image processor 1010 and the second image frame data ImgS from the second image processor 1020 and outputs the first image frame data ImgL and the second image frame data ImgS.

Meanwhile, it is desirable that the first image frame data ImgL output from the output interface OIP be delayed from the second image frame data ImgS and output.

Accordingly, the timing controller 232 may extract information from the second image frame data ImgS output first and accurately and rapidly perform signal processing on the subsequently received first image frame data ImgL based on the extracted information. In particular, the timing controller 232 may accurately and rapidly perform signal processing for power consumption reduction.

Meanwhile, the output interface OIP outputs the first image frame data ImgL and the second image frame data ImgS such that a transmission completion time of the second image frame data ImgS precedes a transmission completion time of the second image frame data ImgL. Accordingly, the timing controller 232 may accurately and rapidly perform signal processing for the panel 210.

Meanwhile, the second image processor 1020 may output data with the same resolution as that of the first image frame data ImgL.

Alternatively, the second image processor 1020 may output data with a resolution lower than that of the first image frame data ImgL.

To this end, the second image processor 1020 may generate the second image frame data ImgS scaled down from the first image frame data ImgL and output the second image frame data ImgS.

Meanwhile, the input interface IIP may receive image signals from the computer PC, the mobile terminal 600, the set-top box STB, the game console GSB, and the server SVR in FIG. 1.

For example, when an image signal encoded according to transmission standards is received, the input interface IIP may perform decoding according to the transmission standards.

Meanwhile, the signal processing device 170 according to an embodiment of the present disclosure may further include a preprocessor 515 which performs signal processing such as noise reduction, noise removal and HDR signal processing on an image signal from the input interface IIP.

The preprocessor 515 performs signal processing on the image signal from the input interface IIP. For example, when the received image signal is a decoded image signal, the preprocessor 515 may perform signal processing such as noise removal without additional decoding processing.

As another example, when the received image signal is an image signal encoded according to video compression standards, the preprocessor 515 may perform decoding according to the video compression standards after signal processing such as noise removal.

Meanwhile, when the received image signal is an HDR image signal, the preprocessor 515 may perform HDR signal processing. To this end, the preprocessor 515 may include an HDR processor 705.

The HDR processor 705 may receive an image signal and perform high dynamic range (HDR) processing on the input image signal.

For example, the HDR processor 705 may convert a standard dynamic range (SDR) image signal into an HDR image signal.

As another example, the HDR processor 705 may receive an image signal and perform grayscale processing on the input image signal for high dynamic range.

The HDR processor 705 may bypass grayscale conversion when the input image signal is an SDR image signal and may perform grayscale conversion when the input image signal is an HDR image signal. Accordingly, the timing controller may accurately and rapidly perform signal processing for the panel.

Meanwhile, the HDR processor 705 may perform grayscale conversion processing based on a first grayscale conversion mode in which low grayscale is emphasized and high grayscale is saturated or a second grayscale conversion mode in which low grayscale and high grayscale are uniformly converted.

The signal processing device 170 according to an embodiment of the present disclosure may further include the memory 540 in which frame data for image processing of the first image processor 1010 is stored.

Alternatively, the memory 540 may be included in the first image processor 1010, as shown in the figure. That is, the first image processor 1010 in the signal processing device 170 according to an embodiment of the present disclosure may include the memory 540 for storing frame data for image processing.

Meanwhile, since frame data is stored in the memory 540 and then read, the first image frame data ImgL is more delayed than the second image frame data ImgS and output. Accordingly, the timing controller 232 may accurately and rapidly perform signal processing for the panel 210.

The second image processor 1020 may not include a memory to store frame data.

In addition, the second image processor 1020 does not perform an operation regarding frame data storage and thus may not use a memory.

Accordingly, the memory 540 may output the first image frame data ImgL after output of the second image frame data ImgS.

Alternatively, the first image processor 1010 may output the first image frame data ImgL after output of the second image frame data ImgS.

The first image processor 1010 may generate the first image frame data ImgL and output the same based on an image signal processed in the preprocessor 515.

To this end, the first image processor 1010 may include a scaler 335 which performs scaling so that the resolution of an image signal is consistent with the resolution of the panel, a frame rate converter 350 which operates to change a frame rate, and an image quality processor 635*a* which performs image quality processing.

The first image processor 1010 may further include the memory 540 for storing frame data for frame rate change in the frame rate converter 350.

The second image processor 1020 may include a scaler 535 for scaling down an input image signal, and a second image quality processor 635*b* which performs image quality processing.

Meanwhile, the scaler 535 may generate the second image frame data ImgS scaled down from the first image frame data ImgL based on an image signal.

The scaler 535 may generate at least one super pixel 714 or super block 724 based on an image block of the image signal and output the scaled down second image frame data ImgS including the super pixel 714 or the super block 724. Accordingly, the scaler 535 may generate the second image frame data ImgS with reduced error which is scaled down from the first image frame data ImgL.

Meanwhile, the scaler 535 may change the size of the super pixel 714 or super block 724 according to the resolution of the image signal or an image size. Accordingly, the second image frame data ImgS with reduced error which is scaled down from the first image frame data ImgL may be generated.

Meanwhile, the first image quality processor 635*a* may perform image quality processing on the first image frame data ImgL and the second image quality processor 635*b* may perform image quality processing on the second image frame data ImgS.

For example, the first image quality processor 635*a* and the second image quality processor 635*b* may perform signal processing such as noise reduction, three-dimensional effect enhancement signal processing, luminance amplification, and luminance extension.

Meanwhile, the output interface OIP may respectively receive the first image frame data ImgL and the second image frame data ImgS from the first image quality processor 635*a* and the second image quality processor 645*b*.

Further, the output interface OIP may delay the first image frame data ImgL from the second image frame data ImgS and output the delayed first image frame data ImgL. Accordingly, the timing controller 232 may accurately and rapidly perform signal processing for the panel 210.

When the output first image frame data ImgL is n frame data, the output interface OIP may output frame data after the n frame data as the second image frame data ImgS. Accordingly, the timing controller 232 may accurately and rapidly perform signal processing for the panel 210.

Further, the output interface OIP may simultaneously output the first image frame data ImgL regarding an n−1 image frame and the second image frame data ImgS regarding an n image frame. Accordingly, the timing controller 232 may accurately and rapidly perform signal processing for the panel 210.

Meanwhile, the output interface OIP may include a first output terminal PNa for transmission of a vertical synchronization signal Vsync, a second output terminal PNb for transmission of a horizontal synchronization signal Hsync, a third output terminal PNc for transmission of an image data signal Vdata, and a fourth output terminal PNd for transmission of a data enable signal DE.

The output interface OIP may transmit the first image frame data ImgL and the second image frame data ImgS through the third output terminal PNc. That is, the first image frame data ImgL and the second image frame data ImgS may be output through the same transmission line.

Meanwhile, the data enable signal DE may be divided into active periods HA and blank periods HB.

The timing controller 232 may receive the image data signal Vdata output from the third output terminal PNc in response to the active period HA of the data enable signal DE.

In particular, the timing controller 232 may receive image data regarding the first image frame data and data regarding the second image frame data in the image data signal Vdata, which correspond to the active period HA of the data enable signal DE.

Meanwhile, the output interface OIP sets active periods such that a second active period of a second data enable signal when both the first image frame data ImgL and the second image frame data ImgS are output is greater than a first active period of a first data enable signal when only the first image frame data ImgL is output.

That is, the output interface OIP sets active periods such that the second active period of the second data enable signal when both the first image frame data ImgL and the second image frame data ImgS are output is greater than the first active period of the first data enable signal when only the first image frame data ImgL is output. Accordingly, the first image frame data ImgL and the second image frame data ImgS may be output through the same transmission line.

Further, the output interface OIP sets blank periods such that a second blank period of the second data enable signal when both the first image frame data ImgL and the second image frame data ImgS are output is less than a first blank period of the first data enable signal when only the first image frame data ImgL is output. Accordingly, the first image frame data ImgL and the second image frame data ImgS may be output through the same transmission line. In addition, the first image frame data ImgL is more delayed than the second image frame data ImgS and output.

The output interface OIP may set the length of the active period HA of the data enable signal DE based on resolution information of the panel 210 and the driving frequency of the panel 210. Accordingly, the first image frame data ImgL and the second image frame data ImgS may be output through the same transmission line. In addition, the first image frame data ImgL is more delayed than the second image frame data ImgS and output.

For example, the output interface OIP may control the active period HA such that the length of the active period HA decreases as the driving frequency of the panel 210 increases. Accordingly, the first image frame data ImgL and the second image frame data ImgS may be output through the same transmission line.

As another example, the output interface OIP may control the active period HA such that the length of the active period HA decreases as the resolution of the panel 210 increases. Accordingly, the first image frame data ImgL and the second image frame data ImgS may be output through the same transmission line.

Meanwhile, the output interface OIP may set an active period with a first length Wa when the resolution of the panel 210 is a first resolution and the driving frequency of the panel 210 is a first frequency and set an active period with a second length Wb greater than the first length Wa when the first image frame data ImgL and the second image frame data ImgS are output. Accordingly, the first image frame data ImgL and the second image frame data ImgS may be output through the same transmission line.

Further, the output interface OIP may set the active period with the second length by adding a period for transmission of the second image frame data ImgS to the active period with the first length Wa. Accordingly, the first image frame data ImgL and the second image frame data ImgS may be output through the same transmission line.

Meanwhile, the output interface OIP may set the active period with the first length Wa and a blank period with the second length Wb when the resolution of the panel 210 is the first resolution and the driving frequency of the panel 210 is the first frequency, transmit at least a part of the first image frame data ImgL in the active period with the first length Wa and transmit at least a part of the second image frame data ImgS in a part of the blank period with the second length Wb when the first image frame data ImgL and the second image frame data ImgS are output. Accordingly, the first image frame data ImgL and the second image frame data ImgS may be output through the same transmission line.

Further, the output interface OIP may output the first image frame data ImgL regarding the n−1 image frame and the second image frame data ImgS regarding the n image frame together when the image output mode is the first mode, and may output the first image frame data ImgL regarding the n image frame and the second image frame data ImgS regarding the n image frame together or may not output the second image frame data ImgS when the image output mode is the second mode. Accordingly, the amount of processed signals in the timing controller 232 in the first mode becomes different from that in the second mode. In addition, a display time of the panel 210 may be more advanced in the second mode than in the first mode.

Here, the second mode is a low delay mode and may be a mode for reducing delay of a time at which an image is displayed on the panel regarding an input image signal.

The first mode is a normal mode that is not a low delay mode.

Further, the second mode or the low delay mode may include at least one of a game mode and a mirroring mode. Accordingly, a display time of the panel 210 may be more advanced in the second mode than in the first mode.

Meanwhile, the signal processing device 170 according to another embodiment of the present disclosure includes the input interface IIP which receives an external image signal, the first image processor 1010 which generates the first image frame data ImgL based on the image signal, the second image processor 1020 which generates image frame data based on the image signal, and the output interface OIP which outputs the data enable signal divided into the active period HA and the blank period HB, a data signal of the first image frame data ImgL, and a data signal of the second image frame data ImgS.

The output interface OIP in the signal processing device 170 according to another embodiment of the present disclosure sets the active period HA of the first data enable signal DE to the first length Wa when only the data signal of the first image frame data ImgL is output, and sets the active period HA of the second data enable signal DE to the second length Wb greater than the first length Wa when the data signal of the first image frame data ImgL and the data signal of the second image frame data ImgS are output together. Accordingly, signals may be output such that the timing controller 232 may perform accurate and rapid signal processing.

Meanwhile, the timing controller 232 may accurately and rapidly perform signal processing on the first image frame data ImgL that is delayed based on the second image frame data ImgS and output. In particular, the timing controller 232 may accurately and rapidly perform signal processing for power consumption reduction.

Figure 11:
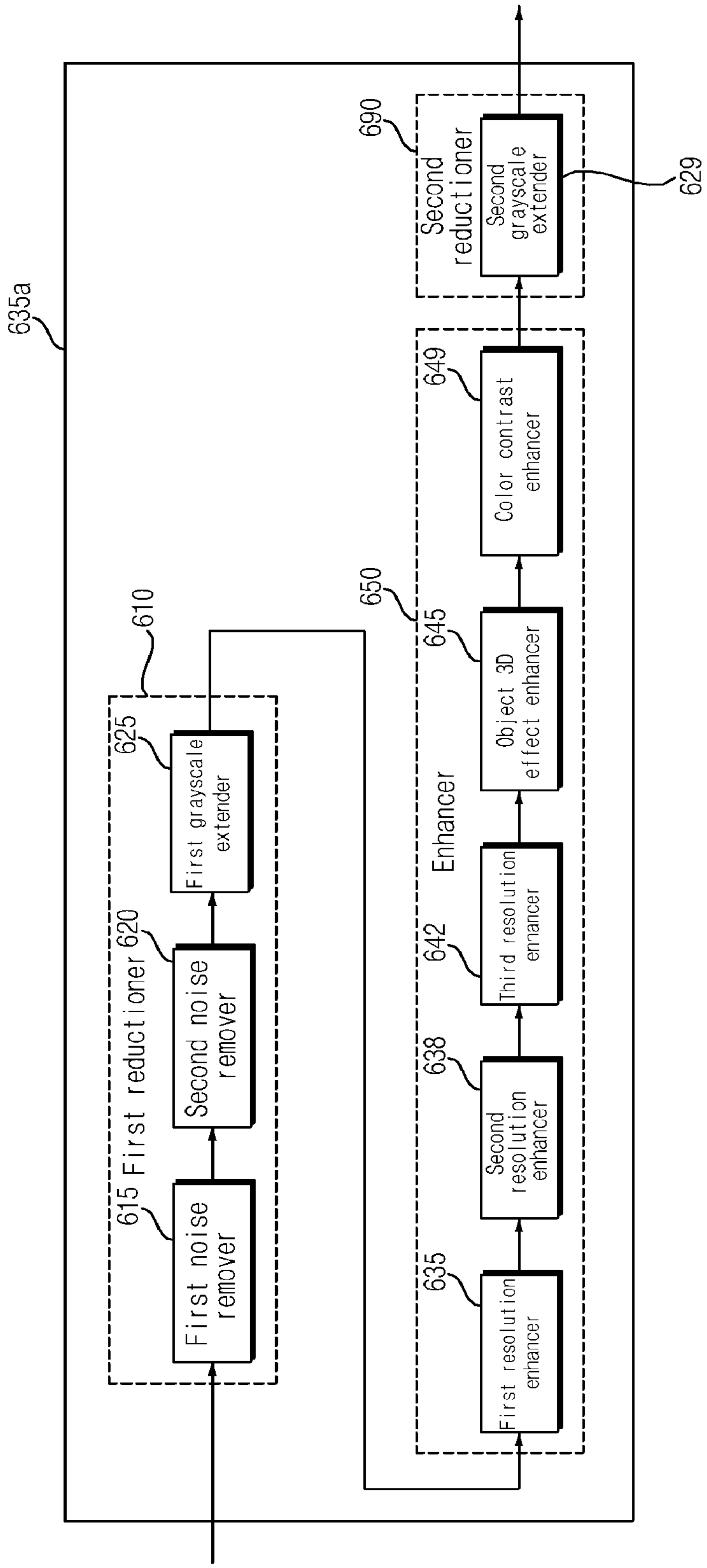
FIG. 11 is an example of an internal block diagram of a first image quality processor of FIG. 10.

FIG. 11 is an example of an internal block diagram of the first image quality processor of FIG. 10.

Referring to the figure, the first image quality processor **635*a* may include a first reductioner 610, an enhancer 650, and a second reductioner 690**.

The first reductioner 610 may perform noise removal on an image signal processed in the preprocessor 515.

For example, the first reductioner 610 may perform multistage noise removal processing and first-stage grayscale extension processing on an image processed in the preprocessor 515.

As another example, the first reductioner 610 may perform the multistage noise removal processing and the first-stage grayscale extension processing on an HDR image processed in the HDR processor 705.

To this end, the first reductioner 610 may include a plurality of noise removers 615 and 620 for removing noise in multiple stages, and a grayscale extender 625 for grayscale extension.

The enhancer 650 may perform multistage bit resolution enhancement processing on an image from the first reductioner 610.

Further, the enhancer 650 may perform object 3D effect enhancement processing. In addition, the enhancer 650 may perform color or contrast enhancement processing.

To this end, the enhancer 650 may include a plurality of resolution enhancers 635, 638 and 642 for enhancing resolution in multiple stages, an object 3D effect enhancer 645 for enhancing the 3D effect of an object, and a color contrast enhancer 649 for enhancing colors or contrast.

Next, the second reductioner 690 may perform second-stage grayscale extension processing based on a noise-removed image signal input from the first reductioner 610.

Meanwhile, the second reductioner 690 may amplify an upper limit level of an input signal and extend grayscale resolution of the input signal. Accordingly, the timing controller may accurately and rapidly perform signal processing for the panel.

For example, grayscale extension may be uniformly performed on the entire grayscale region of an input signal. Accordingly, uniform grayscale extension may be performed on an input image to enhance high grayscale expression.

Meanwhile, the second reductioner 690 may include a second grayscale extender 629 which performs grayscale amplification and extension based on an input signal from the first grayscale extender 625. Accordingly, the timing controller may accurately and rapidly perform signal processing for the panel.

Meanwhile, the second reductioner 690 may vary a degree of amplification based on a user input signal when the input image signal is an SDR image signal. Accordingly, high grayscale expression may be enhanced in response to user settings.

Further, the second reductioner 690 may perform amplification according to a set value when an input image signal is an HDR image signal. Accordingly, the timing controller may accurately and rapidly perform signal processing for the panel.

Further, the second reductioner 690 may vary a degree of amplification based on a user input signal when the input image signal is an HDR image signal. Accordingly, high grayscale expression may be enhanced in response to user settings.

Further, the second reductioner 690 may vary a degree of grayscale extension at the time of grayscale extension based on a user input signal. Accordingly, high grayscale expression may be enhanced in response to user settings.

Further, the second reductioner 690 may amplify an upper limit level of grayscale according to a grayscale conversion mode in the HDR processor 705. Accordingly, the timing controller may accurately and rapidly perform signal processing for the panel.

Meanwhile, the first image quality processor 635*a* in the signal processing device 170 of the present disclosure is characterized in that it performs four-stage reduction processing and four-stage image enhancement processing, as shown in FIG. 11.

Here, four-stage reduction processing may include two-stage noise removal and two-stage grayscale extension.

Two-stage noise removal may be performed by the first and second noise removers 615 and 620 in the first reductioner 610, and two-stage grayscale extension may be performed by the first grayscale extender 625 in the first reductioner 610 and the second grayscale extender 629 in the second reductioner 690.

Meanwhile, four-stage image enhancement processing may include three-stage bit resolution enhancement and object 3D effect enhancement.

Here, three-stage bit resolution enhancement may be processed by the first to third resolution enhancers 635, 638 and 642 and object 3D effect enhancement may be processed by the object 3D effect enhancer 645.

Figure 12:
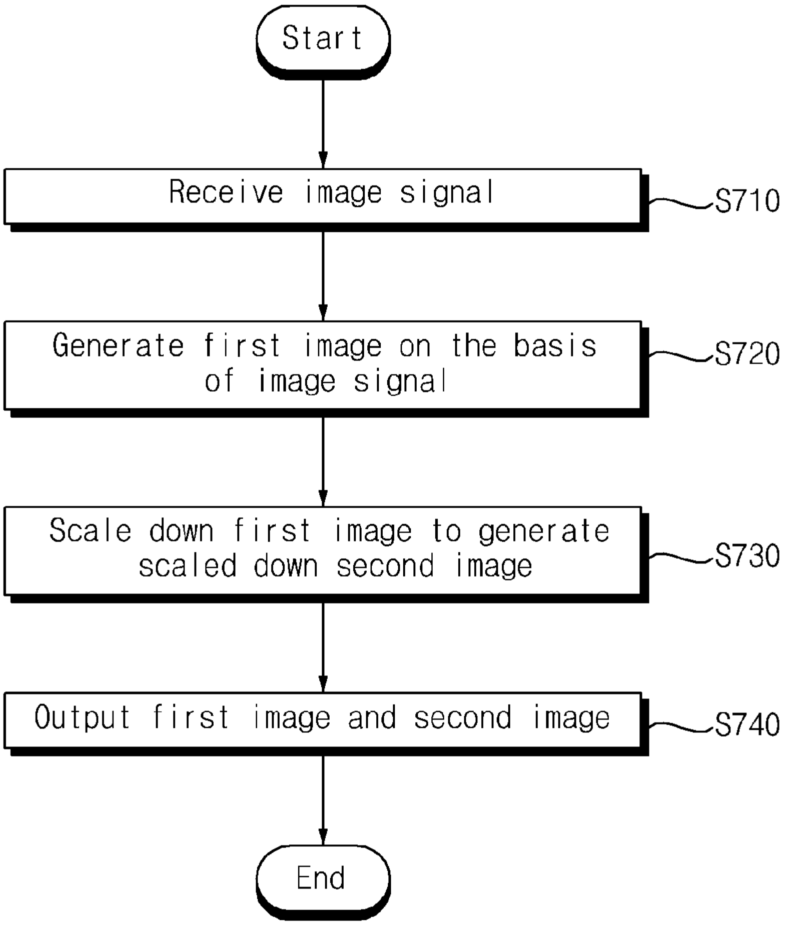
FIG. 12 is a flowchart showing a method of operating a signal processing device according to an embodiment of the present disclosure.

FIG. 12 is a flowchart showing a method of operating the signal processing device according to an embodiment of the present disclosure and FIGS. 13A to 14B are diagrams referred to in the description of the method in FIG. 12.

First, referring to FIG. 12, the input interface IIP in the signal processing device 170 according to an embodiment of the present disclosure receives an external image signal (S710).

The input interface IIP may receive an image signal from the computer PC, the mobile terminal 600, the set-top box STB, the game console GSB, or the server SVR in FIG. 1.

For example, when an image signal encoded according to transmission standards is received, the input interface IIP may perform decoding in response to the transmission standards.

Next, the first image processor 1010 generates the first image frame data ImgL based on the image signal from the input interface IIP (S720).

Subsequently, the scaler 535 in the second image processor 1020 generates the scaled down second image frame data ImgS based on the image signal from the input interface IIP (S730).

For example, the scaler 535 may generate at least one super pixel 714 or super block 724 based on an image block of the image signal and output the scaled down second image frame data ImgS including the super pixel 714 or the super block 724. Accordingly, it is possible to generate the second image frame data ImgS with reduced error which is scaled down from the first image frame data ImgL.

Next, the output interface OIP outputs the first image frame data ImgL and the second image frame data ImgS (S740).

For example, the first image frame data ImgL is output from the output interface OIP being delayed from the second image frame data ImgS. Accordingly, signals may be output such that the timing controller may accurately and rapidly perform signal processing.

Meanwhile, the timing controller 232 may accurately and rapidly perform signal processing on the first image frame data ImgL that is delayed and output based on the second image frame data ImgS. In particular, the timing controller 232 may accurately and rapidly perform signal processing for power consumption reduction.

The output interface OIP outputs the first image frame data ImgL and the second image frame data ImgS such that a transmission completion time of the second image frame data ImgS precedes a transmission completion time of the first image frame data ImgL. Accordingly, the timing controller 232 may accurately and rapidly perform signal processing for the panel 210.

Figure 13A:
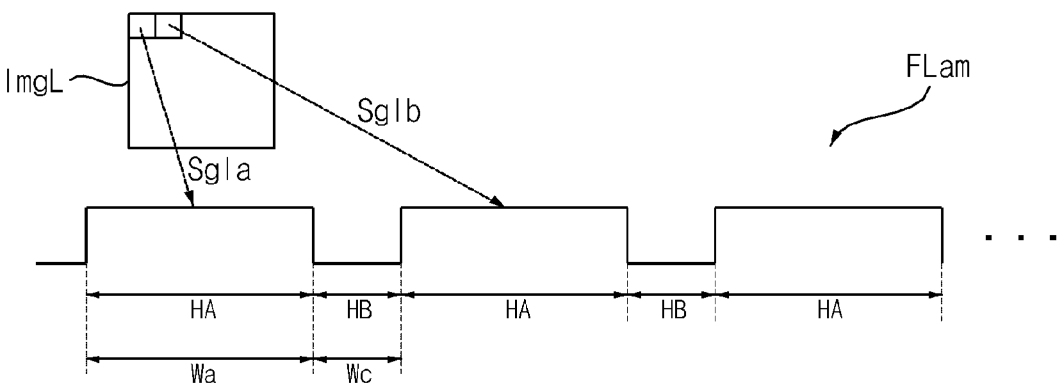
FIGS. 13A to 14B are diagrams referred to in the description of the method in FIG. 12.

FIG. 13A illustrates a data enable signal FLam when the output interface OIP outputs only the first image frame data ImgL.

Referring to the figure, the data enable signal FLam may be divided into active periods HA and blank periods HB.

The output interface OIP may set the length of the active period HA based on resolution information of the panel 210 and the driving frequency of the panel 210.

For example, the output interface OIP may control the length of the active period HA such that it decreases as the driving frequency of the panel 210 increases. Accordingly, the first image frame data ImgL and the second image frame data ImgS may be output through the same transmission line.

Further, the output interface OIP may control the length of the active period HA such that it decreases as the resolution of the panel 210 increases. Accordingly, the first image frame data ImgL and the second image frame data ImgS may be output through the same transmission line.

The output interface OIP may output data Sgla that is a part of the first image frame data ImgL in a first active period HA and output data SgLb that is another part of the first image frame data ImgL in a second active period HA, as shown in FIG. 13A.

That is, the output interface OIP may divide the first image frame data ImgL and output the divided image data in a plurality of active periods, as shown in FIG. 13A.

Figure 13B:
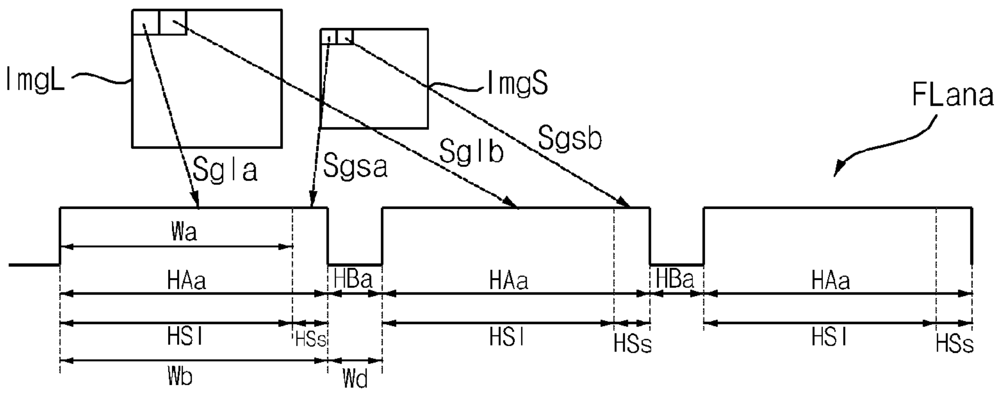

FIG. 13B illustrates a data enable signal FLana when the output interface OIP outputs the first image frame data ImgL and the second image frame data ImgS.

Referring to the figure, the data enable signal FLana may be divided into active periods HAa and blank periods HBa.

Referring to the figure, the output interface OIP may set an active period HAa having a second length Wb by adding a period HSs for transmission of the second image frame data ImgS to an active period HSI having a first length Wa.

Further, the output interface OIP may set a blank period HBa having a fourth length Wd reduced from a third length We as the length of the active period HAa increases.

Here, the period HSs for transmission of the second image frame data ImgS may be provided after the active period HIS having the first length Wa.

In comparison of FIG. 13A with FIG. 13B, the second active period HAa of the second data enable signal FLana when the first image frame data ImgL and the second image frame data ImgS are output may be greater than the first active period HA of the first data enable signal FLam when only the first image frame data ImgL is output.

Accordingly, the first image frame data ImgL and the second image frame data ImgS may be output through the same transmission line. Here, it is desirable that the first image frame data ImgL be delayed from the second image frame data ImgS and output.

Comparing FIG. 13A with FIG. 13B, the second blank period HBa of the second data enable signal FLana when the first image frame data ImgL and the second image frame data ImgS are output may be less than the first blank period HB of the first data enable signal FLam when only the first image frame data ImgL is output. Accordingly, the first image frame data ImgL and the second image frame data ImgS may be output through the same transmission line.

Figure 13C:
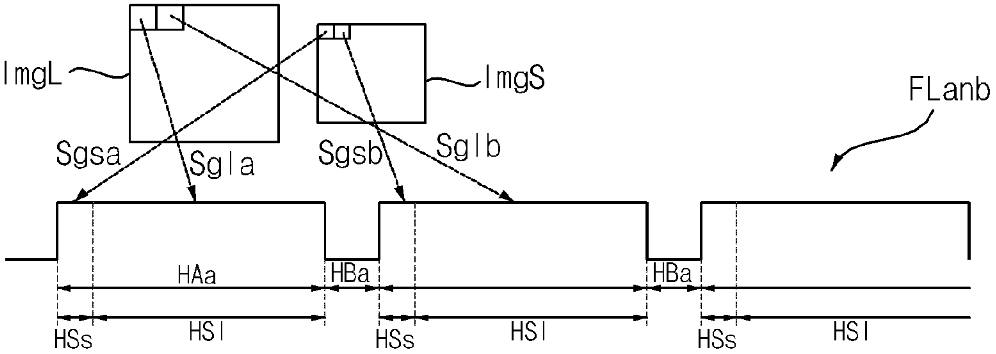

FIG. 13C illustrates a data enable signal FLanb when the output interface OIP outputs the first image frame data ImgL and the second image frame data ImgS.

Referring to the figure, the data enable signal FLanb may be divided into active periods HAa and blank periods HBa.

Referring to the figure, the output interface OIP may set an active period HAa having a second length Wb by adding the period HSs for transmission of the second image frame data ImgS to the active period HIS having the first length Wa.

Further, the output interface OIP may set a blank period HBa having the fourth length Wd reduced from the third length We as the length of the active period HAa increases.

Here, the period HSs for transmission of the second image frame data ImgS may be provided before the active period HIS having the first length Wa.

Figure 13D:
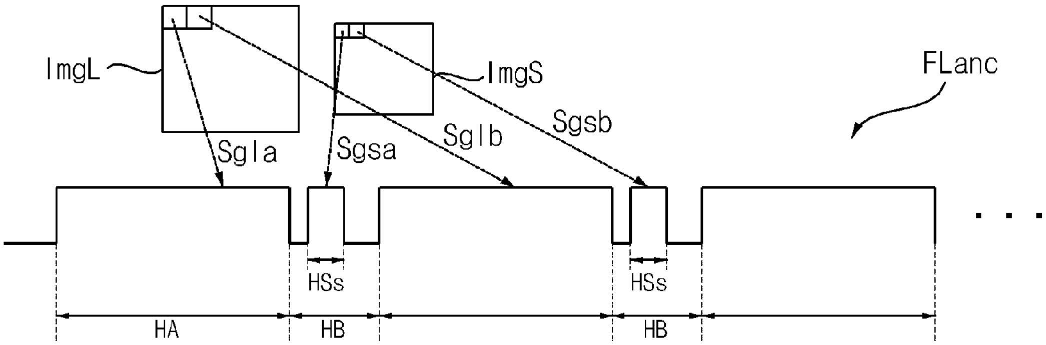

FIG. 13D illustrates a data enable signal FLanc when the output interface OIP outputs the first image frame data ImgL and the second image frame data ImgS.

Referring to the figure, the data enable signal FLanc may be divided into active periods HA and blank periods HB.

Referring to the figure, the output interface OIP may output data Sgla that is a part of the first image frame data ImgL in a first active period HA having the first length Wa and output data Sgsa that is a part of the second image frame data ImgS in a first blank period HB having the third length Wc.

The figure illustrates output of the data Sgsa of the second image frame data ImgS in a period HS s set in the first blank period HB.

Subsequently, the output interface OIP outputs data Sglb that is another part of the first image frame data ImgL in a second active period HA having the first length Wa and outputs data Sgsb that is another part of the second image frame data ImgS in a sec and blank period HB having the third length Wc. Accordingly, the first image frame data ImgL and the second image frame data ImgS may be output through the same transmission line.

Figure 13E:
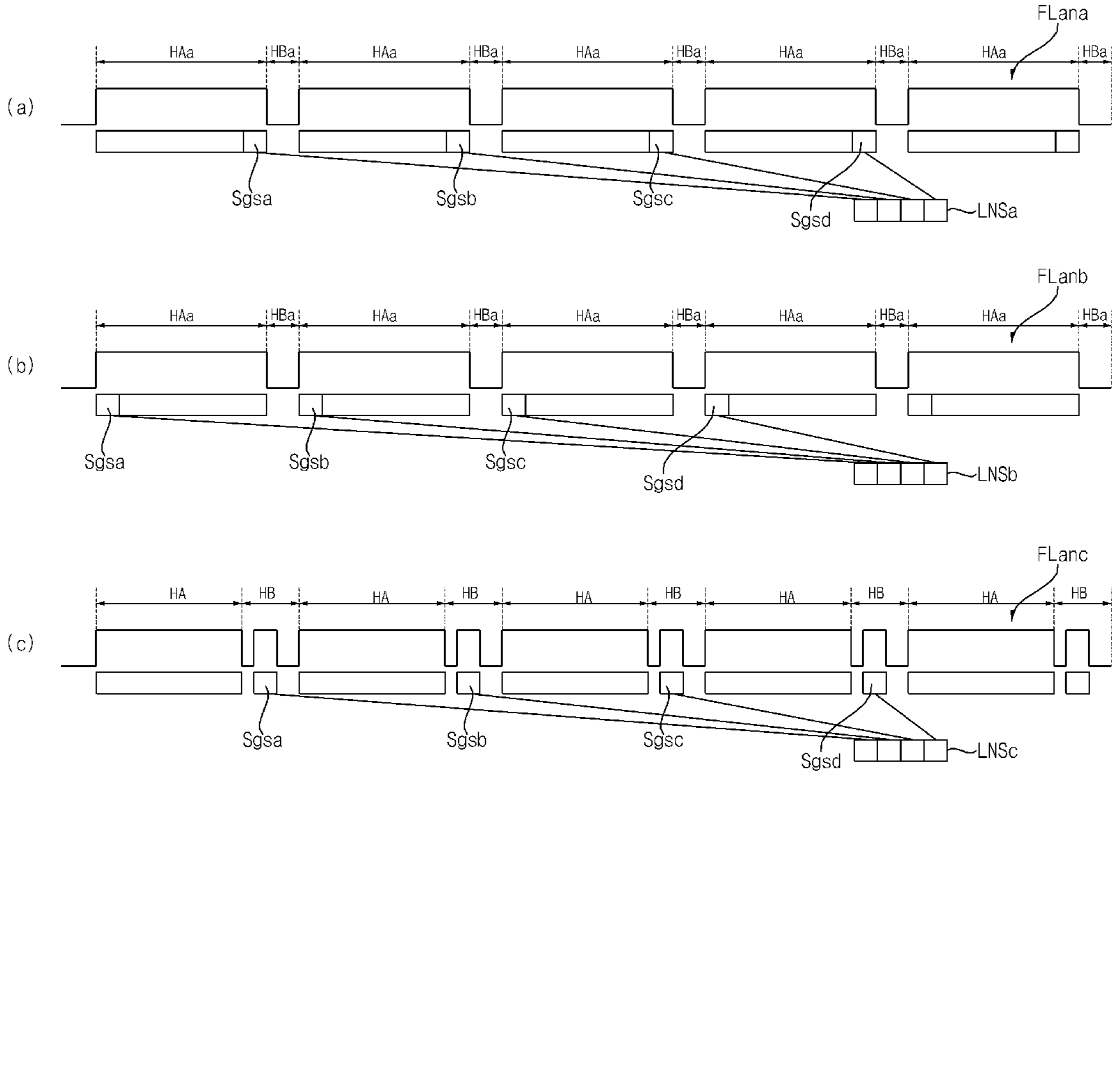

FIG. 13E is a diagram showing various data enable signals FLana, FLanb and FLanc output from the signal processing device 170.

Referring to the figure, the data enable signal FLana of FIG. 13E(a) is divided into active periods HAa and blank periods HBa, data of the first image frame data is output in a front part of the active period HAa, and data of the second image frame data is output in a rear part of the active period HAa.

When data of the second image frame data output in the plurality of active periods HAa is summed, data LNSa as shown in the figure is generated.

Referring to the figure, the data enable signal FLanb of FIG. 13E(b) is divided into active periods HAa and blank periods HBa, data of the first image frame data is output in a rear part of the active period HAa, and data of the second image frame data is output in a front part of the active period HAa.

Referring to the figure, the data enable signal FLanc of FIG. 13E(c) is divided into active periods HA and blank periods HB, data of the first image frame data is output in the active period HA, and data of the second image frame data is output in the middle part of the blank period HB.

Figure 14A:
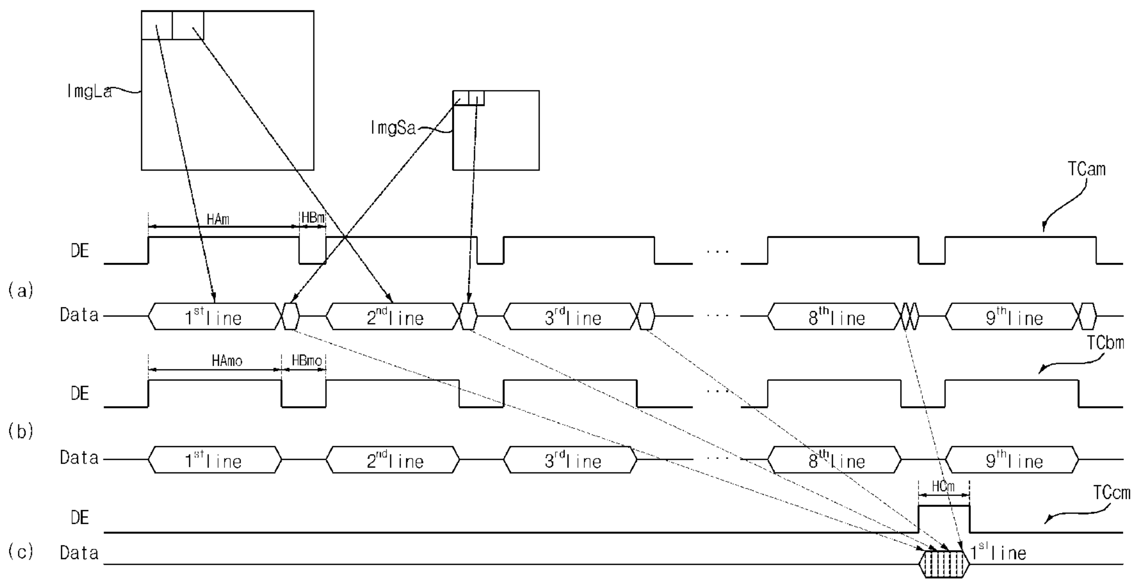

FIG. 14A is a diagram showing various data enable signals TCam, TCbm and TCcm output from the signal processing device 170 when the resolution of the panel 210 is 8K and the driving frequency of the panel 210 is 120 Hz.

Referring to the figure, when the resolution of the panel 210 is 8K and the driving frequency of the panel 210 is 120 Hz, the output interface OIP may set an active period HAm of the data enable signal TCam to approximately 125 ms, set a blank period HBm to approximately 15 ms, and set an output period of the second image frame data to approximately 3 ms.

As shown, a part of first image frame data ImgLa may be transmitted in a front part of the active period HAm and a part of second image frame data ImgSa may be transmitted in a rear part of the active period HAm.

Figure 14B:
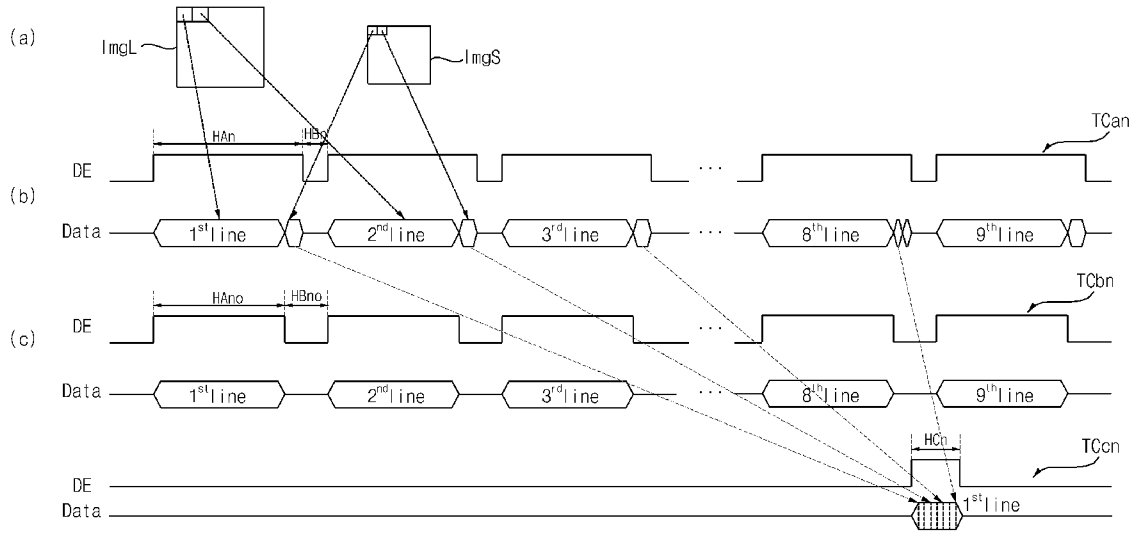

FIG. 14B is a diagram showing various data enable signals TCan, TCbn and TCcn output from the signal processing device 170 when the resolution of the panel 210 is 4K and the driving frequency of the panel 210 is 120 Hz.

Referring to the figure, when the resolution of the panel 210 is 4K and the driving frequency of the panel 210 is 120 Hz, the output interface OIP may set an active period HAn of the data enable signal TCan to approximately 250 ms, set a blank period HBn to approximately 30 ms, and set an output period of the second image frame data to approximately 5 ms.

As shown, a part of the first image frame data ImgL may be transmitted in a front part of the active period HAn and a part of the second image frame data ImgS may be transmitted in a rear part of the active period HAn.

Comparing FIG. 14A with FIG. 14B, the output interface OIP may set the length of the active period such that it decreases as the panel resolution increases, as shown in FIG. 14A. In addition, the output interface OIP may set the length of the blank period such that it also decreases. Further, the output interface OIP may set the output period of the second image frame data such that it decreases.

Similarly, the output interface OIP may set the length of the active period such that it decreases as the driving frequency of the panel 210 increases. In addition, the output interface OIP may set the length of the blank period such that it also decreases.

Figure 15A:
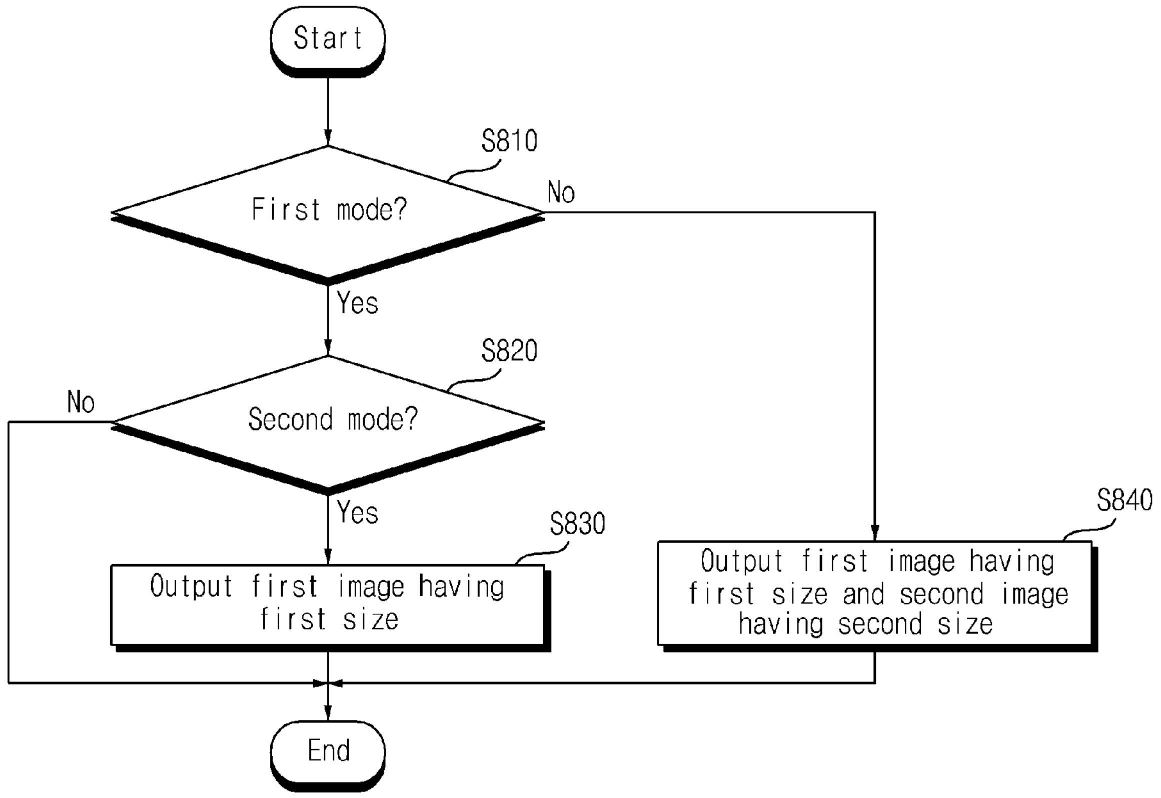
FIG. 15A is a flowchart showing a method of operating a signal processing device according to another embodiment of the present disclosure.

FIG. 15A is a flowchart showing a method of operating a signal processing device according to another embodiment of the present disclosure.

Referring to the figure, the signal processing device 170 determines whether the image output mode is the first mode (S810) and performs step S840 when the image output mode is the first mode.

That is, when the image output mode is the first mode, the signal processing device 170 outputs first image frame data having a first size and second image frame data having a second size (S840).

Here, the first mode may include a mode other than the game mode and the mirroring mode.

When the image output mode is the first mode, the output interface OIP may output the first image frame data ImgL regarding the n−1 image frame and the second image frame data ImgS regarding the n image frame together.

On the other hand, when the image output mode is not the first mode, the signal processing device 170 determines whether the image output mode is a second mode (S820) and outputs the first image frame data having the first size when the image output mode is the second mode (S830).

Here, the second mode may include the game mode and the mirroring mode. That is, the second mode may be a mode for image display according to real-time signal processing.

For example, when a game image signal is received from an external device, a streaming game image signal is received from an external server, or a mobile terminal screen is displayed in a mirroring mode regarding an external mobile terminal, the signal processing device 170 causes the scaler 535 to be bypassed such that a scaled down image is not generated.

When the image output mode is the second mode, the signal processing device 170 outputs the first image frame data ImgL regarding the n image frame and the second image frame data ImgS regarding the n image frame together or may not output the second image frame data ImgS.

Accordingly, the amount of processed signals in the timing controller 232 in the first mode becomes different from that in the second mode. Further, when the same image is displayed, a display time of the image on the panel 210 may be more advanced in the second mode than in the first mode.

Figure 15B:
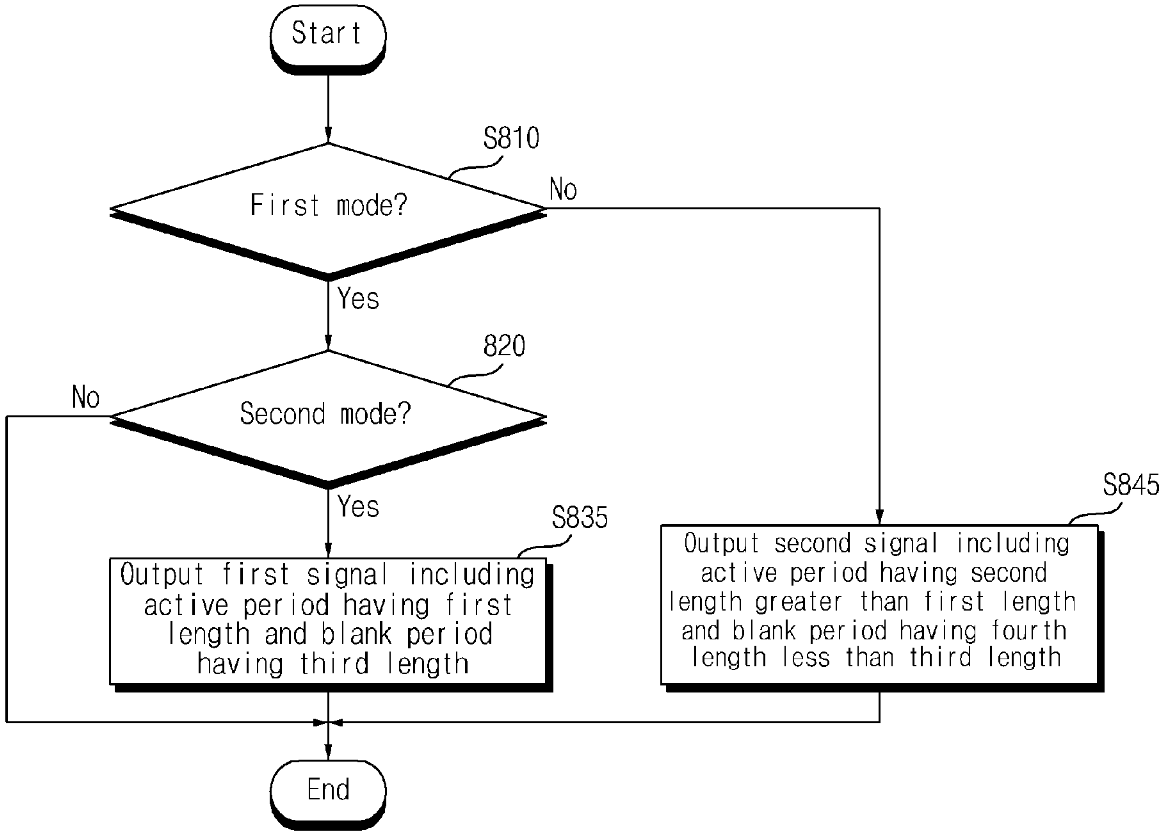
FIG. 15B is a flowchart showing a method of operating a signal processing device according to another embodiment of the present disclosure.

FIG. 15B is a flowchart showing a method of operating a signal processing device according to another embodiment of the present disclosure.

Referring to the figure, the signal processing device 170 determines whether the image output mode is the first mode (S810) and performs step S845 when the image output mode is the first mode.

That is, when the image output mode is the first mode, the signal processing device 170 outputs a second signal FLana including an active period HAa having the second length Wb greater than the first length Wa and a blank period HBa having the fourth length less than the third length Wc (S845), as shown in FIG. 13B or 13C.

For example, when the image output mode is the first mode, the output interface OIP may output the first image frame data ImgL regarding the n−1 image frame and the second image frame data ImgS regarding the n image frame together. Accordingly, the first image frame data ImgL and the second image frame data ImgS may be output through the same transmission line.

On the other hand, when the image output mode is not the first mode, the signal processing device 170 determines whether the image output mode is the second mode (S820) and outputs a first signal Flam including an active period HA having the first length Wa and a blank period HB having the third length Wc, as shown in FIG. 13A (S835) when the image output mode is the second mode.

Figure 16A:
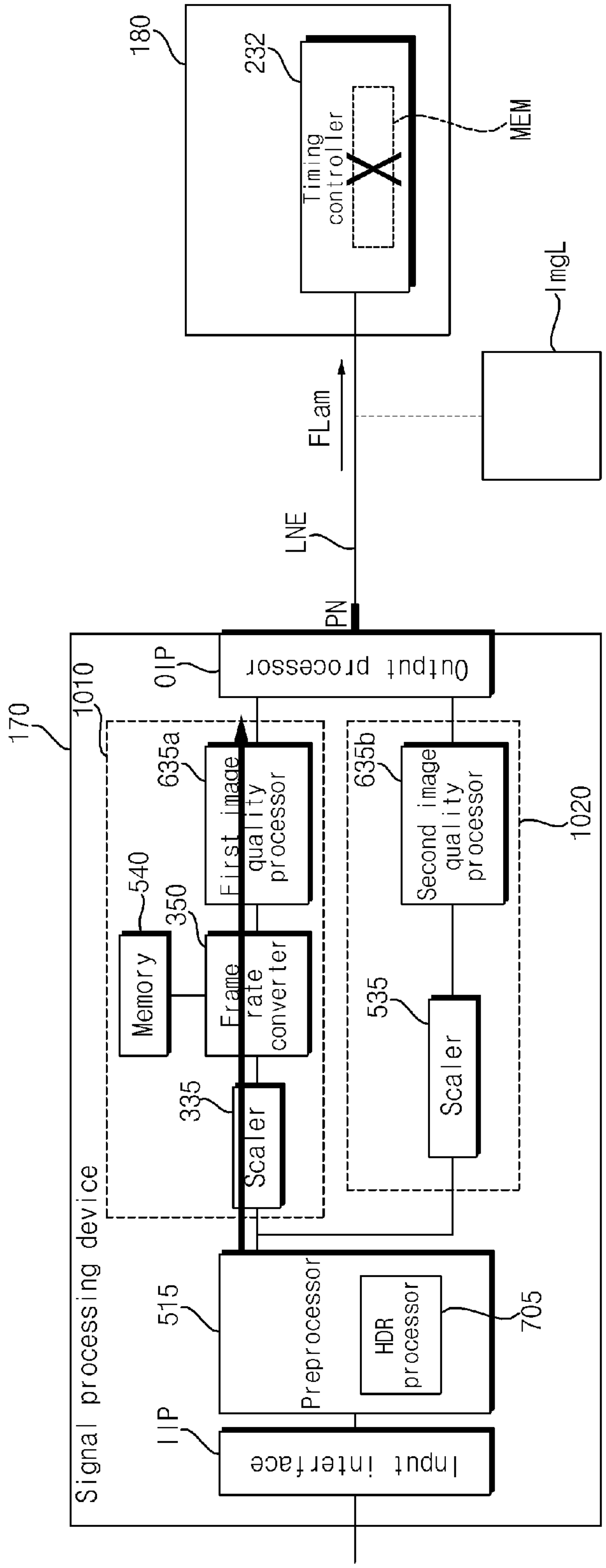
FIGS. 16A and 16B are diagrams referred to in the description of the method in FIG. 15A or 15B.
Figure 16B:
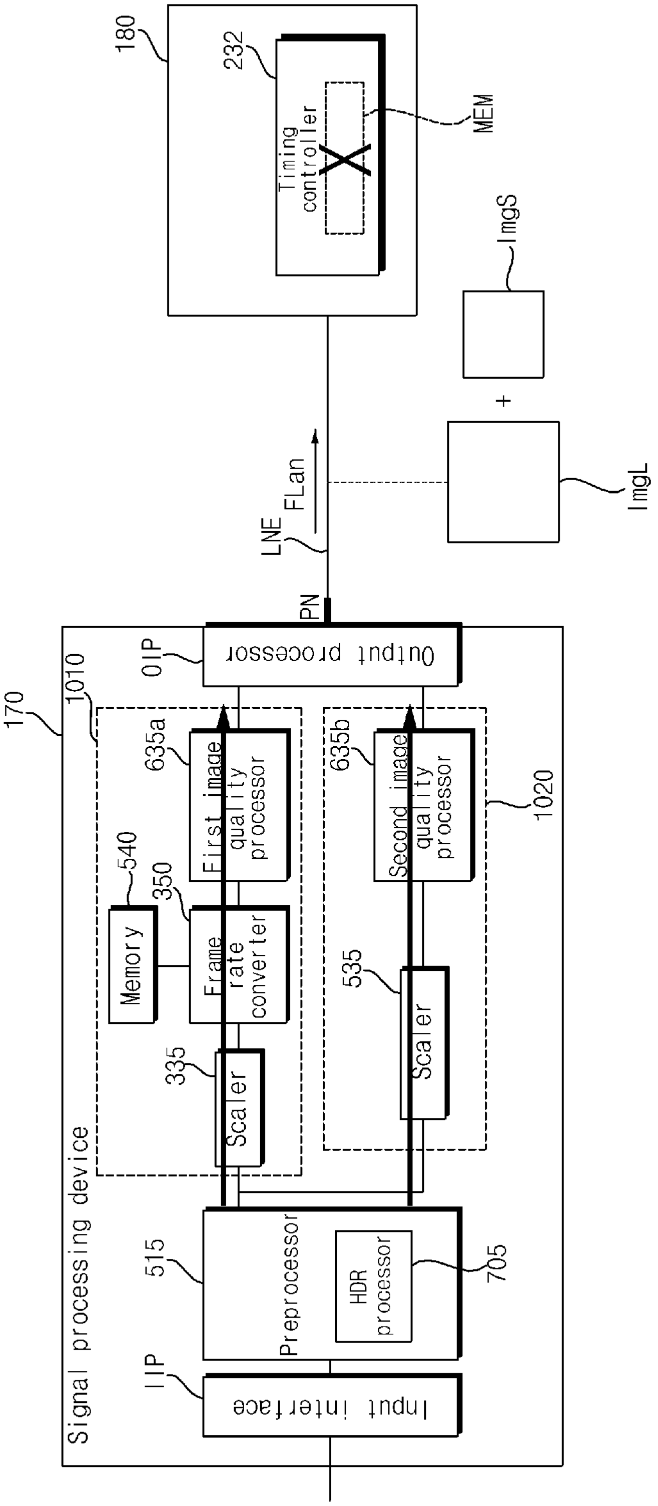

FIGS. 16A and 16B are diagrams referred to in the description of the method in FIG. 15A or 15B.

FIG. 16A shows that the signal processing device 170 outputs only the first image frame data ImgL in the second mode.

Referring to the figure, the second image processor 1020 in the signal processing device 170 does not generate or output the second image frame data, and the first image frame data generated in the first image processor 1010 is output to the outside through path 1 of the first image processor 1010 and the output interface OIP.

Here, the first image frame data may pass through the scaler 335, the frame rate converter 350 and the first image quality processor 635*a* in the first image processor 1010.

FIG. 16B shows that the signal processing device 170 outputs the first image frame data ImgL and the second image frame data ImgS in the first mode.

Referring to the figure, the second image processor 1020 in the signal processing device 170 generates the second image frame data.

Accordingly, the first image frame data generated in the preprocessor 515 is output to the outside through path 1 of the first image processor 1010 and the output interface OIP, and the second image frame data generated in the second image processor 1020 is output to the outside through path 2 of the second image processor 1020 and the output interface OIP.

Figure 17:
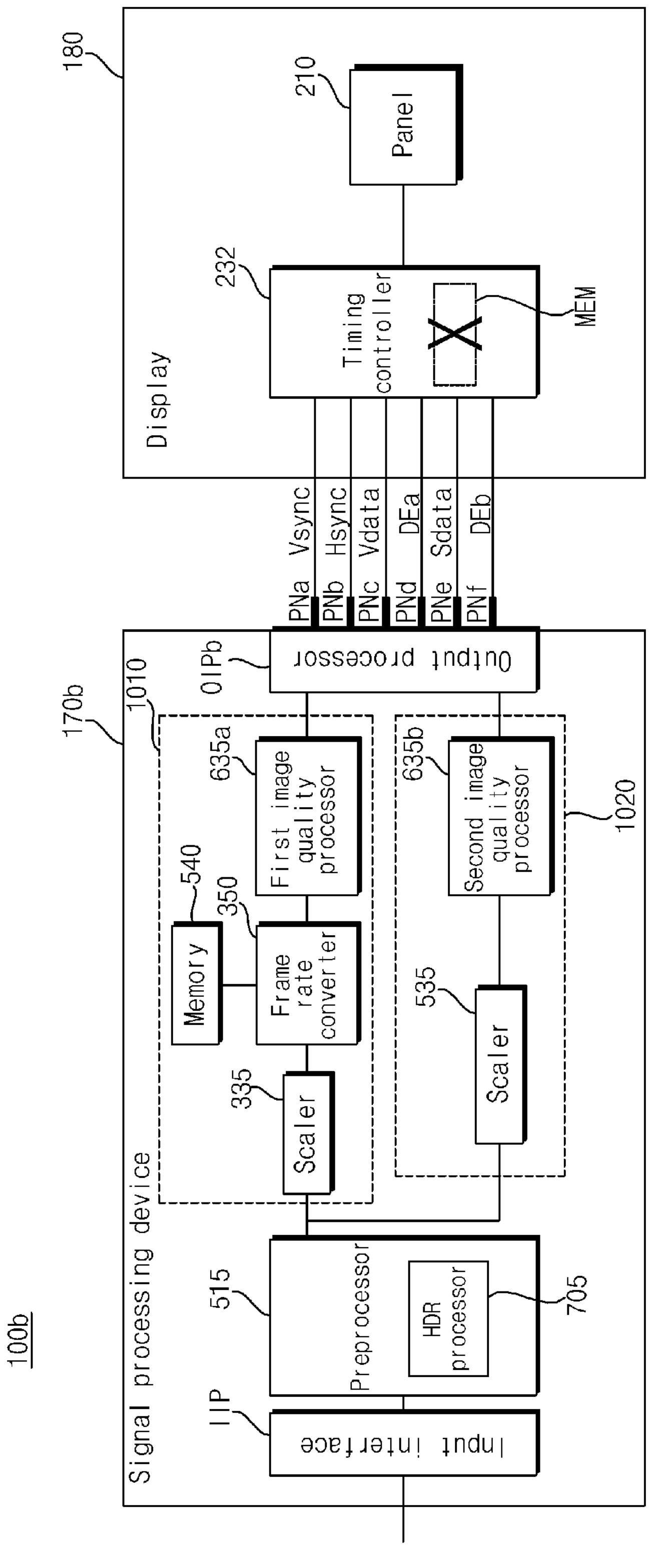
FIG. 17 is a detailed block diagram of an image display apparatus according to another embodiment of the present disclosure.

FIG. 17 is a detailed block diagram of an image display apparatus according to an embodiment of the present disclosure and FIGS. 18A to 19D are diagrams referred to in the description of the operation of FIG. 17.

Referring to the figures, the image display apparatus 100*b* according to another embodiment of the present disclosure shown in FIG. 17 is similar to the image display apparatus 100 of FIG. 10 but differs therefrom in that an output interface OIPb in a signal processing device 170*b* includes a larger number of output terminals than those in FIG. 10. Description will be given focusing on the difference below.

The signal processing device 170*b* according to another embodiment of the present disclosure may include the input interface IIP which receives an external image signal, the first image processor 1010 which generates the first image frame data ImgL based on the image signal, the second image processor 1020 which generates the second image frame data ImgS based on the image signal, and the output interface OIPb which receives the first image frame data ImgL from the first image processor 1010 and the second image frame data ImgS from the second image processor 1020 and outputs the first image frame data ImgL and the second image frame data ImgS.

Meanwhile, the output interface OIPb may include a first output terminal PNa for transmission of a vertical synchronization signal Vsync, a second output terminal PNb for transmission of a horizontal synchronization signal Hsync, a third output terminal PNc for transmission of a data signal Vdata of the first image frame data ImgL, a fourth output terminal PNd for transmission of a first data enable signal DEa of the first image frame data ImgL, a fifth output terminal PNe for transmission of a data signal Sdata of the second image frame data ImgS, and a sixth output terminal PNf for transmission of a data enable signal DEb of the second image frame data ImgS.

Accordingly, the first image frame data ImgL may be output through the third output terminal PNc based on the first data enable signal DEa and the second image frame data ImgS may be output through the fifth output terminal PNe based on the second data enable signal DEb.

That is, the output interface OIPb may output the first image frame data ImgL and the second image frame data ImgS using different output terminals.

Meanwhile, since the first image frame data ImgL and the second image frame data ImgS are output through different output terminals, the second image frame data ImgS is not limited to scaled down frame data.

That is, the second image processor 1020 in the signal processing device 170*b* according to another embodiment of the present disclosure may output the second image frame data that is not scaled down. Hereinafter, it is assumed that scaled down second image frame data is output for convenience of description.

Figure 18A:
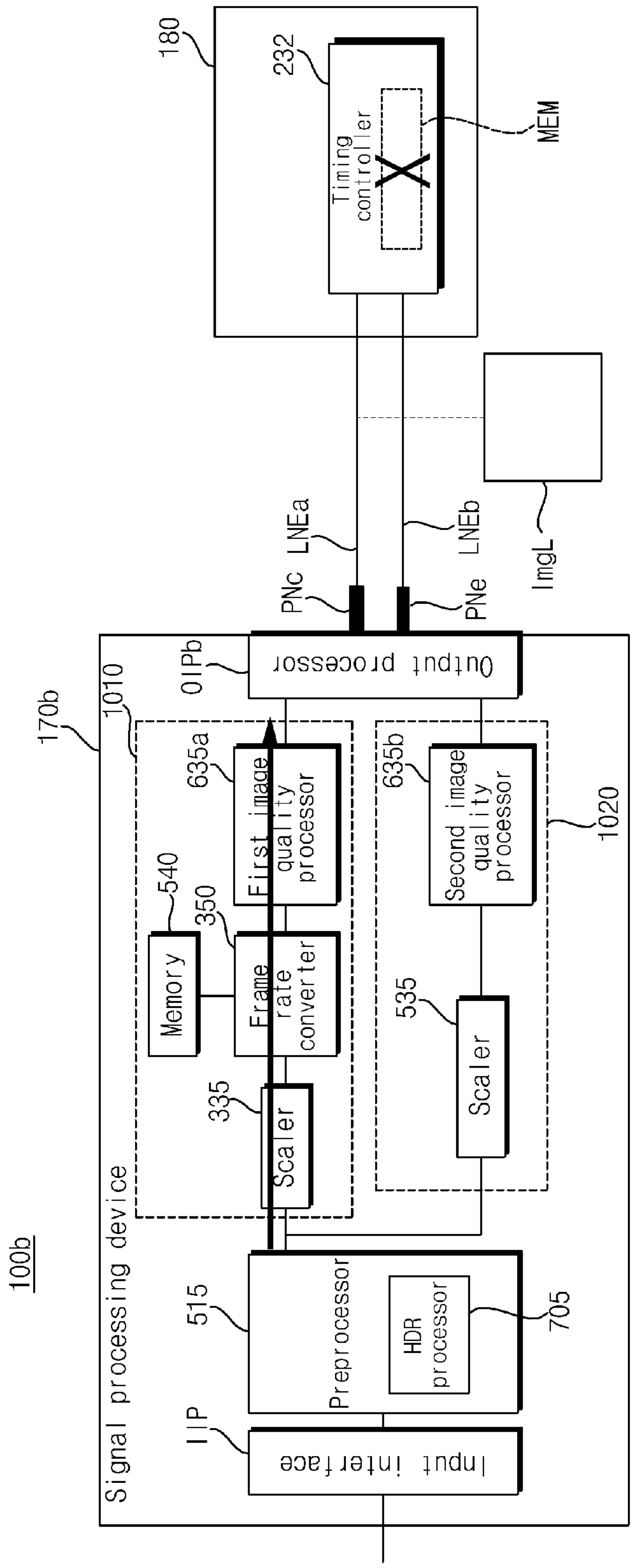
FIGS. 18A to 19D are diagrams referred to in the description of the operation of FIG. 17.

FIG. 18A shows that the signal processing device 170*b* outputs only the first image frame data ImgL in the second mode.

Referring to the figure, the second image processor 1020 in the signal processing device 170*b* does not generate or output the second image frame data, and the first image frame data ImgL generated in the first image processor 1010 is output to the outside through path 1 of the first image processor 1010 and the output interface OIPb.

Here, the first image frame data may pass through the scaler 335, the frame rate converter 350 and the first image quality processor 635*a* in the first image processor 1010.

Figure 18B:
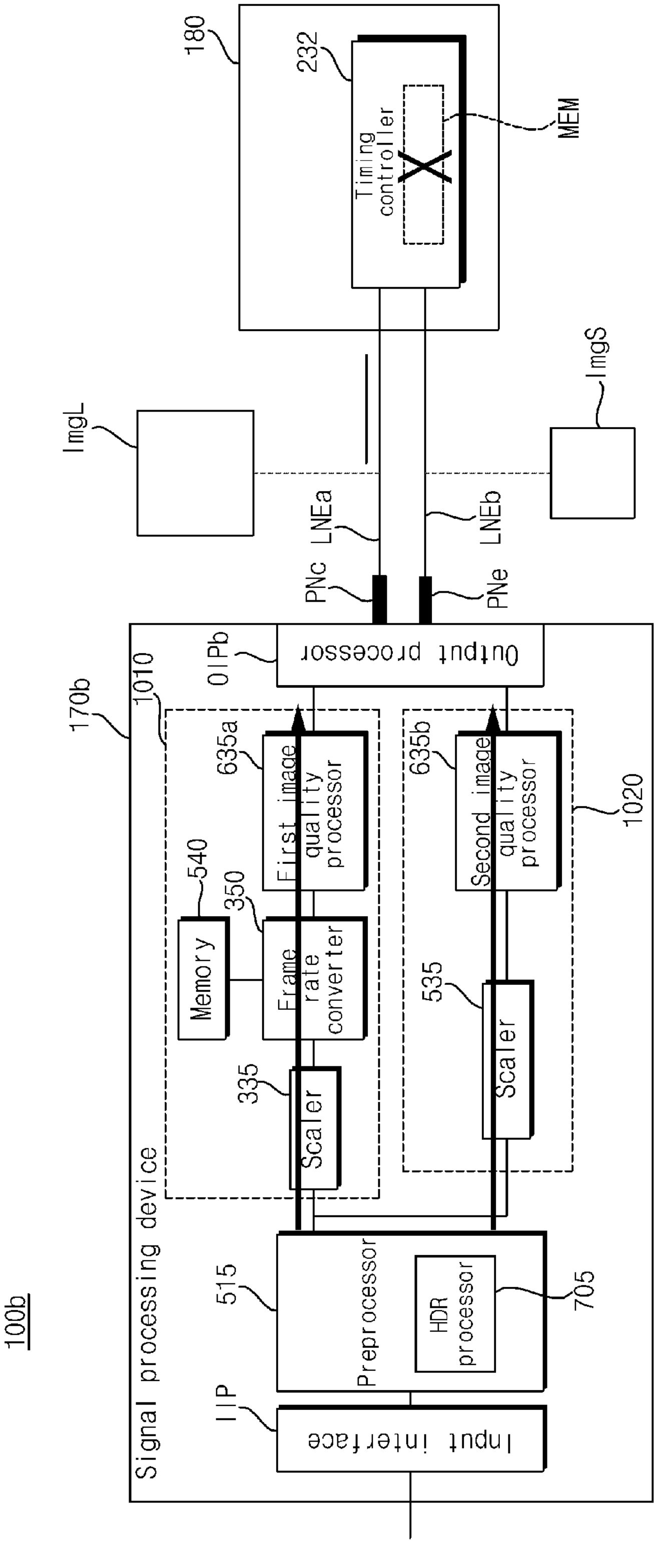

FIG. 18B shows that the signal processing device 170*b* outputs the first image frame data ImgL and the second image frame data ImgS in the first mode.

Referring to the figure, the second image processor 1020 in the signal processing device 170*b* generates the second image frame data ImgS.

Accordingly, the first image frame data ImgL generated in the first image processor 1010 is output to the outside through path 1 of the first image processor 1010 and the output interface OIPb, and the second image frame data ImgS generated in the second image processor 1020 is output to the outside through path 2 of the second image processor 1020 and the output interface OIPb. Accordingly, the first image frame data ImgL and the second image frame data ImgS may be output through different transmission lines.

Figure 19A:
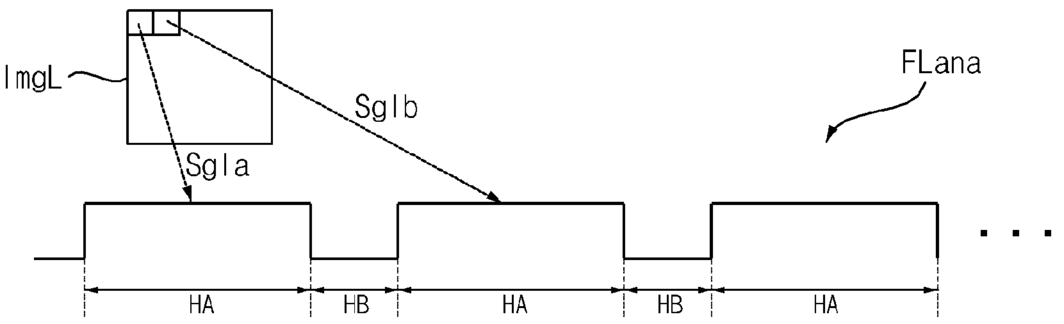

FIG. 19A shows a data enable signal FLana output through the fourth output terminal PNd of the signal processing device 170*b* in the second mode.

Referring to the figure, data parts Sgla and Sglb of the first image frame data ImgL are output in synchronization with active periods HA between the active periods HA and blank periods HB of the data enable signal FLana.

Figure 19B:
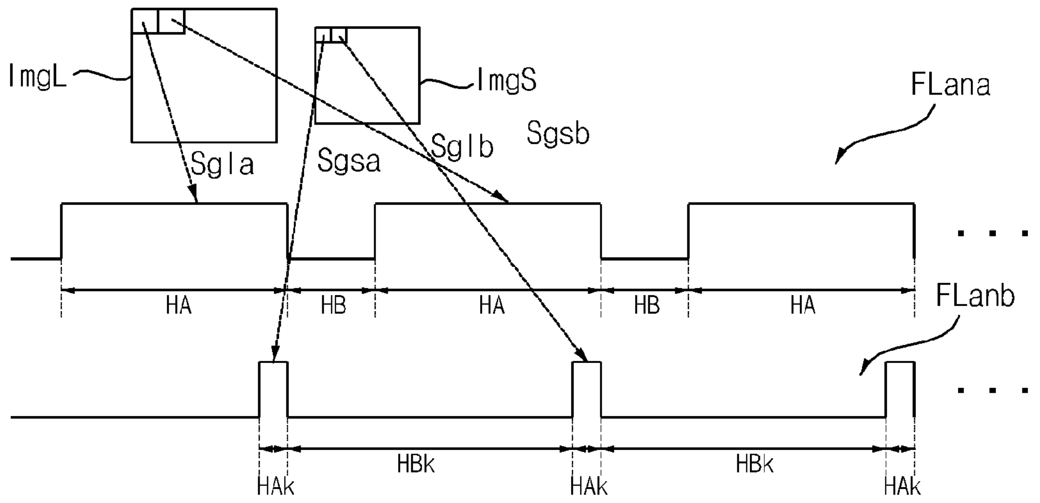

FIG. 19B shows the data enable signal FLana output through the fourth output terminal PNd of the signal processing device 170*b* and a second data enable signal FLanb output through the sixth output terminal PNf in the first mode.

Referring to the figure, data parts Sgla and Sglb of the first image frame data ImgL are output in synchronization with active periods HA between the active periods HA and blank periods HB of the data enable signal FLana, and data parts Sgsa and Sgsb of the second image frame data ImgS are output in synchronization with active periods HAk of the second data enable signal FLanb.

In particular, the second data enable signal FLanb has the active periods HAk corresponding to falling edges of the data enable signal FLana and blank periods HBk following the active periods HAk.

In the second data enable signal FLanb, the blank period HBk is greater than the active period HAk.

Figure 19C:
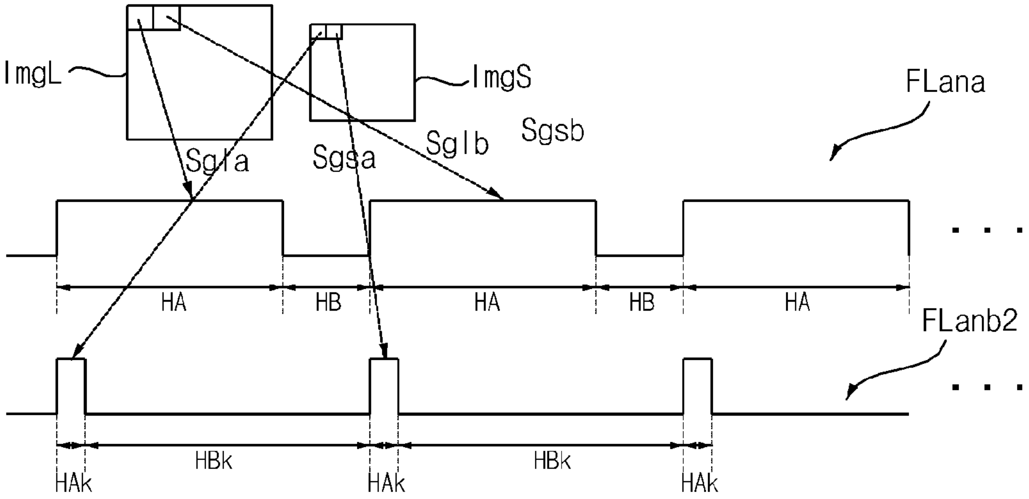

FIG. 19C shows the data enable signal FLana output through the fourth output terminal PNd of the signal processing device 170*b* and a second data enable signal FLanb2 output through the sixth output terminal PNf in the first mode.

Referring to the figure, the second data enable signal FLanb2 is similar to the second data enable signal FLanb of FIG. 19B but has active periods HAk corresponding to the rising edges of the data enable signal FLana and blank periods HBk following the active periods HAk.

Accordingly, data parts Sgsa and Sgab of the second image frame data ImgS are output in synchronization with active periods HAk of the second data enable signal FLanb2.

Figure 19D:
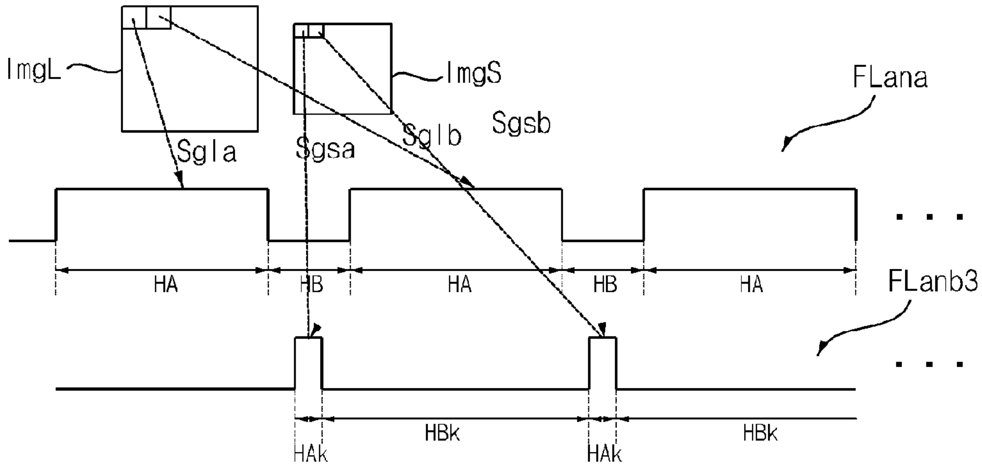

FIG. 19D shows the data enable signal FLana output through the fourth output terminal PNd of the signal processing device 170*b* and a second data enable signal FLanb3 output through the sixth output terminal PNf in the first mode.

Referring to the figure, the second data enable signal FLanb3 has active periods HAk corresponding to parts of the blank periods HB of the data enable signal FLana and blank periods HBk following the active periods HAk.

Accordingly, data parts Sgsa and Sgab of the second image frame data ImgS are output in synchronization with active periods HAk of the second data enable signal FLanb3.

Figure 20:
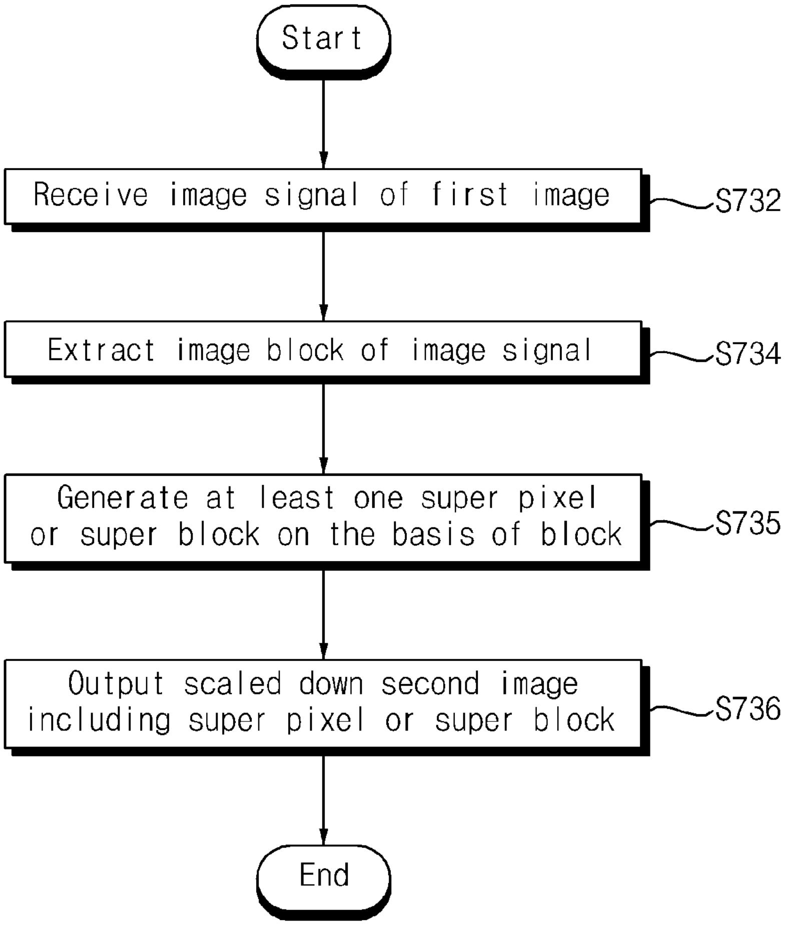
FIG. 20 is a flowchart showing a method of operating a signal processing device according to another embodiment of the present disclosure.

FIG. 20 is a flowchart showing a method of operating a signal processing device according to another embodiment of the present disclosure and FIGS. 21A to 23C are diagrams referred to in the description of the method in FIG. 20.

First, referring to FIG. 20, the second image processor 1020 in the signal processing device 170 according to another embodiment of the present disclosure receives an image signal from the input interface IIP or the preprocessor 515 (S732).

In addition, the scaler 535 in the second image processor 1020 extracts an image block of the input image signal (S734). Here, the image signal may correspond to first image frame data.

Next, the scaler 535 generates at least one adaptive super pixel 714 or adaptive super block 722 based on the extracted block (S735).

Figure 21A:
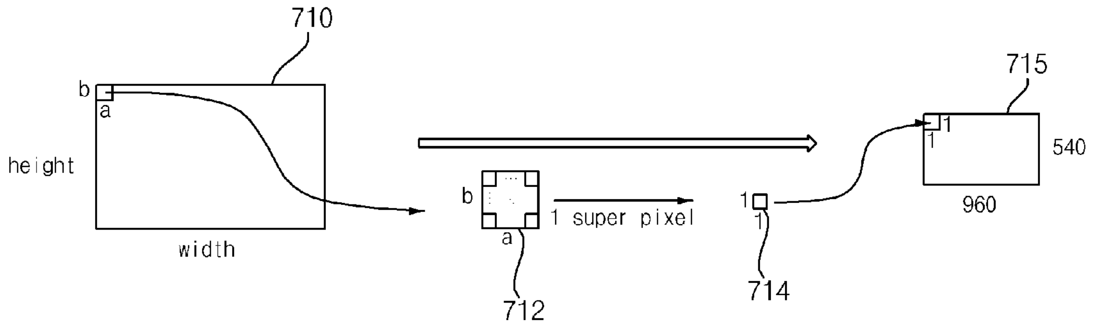
FIGS. 21A to 23C are diagrams referred to in the description of the method in FIG. 20.

FIG. 21A shows that a super pixel 714 having a size of 1*1 which represents block characteristics is generated from an a×b block 712 in first image frame data 710 and second image frame data 715 is generated based on the super pixel 714.

Figure 21B:
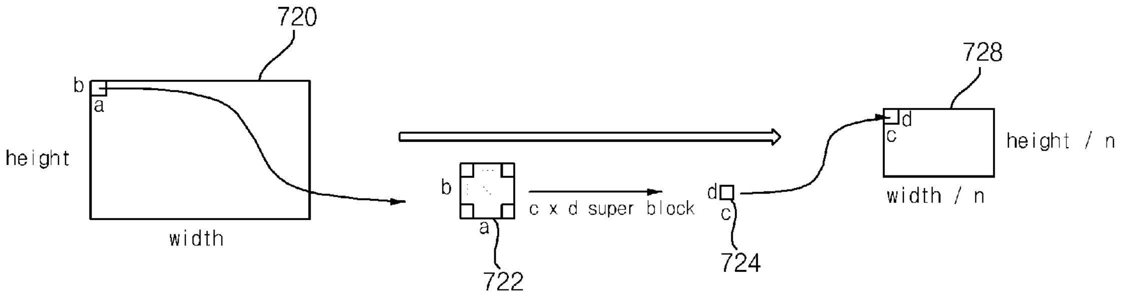

FIG. 21B shows that a super block 724 having a size of c*d, which represents block characteristics, is generated from an a×b block 722 in first image frame data 720 and second image frame data 728 is generated based on the super block 724.

Figure 22A:
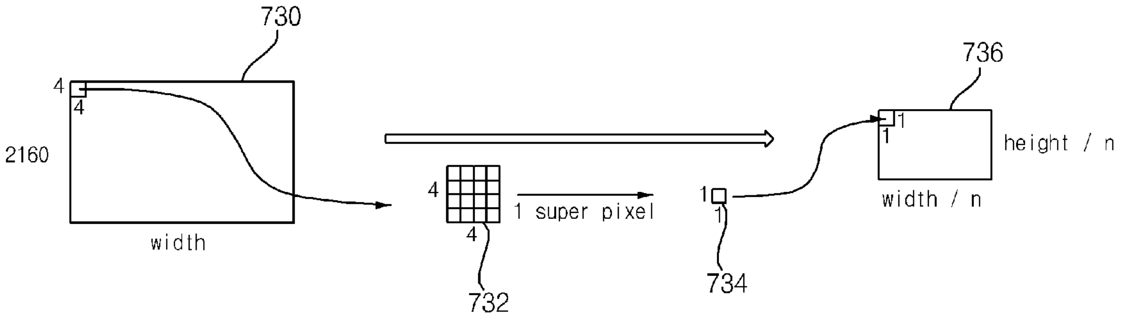

FIG. 22A shows that a super pixel 734 having a size of 1*1 which represents block characteristics is generated from a 4×4 block 732 in first image frame data 730 and second image frame data 736 is generated based on the super pixel 734.

Figure 22B:
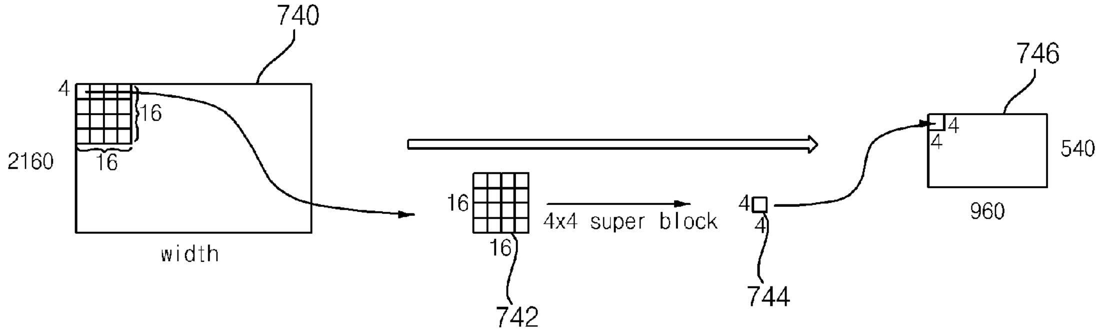

FIG. 22B shows that a super block 744 having a size of 4*4, which represents block characteristics, is generated from a 16×16 block 742 in first image frame data 740 and second image frame data 746 is generated based on the super block 744.

When second image frame data is generated using a super pixel or a super block, prediction error regarding first image frame data information is minimized.

Figure 23A:
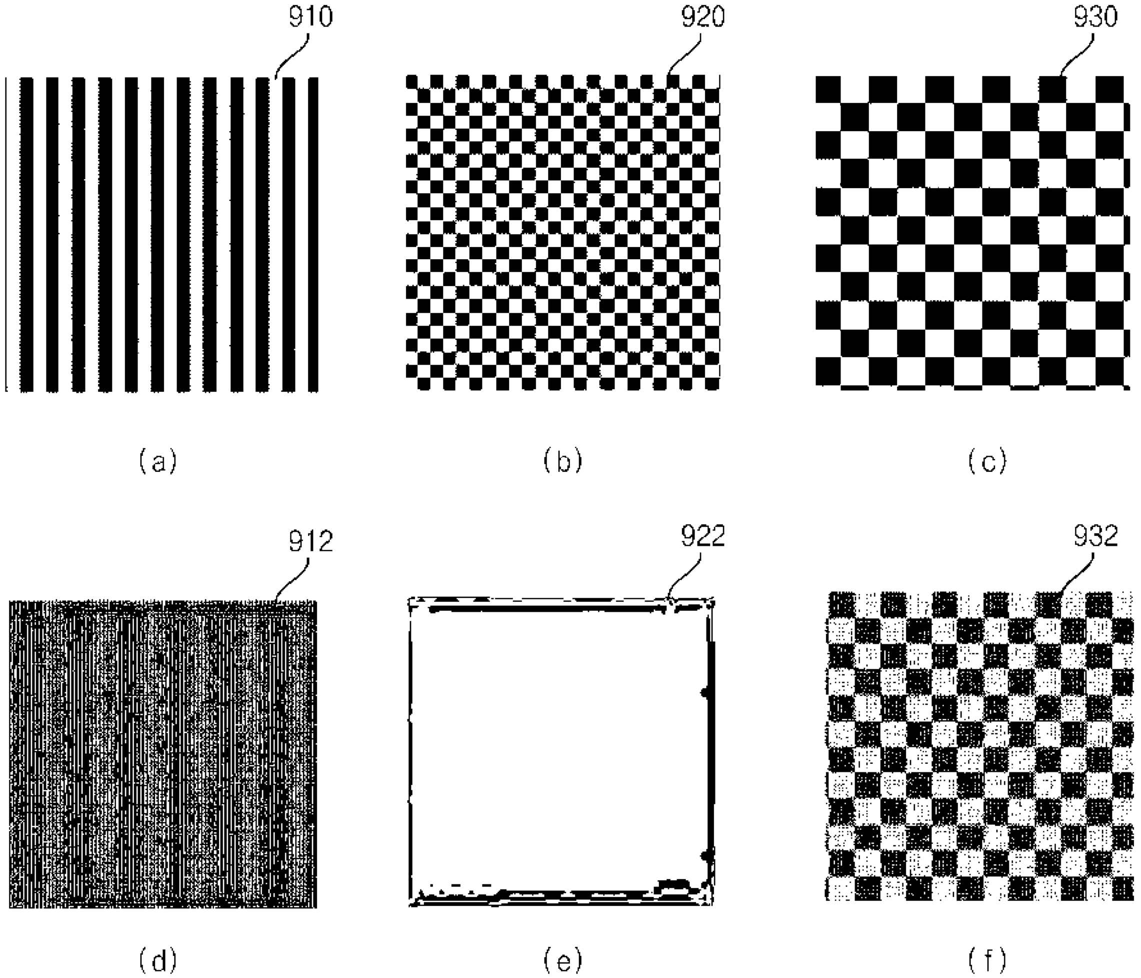

FIG. 23A shows that 1K second image frame data 912, 922 and 932 is generated by downscaling various types of 4K first image frame data 910, 920 and 930 using a filtering method such as bilinear or polyphase.

As shown in FIG. 23A, when the first image frame data of various patterns is downscaled using a filtering method, second image frame data that does not clearly represent patterns, as shown in FIGS. 23A(d) and (e), may be generated.

Figure 23B:
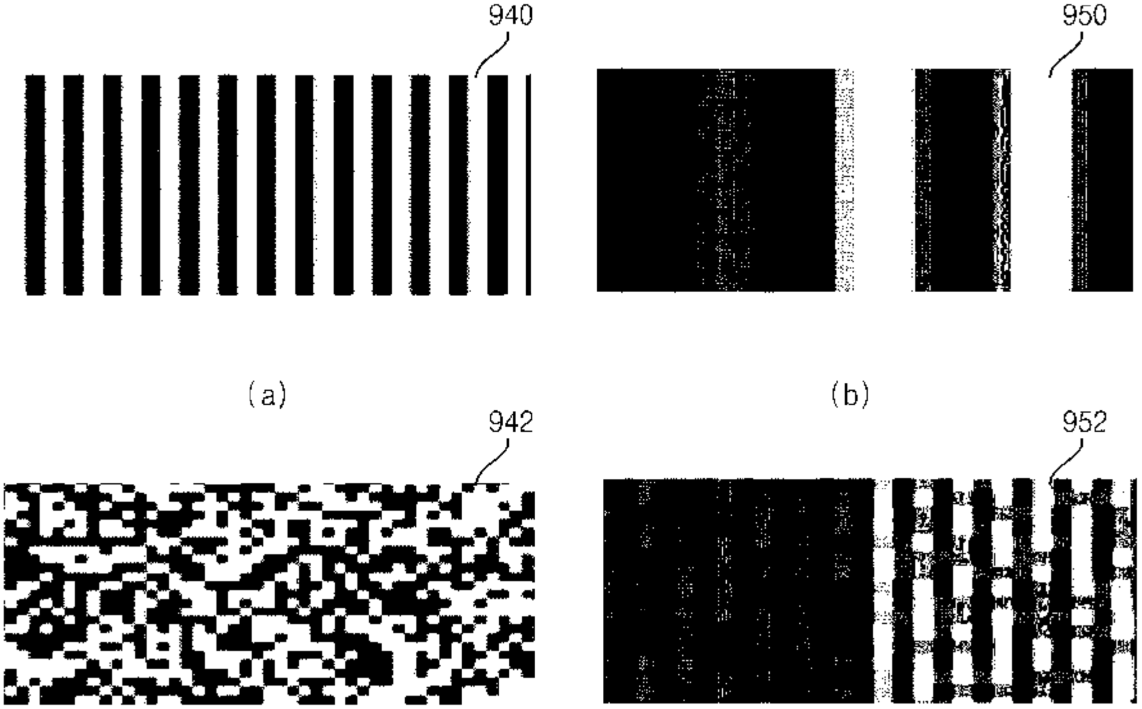

FIG. 23B shows that 1K second image frame data 942 and 952 is generated by downscaling various types of 4K first image frame data 940 and 950 using an adaptive super pixel.

As shown in FIG. 23B, when the first image frame data of various patterns is downscaled using an adaptive super pixel, a pattern clearly appears in FIG. 23B(d) but a pattern may not clear appear in FIG. 23B(c).

Figure 23C:
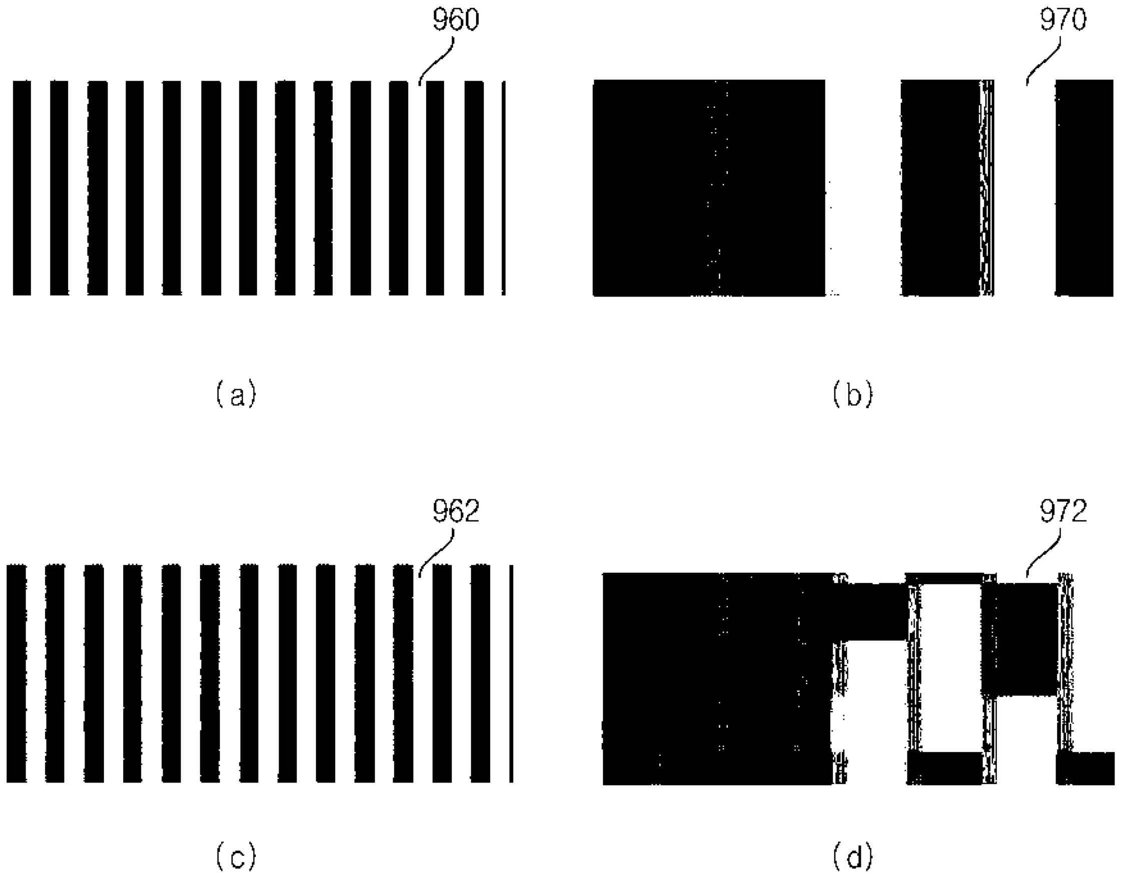

FIG. 23C shows that 1K second image frame data 962 and 972 is generated by downscaling various types of 4K first image frame data 960 and 970 using an adaptive super block.

As shown in FIG. 23C, when the first image frame data of various patterns is downscaled using an adaptive super block, patterns clearly appear as in FIG. 23C(c) and (d).

Accordingly, it is desirable that the scaler 535 generate second image frame data using an adaptive super block. Accordingly, scaled down second image frame data with reduced error may be generated.

Further, the scaler 535 may generate second image frame data using an adaptive super pixel.

Although the preferred embodiments of the present disclosure have been disclosed for illustrative purposes, the present disclosure is not limited to the above-described specific embodiments and those skilled in the art will appreciate that various modifications are possible, without departing from the scope and spirit of the disclosure as disclosed in the accompanying claims. The modifications should not be individually understood from the scope or prospect of the present disclosure.

The signal processing device according to an embodiment of the present disclosure includes the input interface which receives an external image signal, the first image processor configured to generate first image frame data based on the image signal, the second image processor configured to generate second image frame data scaled down from the first image frame data based on the image signal, and the output interface configured to receive the first image frame data from the first image processor and the second image frame data from the second image processor and to output the first image frame data and the second image frame data, the first image frame data output from the output interface is more delayed than the second image frame data. Accordingly, signals may be output such that the timing controller may perform accurate and rapid signal processing.

Further, the timing controller may accurately and rapidly perform signal processing on the first image frame data that is delayed and output based on the second image frame data. In particular, the timing controller may accurately and rapidly perform signal processing for power consumption reduction.

The first image frame data output from the first image processor may be delayed from the second image frame data output from the second image processor. Accordingly, the timing controller may accurately and rapidly perform signal processing for the panel.

Further, the output interface may delay the first image frame data from the second image frame data and output the first image frame data. Accordingly, the timing controller may accurately and rapidly perform signal processing for the panel.

When the output first image frame data is n frame data, the output interface may output frame data after the n frame data as the second image frame data. Accordingly, the timing controller may accurately and rapidly perform signal processing for the panel.

Further, the signal processing device may further include a memory to store frame data for image processing of the first image processor. Since frame data is stored in the memory and then read, the first image frame data is more delayed than the second image frame data and output. Accordingly, the timing controller may accurately and rapidly perform signal processing for the panel.

Further, the output interface may output first image frame data regarding an n−1 image frame and second image frame data regarding an n image frame together. Accordingly, the timing controller may accurately and rapidly perform signal processing for the panel.

The output interface may include a first output terminal for transmitting vertical synchronization signal, a second output terminal for transmitting horizontal synchronization signal, a third output terminal for transmitting image data signal, and a fourth output terminal for transmitting data enable signal, wherein the first image frame data and the second image frame data are transmitted through the third output terminal. Accordingly, the first image frame data and the second image frame data may be output through the same transmission line. In addition, the first image frame data is more delayed than the second image frame data and output.

Further, the output interface may output a data enable signal divided into active periods and blank periods, and a second active period of a second data enable signal when the first image frame data and the second image frame data are output may be greater than a first active period of a first data enable signal when only the first image frame data is output. Accordingly, the first image frame data and the second image frame data may be output through the same transmission line. In addition, the first image frame data is more delayed than the second image frame data and output.

Further, the output interface may output a data enable signal divided into active periods and blank periods, and a second blank period of a second data enable signal when the first image frame data and the second image frame data are output may be less than a first blank period of a first data enable signal when only the first image frame data is output. Accordingly, the first image frame data and the second image frame data may be output through the same transmission line. In addition, the first image frame data is more delayed than the second image frame data and output.

Further, the output interface may output a data enable signal divided into active periods and blank periods and set a length of the active period based on resolution information of a panel and a driving frequency of the panel. Accordingly, the first image frame data and the second image frame data may be output through the same transmission line. In addition, the first image frame data is more delayed than the second image frame data and output.

Further, the output interface may set an active period having a second length greater than a first length by adding a period for transmission of the second image frame data to a period for transmission of the first image frame data having the first length. Accordingly, the first image frame data and the second image frame data may be output through the same transmission line. In addition, the first image frame data is more delayed than the second image frame data and output.

Further, the output interface may output a data enable signal divided into active periods and blank periods, set an active period having a first length and a blank period having a second length when a resolution of a panel is a first resolution and a driving frequency of the panel is a first frequency, and when the first image frame data and the second image frame data are output, transmit at least a part of the first image frame data in the active period having the first length and transmit at least a part of the second image frame data in a part of the blank period having the second length. Accordingly, the first image frame data and the second image frame data may be output through the same transmission line. In addition, the first image frame data is more delayed than the second image frame data and output.

Further, the output interface may include a first output terminal for transmitting vertical synchronization signal, a second output terminal for transmitting horizontal synchronization signal, a third output terminal for transmission of a data signal of first image frame data, a fourth output terminal for transmission of a data enable signal of the first image frame data, a fifth output terminal for transmission of a data signal of second image frame data, and a sixth output terminal for transmission of a data enable signal of the second image frame data. Accordingly, the first image frame data and the second image frame data may be output through the same transmission line. In addition, the first image frame data is more delayed than the second image frame data and output.

Further, the output interface may output the first image frame data and the second image frame data using different output terminals. Accordingly, the first image frame data and the second image frame data may be output through the same transmission line. In addition, the first image frame data is more delayed than the second image frame data and output.

Further, the output interface may output first image frame data regarding an n image frame and second image frame data regarding an n image frame together or do not output the second image frame data when an image output mode is a low delay mode. Accordingly, the amount of processed signals in the timing controller in the low delay mode becomes different from that in a mode other than the low delay mode. Further, a panel display time is more advanced in the low delay mode than in a mode other than the low delay mode.

The low delay mode may include at least one of a game mode and a mirroring mode. Accordingly, delay during image display may be reduced in the low delay mode.

Meanwhile, the second image processor may include a scaler for generating second image frame data scaled down from the first image frame data based on the image signal. Accordingly, the scaled down second image frame data with reduced error may be generated as compared to the first image frame data.

Further, the scaler may generate at least one super pixel or super block based on an image block of the image signal and output the scaled down second image frame data including the super pixel or the super block. Accordingly, the scaled down second image frame data with reduced error may be generated as compared to the first image frame data.

Further, the scaler may vary a size of the super pixel or the super block according to a resolution of the image signal or an image size. Accordingly, the scaled down second image frame data with reduced error may be generated as compared to the first image frame data.

A signal processing device according to another embodiment of the present disclosure may include an input interface configured to receive an image signal; a first image processor configured to generate first image frame data based on the image signal; a second image processor configured to generate second image frame data based on the image signal; and an output interface configured to output a data enable signal divided into active periods and blank periods, a data signal of the first image frame data, and a data signal of the second image frame data, wherein the output interface sets an active period of a first data enable signal to a first length when only the data signal of the first image frame data is output and sets an active period of a second data enable signal to a second length greater than the first length when the data signal of the first image frame data and the data signal of the second image frame data are output together. Accordingly, signals may be output such that the timing controller may accurately and rapidly perform signal processing.

Further, the timing controller may accurately and rapidly perform signal processing on the first image frame data that is delayed and output based on the second image frame data. In particular, the timing controller may accurately and rapidly perform signal processing for power consumption reduction.

Meanwhile, the output interface may set a blank period of the first data enable signal to a third length when only the data signal of the first image frame data is output and set a blank period of the second data enable signal to a fourth length greater than the third length when the data signal of the first image frame data and the data signal of the second image frame data are output together. Accordingly, the timing controller may accurately and rapidly perform signal processing for the panel when the data signal of the first image frame data and the data signal of the second image frame data are output together.

Further, the output interface may vary the length of the active period of the second data enable signal based on resolution information of a panel and a driving frequency of the panel. Accordingly, the data signal of the first image frame data and the data signal of the second image frame data may be output in response to the resolution information of the panel and the driving frequency of the panel. Consequently, the timing controller may accurately and rapidly perform signal processing for the panel.

An image display apparatus according to an embodiment of the present disclosure may include: a signal processing device configured to delay first image frame data from second image frame data and to output the first image data; a timing controller configured to perform signal processing based on an image signal output from the signal processing device; and a panel configured to display an image based on a signal from the timing controller. Accordingly, the timing controller may accurately and rapidly perform signal processing for the panel.

The timing controller may extract the first image frame data based on the second image frame data from the signal processing device, perform signal processing on the first image frame data based on the extracted information, and output a signal regarding the processed first image frame data to the panel. The timing controller may accurately and rapidly perform signal processing on the first image frame data that is delayed and output based on the second image frame data. In particular, the timing controller may accurately and rapidly perform signal processing for power consumption reduction.

Further, the timing controller may extract the first image frame data based on the second image frame data from the signal processing device, decrease a luminance level of the first image frame data from a first level to a second level such that a power level consumed in the panel becomes equal to or less than an allowable value when power information based on luminance information in the extracted information exceeds a reference value, and output a signal regarding the first image frame data with the luminance changed to the second level to the panel. Accordingly, the timing controller may accurately and rapidly perform signal processing for the panel. In particular, the timing controller may accurately and rapidly perform signal processing for power consumption reduction. In addition, a memory may be eliminated from the timing controller.

Further, the timing controller may control a power level consumed in the panel to be equal to or less than an allowable value based on luminance information in the extracted information. Accordingly, power consumption of the image display apparatus may be reduced.

When power information according to luminance information regarding a part of the first image frame data exceeds a reference value based on the extracted information, the timing controller may decrease a luminance level of the part of the first image frame data from a first level to a second level and output a signal regarding the part of the first image frame data having the luminance changed to the second level to the panel. Accordingly, the timing controller may accurately and rapidly perform signal processing for the panel. In particular, the timing controller may accurately and rapidly perform signal processing for power consumption reduction. In addition, a memory may be eliminated from the timing controller.

Further, the timing controller may receive the first image frame data and the second image frame data when an image output mode of the signal processing device is a first mode, perform signal processing on the first image frame data based on the second image frame data to control the processed first image frame data to be displayed on the panel, and perform signal processing on the received first image frame data without information regarding the second image frame data to control the processed first image frame data to be displayed on the panel when the image output mode of the signal processing device is a second mode. Accordingly, the amount of processed signals in the timing controller in the first mode becomes different from that in the second mode. In addition, a panel display time is more advanced in the second mode than in the first mode.

What is claimed is:

1. An image display apparatus comprising:
- a display;
- a signal processing device configured to, in case in which an image output mode is a first mode, transmit data of a first image frame and data of a second image frame to the display,
- wherein a size of the second image frame is smaller than a size of the first image frame,
- wherein the signal processing device is further configured to, in case in which the image output mode is a second mode in which delay of image transmission to the display is less than that of the first mode, transmit the first image frame data without the second image frame data to the display,
- wherein the display comprises:
- a timing controller configured to, in case in which the image output mode is the first mode, extract information regarding the first image frame data from the received second image frame data, perform signal processing on the first image frame data based on the extracted information, and output the processed the first image frame;
- a panel configured to display an image based on the processed the first image frame from the timing controller.

2. The image display apparatus according to claim 1, wherein the second mode includes at least one of a game mode or a mirroring mode.

3. The image display apparatus according to claim 1, wherein the timing controller is configured to, in case in which the image output mode is the second mode, perform signal processing on the first image frame data without extracting information based on the second image frame data.

4. The image display apparatus according to claim 1, wherein signal processing device is configured to transmit a larger number of image frame data in the first mode than in the second mode.

5. The image display apparatus according to claim 1, wherein in case in which the image output mode of the signal processing device is the first mode, the timing controller extracts the first image frame data based on the second image frame data from the signal processing device, decreases a luminance level of the first image frame data from a first level to a second level in case in which power information based on luminance information in the extracted information exceeds a reference value, and outputs a signal regarding the first image frame data with the luminance changed to the second level to the panel.

6. The image display apparatus according to claim 1, wherein, in case in which power information according to luminance information regarding a part of the first image frame data exceeds a reference value based on the extracted information, the timing controller decreases a luminance level of the part of the first image frame data from a first level to a second level and outputs a signal regarding the part of the first image frame data having the luminance changed to the second level to the panel.

7. The image display apparatus according to claim 1, wherein the timing controller receives the first image frame data and the second image frame data in case in which the image output mode of the signal processing device is the first mode, performs signal processing on the first image frame data based on the second image frame data to control the processed first image frame data to be displayed on the panel, and performs signal processing on the received first image frame data without information regarding the second image frame data to control the processed first image frame data to be displayed on the panel in case in which the image output mode of the signal processing device is the second mode.

8. The image display apparatus according to claim 1, wherein the signal processing device comprises:
- an input interface configured to receive the image signal;
- a first image processor configured to generate the first image frame data based on the image signal;
- a second image processor configured to generate the second image frame data scaled down from the first image frame data based on the image signal; and
- an output interface configured to receive the first image frame data from the first image processor and the second image frame data from the second image processor and to transmit the first image frame data or the second image frame data,
- wherein the first image frame data received from the output interface is more delayed than the second image frame data received from the output interface.

9. The image display apparatus according to claim 8,
wherein the output interface outputs a data enable signal divided into active periods and blank periods, and
wherein a second active period of a second data enable signal in case in which the first image frame data and the second image frame data are output is greater than a first active period of a first data enable signal in case in which only the first image frame data is output.

10. The image display apparatus according to claim 8, wherein, in case in which the output first image frame data is n frame data, the output interface outputs frame data after the n frame data as the second image frame data.

11. The image display apparatus according to claim 8, further comprising a memory to store frame data for image processing of the first image processor.

12. The image display apparatus according to claim 8, wherein the output interface includes a first output terminal for transmitting vertical synchronization signal, a second output terminal for transmitting horizontal synchronization signal, a third output terminal for transmitting image data signal, and a fourth output terminal for transmitting data enable signal,
wherein the first image frame data and the second image frame data are transmitted through the third output terminal.

13. The image display apparatus according to claim 8,
wherein the output interface outputs a data enable signal divided into active periods and blank periods, and
wherein a second blank period of a second data enable signal in case in which the first image frame data and the second image frame data are output is less than a first blank period of a first data enable signal in case in which only the first image frame data is output.

14. The image display apparatus according to claim 8, wherein the output interface outputs a data enable signal divided into active periods and blank periods, and
wherein the output interface sets a length of the active period based on resolution information of the panel and a driving frequency of the panel.

15. The image display apparatus according to claim 8, wherein the output interface sets an active period having a second length greater than a first length by adding a period for transmission of the second image frame data to a period for transmission of the first image frame data having the first length.

16. The image display apparatus according to claim 8,
wherein the output interface outputs a data enable signal divided into active periods and blank periods, and
wherein the output interface sets an active period having a first length and a blank period having a second length in case in which a resolution of the panel is a first resolution and a driving frequency of the panel is a first frequency, and in case in which the first image frame data and the second image frame data are output, transmits at least a part of the first image frame data in the active period having the first length and transmits at least a part of the second image frame data in a part of the blank period having the second length.

17. The image display apparatus according to claim 8, wherein the output interface includes a first output terminal for transmitting vertical synchronization signal, a second output terminal for transmitting horizontal synchronization signal, a third output terminal for transmission of a data signal of the first image frame data, a fourth output terminal for transmission of a data enable signal of the first image frame data, a fifth output terminal for transmission of a data signal of the second image frame data, and a sixth output terminal for transmission of a data enable signal of the second image frame data,
wherein the output interface outputs the first image frame data and the second image frame data using different output terminals.

18. The image display apparatus according to claim 8, wherein the output interface outputs first image frame data regarding an n image frame and second image frame data regarding the n image frame together or does not output the second image frame data in case in which the image output mode is a low delay mode,
wherein the low delay mode includes at least one of a game mode or a mirroring mode.

19. The image display apparatus according to claim 8, wherein the second image processor includes a scaler for generating second image frame data scaled down from the first image frame data based on the image signal,
wherein the scaler generates at least one super pixel or super block based on an image block of the image signal and outputs the scaled down second image frame data including the super pixel or the super block,
wherein the scaler changes a size of the super pixel or the super block according to a resolution of the image signal or an image size.

20. A signal processing device configured to transmit a data of image frame to a display,
wherein the signal processing device comprises:
an input interface configured to receive the image signal;
a first image processor configured to generate the first image frame data based on the image signal;
a second image processor configured to generate the second image frame data scaled down from the first image frame data based on the image signal; and
an output interface configured to, in case in which an image output mode is a first mode, transmit data of a first image frame from the first image processor and data of a second image frame from the second image processor to the display, and in case in which the image output mode is a second mode in which delay of image transmission to the display is less than that of the first mode, transmit the first image frame data without the first image frame data to the display,
wherein a size of the second image frame is smaller than a size of the first image frame.

* * * * *